United States Patent
Schaafhausen et al.

(10) Patent No.: US 9,776,234 B2
(45) Date of Patent: Oct. 3, 2017

(54) FLANGING PRESS

(71) Applicant: FFT PRODUKTIONSSYSTEME GMBH & CO. KG, Fulda (DE)

(72) Inventors: Wilfried Schaafhausen, Friedrichshafen (DE); Jürgen Grohmann, Stetten (DE); Günter Motzkau, Friedrichshafen (DE); Felix Ziegler, Friedrichshafen (DE)

(73) Assignee: FFT PRODUKTIONSSYSTEME GMBH & CO. KG, Fulda (DE)

( * ) Notice: Subject to any disclaimer, the term of this patent is extended or adjusted under 35 U.S.C. 154(b) by 220 days.

(21) Appl. No.: 14/416,092

(22) PCT Filed: Jul. 29, 2013

(86) PCT No.: PCT/EP2013/065932
§ 371 (c)(1),
(2) Date: Jul. 14, 2015

(87) PCT Pub. No.: WO2014/016437
PCT Pub. Date: Jan. 30, 2014

(65) Prior Publication Data
US 2015/0360277 A1    Dec. 17, 2015

(30) Foreign Application Priority Data

Jul. 27, 2012  (EP) ..................... 12178365
Mar. 25, 2013  (DE) ................ 20 2013 002 810 U

(51) Int. Cl.
*B21D 39/02* (2006.01)
*B23Q 3/08* (2006.01)

(52) U.S. Cl.
CPC ........... *B21D 39/021* (2013.01); *B23Q 3/088* (2013.01)

(58) Field of Classification Search
CPC ..... B21D 39/021; B21D 39/02; B21D 19/043
See application file for complete search history.

(56) References Cited

U.S. PATENT DOCUMENTS

| 3,376,808 A | 4/1968 | Beckett et al. |
| 6,029,493 A | 2/2000 | Maier et al. |
(Continued)

FOREIGN PATENT DOCUMENTS

| DE | 197 47 291 C1 | 1/1999 |
| DE | 602 07 351 T2 | 8/2006 |
(Continued)

OTHER PUBLICATIONS

International Search Report issued in PCT/EP2013/065932 dated Nov. 10, 2013 (with English translation).
(Continued)

*Primary Examiner* — Debra Sullivan
(74) *Attorney, Agent, or Firm* — RatnerPrestia

(57) ABSTRACT

Flanging press for folding over a flange of a component, preferably of a vehicle part, the press being arranged in a stationary manner and including at least the following: (a) a basic structure with a flanging bed, against which the component can be pressed in a pressing direction in order for the flange to be folded over, (b) a flanging die unit with a flanging die for folding over the flange, (c) and a pressing drive for generating a pressing force which acts on the component in order for the flange to be folded over, (d) wherein the flanging die and the flanging bed can be moved relative to one another in the pressing direction by the pressing drive in order for the pressing force to be exerted, characterized in that (e) the pressing drive includes a bellows which can be subjected to the action of pressurized fluid, preferably compressed gas, and, under the action of pressure, acts on the flanging die unit or the flanging bed in the pressing direction and thus generates at least some of the
(Continued)

pressing force, and the bellows has a bellows surface which extends transversely to the pressing direction and can be subjected to the action of the pressurized fluid.

18 Claims, 27 Drawing Sheets

(56) References Cited

U.S. PATENT DOCUMENTS

| | | |
|---|---|---|
| 6,487,888 B1 | 12/2002 | Baulier et al. |
| 6,578,401 B2 | 6/2003 | Baulier |
| 2004/0107559 A1 | 6/2004 | Toeniskoetter et al. |
| 2009/0038361 A1 | 2/2009 | Toeniskoetter |
| 2011/0048094 A1 | 3/2011 | Toeniskoetter |

FOREIGN PATENT DOCUMENTS

| | | |
|---|---|---|
| DE | 10 2006 021 876 A1 | 11/2007 |
| DE | 10 2009 059 676 A1 | 6/2011 |
| EP | 1 297 913 A1 | 4/2003 |
| EP | 1 702 692 A1 | 9/2006 |

OTHER PUBLICATIONS

Written Opinion of the International Search Authority issued in PCT/EP2013/065932 dated Nov. 10, 2013 (with English translation).
EPO Search Report issued in EP 12 17 8365 dated Dec. 14, 2012.
German Search Report issued in DE 20 2013 002 810.6 dated Feb. 18, 2014.

FLANGING PRESS

CROSS REFERENCE TO RELATED APPLICATIONS

This application is the U.S. National Phase Application of PCT/EP2013/065932, filed Jul. 29, 2013, which claims priority to European Patent Application No. 12178365.8, filed Jul. 27, 2012 and German Patent Application No. 20 2013 002 810.6, filed Mar. 25, 2013, the contents of such applications being incorporated by reference herein.

FIELD OF THE INVENTION

The invention relates to a flanging press for folding over a flange of a component, preferably a vehicle part such as for example a vehicle door. It can in particular be a flanging press for manufacturing a hemmed connection. In such applications, the flanging press is a hemming press. In principle, however, it can also be used to fold over a flange completely or only partially or to perform a joining process. It is preferably used in the series production of vehicle parts.

BACKGROUND OF THE INVENTION

DE 10 2009 059 676 A1, which is incorporated by reference, discloses a flanging press which is arranged in a stationary manner and using which metal sheets are fixedly connected to each other by hemming. The flanging press comprises: a stationary base structure featuring a flanging bed; and a flanging die unit for folding over a component flange. A flanging die, which presses against the flange during flanging, is arranged on the flanging die unit such that it can be moved parallel to a pressing force which is to be exerted during flanging. The flanging die unit is mounted on the base structure such that it can be moved, together with the flanging die, transverse to the pressing direction. Another constituent part of the flanging press is a suppressor which holds down the component, thus fixing it to the flanging bed, during flanging. Flanging is performed in multiple steps, for example a pre-flanging step and a final-flanging step. The suppressor is lifted off the component between the flanging steps and lowered again for the next step.

Such flanging and/or hemming presses require large installation areas which, due to the limited space available in production plants, are often not available or only available at locations which are sub-optimal for production.

In order to reduce the installation area, US 2004/0107559 A1 and US 2011/0048094 A1, which are incorporated by reference, propose installing the flanging press vertically upright, such that the pressing direction is horizontal. Hydraulic or electric pressing drives are used to generate the pressing force. The motor force is transmitted onto the flanging bed or flanging die unit via gear systems.

SUMMARY OF THE INVENTION

An aspect of the invention provides a flanging press which is better suited to being arranged in production plants with limited available space, in particular with regard to the available installation areas, with the flanging bed arranged both vertically and horizontally.

The invention proceeds from a flanging press for folding over a flange of a component, wherein the flanging press is arranged in a stationary manner and comprises a base structure featuring a flanging bed and a flanging die unit featuring a flanging die, preferably multiple flanging dies, for folding over the flange. When folding over the flange, the component is pressed into the flanging bed in a pressing direction. The flanging bed correspondingly comprises a bearing support for the component which faces counter to the pressing direction. The flanging press also comprises a pressing drive for generating a pressing force which is necessary for folding over the flange. The flanging bed and the flanging die can be moved relative to each other in the pressing direction by means of the pressing drive, in order to be able to exert the pressing force. Embodiments can be realised in which both the flanging die and the flanging bed can be moved in the pressing direction relative to the environment of the flanging press, in order to achieve the relative mobility necessary for folding over the flange. Embodiments can also be realised in which only the flanging bed can be moved relative to the environment. In other embodiments, the one or more flanging dies can be moved relative to the environment and therefore relative to the flanging bed, in order to be able to fold over the flange, while the flanging bed cannot be moved.

In accordance with an aspect of the invention, the pressing drive is a fluidic pressing drive comprising a bellows which can be charged with pressure fluid, preferably pressurised gas, and acts on the flanging die unit or flanging bed in the pressing direction when charged with pressure, thus generating the pressing force. The bellows can be arranged on a rear side of the flanging die unit facing away from the flanging bed or on a rear side of the flanging bed facing away from the flanging die. It can extend over the length of the flanging bed, such that the fluid pressure in the interior of the bellows acts on a large area of the bellows. A pressure bellows which is operated using pressurised gas, preferably pressurised air, can therefore also generate a sufficiently large pressing force purely fluidically, such that it can act directly on the flanging bed or flanging die, as is preferred, and in particular be arranged directly on a rear side of the flanging bed or flanging die unit and not need stepping down by a gear system. A pressure bellows which can be operated using pressurised air can be very easily connected to a pressurised air supply which is provided in production plants by their very nature. Conventional pressurised air supplies typically deliver a pressure of for example 6 or 12 bars. It is not necessary to provide a unit especially for the pressing drive.

Using a pressure bellows significantly simplifies the pressing drive as compared to conventional pressing drives. Fewer parts which can be moved relative to each other are required for the drive. If the pressure bellows expands when charged with pressure in the pressing direction, it can also be arranged such that it acts directly on the flanging bed or flanging die unit in the pressing direction, as mentioned above. It is merely necessary for a flexible wall of the bellows to be supported on its end-facing sides, such that it acts on either the flanging bed or the flanging die unit via one of its end-facing sides when charged with pressure in the pressing direction. The pressure bellows can be arranged centrally in relation to the pressing axis. When relieved of pressure, it can be very flat as measured in the pressing direction and for example shaped as a disc or plate. If it only performs the pressing stroke necessary for folding over the flange, it also exhibits a thickness of just a few centimeters, preferably at most 20 cm, when charged with pressure. Another substantial advantage is that the cross-section of a pressure bellows can be adapted in terms of its size or shape to the profile of the flange to be folded over. In this way, the pressing force can be introduced into the flange to be folded over in the pressing direction more directly and with less transverse offset and correspondingly small bending moments.

The flow of force from the pressure bellows to the bearing support which the flanging bed provides to the component is axially more direct, more linear as it were, than in known pressing drives. Any transverse offset in the flow of force and associated lever arms and bending moments can be reduced.

Ideally, the pressure bellows comprises an effective bellows area, the outer circumference of which is adapted to the profile of the flanging bed and correspondingly to the profile of the flange to be folded over. The effective bellows area is the cross-sectional area of the pressure bellows acted on by the pressure which prevails in the interior of the pressure bellows. The ideal situation, in which the outer circumference of the effective bellows area overlaps exactly with the axial projection of the bearing support of the flanging bed onto the effective bellows area, will however be an exceptional situation in practice due to the higher associated cost of manufacturing the pressure bellows. The effective bellows area will instead exhibit a simple cross-sectional shape such as for example a circle, an ellipse exhibiting unequal main axes or some other oval deviating from a circle, or a rectangle, square or other polygon. A pressure bellows which exhibits an effective bellows area in the shape of a circle is a preferred example embodiment, not least because of its ease of manufacture.

If the outer circumference of the effective bellows area follows the profile of the bearing support of the flanging bed and therefore the profile of the flange to be folded over, as will be the case in most applications, it is advantageous if the flange to be folded over or alternatively the flanging bed extends only slightly outside the effective bellows area. It is correspondingly advantageous if the ratio of the overlapped flanging bed area to the non-overlapped flanging bed area is small. Within this context, the flanging bed area is understood to mean the area of the flanging bed which is axially projected onto the effective bellows area and defined by the outer circumference of the bearing support of the flanging bed which supports the component. The bearing support is an end-facing area of the flanging bed which the component is pressed onto during flanging. The outer circumference of the bearing support will in most embodiments also be the outer circumference of the end-facing area of the flanging bed, wherein the component lies on said end-facing area during flanging. If, however, this outer circumference protrudes beyond the edge of the component during flanging, the outer circumference is revised to the outer edge of the component for the purpose of ascertaining the ratio. If the flange does not extend completely around the edge of a component, as for example in the window region of a vehicle door, the free flange ends are connected to each other by a straight line, which then defines the flanging bed area in the relevant region, for the purpose of ascertaining the flanging bed area. If the bearing support of the flanging bed does not extend over a complete circumference, self-contained, the end points of the bearing support area—which in this case only partially encircles the pressing axis—are correspondingly connected by a straight line for the purpose of comparison. In preferred embodiments, the ratio of the overlapped flanging bed area to the non-overlapped flanging bed area is at least 0.5 and preferably greater than 0.5.

The pressing drive can comprise one or more pressure bellows of the type described or claimed, which also includes the scenario in which the pressing drive consists only of one or more pressure bellows of said type. If multiple pressure bellows, for example two pressure bellows, are provided, these can be arranged either such that they act in mutually opposite pressing directions or such that they act in the same pressing direction. Pressure bellows which act in opposite pressing directions are preferably arranged back-to-back on a common framework. Pressure bellows which act in the same pressing direction can be arranged next to each other or one on top of the other, preferably directly next to each other or one directly on top of the other, in the pressing direction. The multiple pressure bellows of both embodiments, i.e. acting in the same direction or acting in mutually opposite directions, can preferably be charged with a pressure fluid independently of each other or relieved of pressure independently of each other. Pressure bellows which act in the same direction can also be designed to be charged with the pressure fluid or relieved of pressure simultaneously or sequentially.

In first embodiments, the base structure and the flanging die unit are at least substantially installed vertically upright or mounted such that they can be installed in a framework. If the base structure and flanging die unit are in an at least substantially vertical alignment, the flanging bed points counter to the pressing direction which is correspondingly at least substantially horizontal. The base structure and flanging die unit of flanging presses usually together exhibit a maximum thickness, as measured in the pressing direction, which is significantly smaller than their maximum width, as measured transverse to the pressing direction, when the press is closed. The invention uses this fact to reduce the installation area necessary for installing the flanging press, by arranging the flanging bed such that it is at least substantially vertically upright and points to the side, rather than such that it is horizontal and points upwards, as is usual, or by enabling the flanging bed to be moved into this alignment by a movable mounting in a framework. In a plan view onto the flanging press, this reduces the base area of a cylinder which encloses the flanging press and, in this sense, the installation area necessary for installing the press. Since the components are not suspended but can rather be respectively inserted into the flanging press in a vertical alignment, this also simplifies handling them using a robot or other actuator. If the flanging press is aligned vertically, the flanging bed or flanging die can be worked on, for example repaired or maintained or finished, more easily and in particular in an ergonomically more favourable way.

An aspect of the invention is however also beneficial to a compact design of the press when it is arranged horizontally, i.e. when the pressing direction is vertical. In this respect, the invention benefits from the fact that the pressure bellows can introduce the pressing force without interposing a transmitting or synchronising gear system or the like, and over a larger effective area—the effective bellows area—than in the prior art. The flanging bed or flanging die unit can thus be arranged over the pressure bellows and can rest on the pressure bellows, such that the pressure bellows, when charged with pressure, raises the relevant structure—either the flanging bed or the flanging die unit—relative to the other structure, in order to perform a pressing stroke. Preferably, the flanging bed is arranged over the pressure bellows, such that its bearing support area points upwards and the component to be respectively flanged can be placed onto the flanging bed from above. In modifications, the flanging bed can also be positioned obliquely, such that the pressing direction points at an angle greater than 0° to the horizontal. The forces transverse to the pressing direction which occur in such alignments are preferably absorbed by a supporting or guiding device, in order to relieve the flexible wall of the bellows of transverse forces.

The flanging press is preferably designed for flanging flat components, i.e. components which exhibit a maximum depth, as measured in the pressing direction, which is smaller than their length or width as measured transverse to the pressing direction. Typical examples are vehicle parts, in particular vehicle attachment parts such as for example vehicle doors, sunroofs, bonnets and hatchbacks, though also body parts such as for example a vehicle side wall, a sill or a mudguard.

The flanging die is arranged on the flanging die unit. The flanging die unit can in principle form the flanging die in one piece; more preferably, however, the flanging die unit comprises a bearing structure, and the flanging die is produced separately and assembled on the bearing structure. The flanging die can consist of multiple parts which are joined to form a unit; expediently, however, it is a structure formed in one piece. In preferred embodiments, the flanging die is shaped to conform to the profile of the flange. It can therefore for example exhibit a profile which is curved at least in sections, wherein it can be curved in one dimension only or also two-dimensionally. The same applies analogously to the flanging bed.

In order to generate the relative movement in the pressing direction between the flanging die and the flanging bed which is necessary for folding over the flange, the flanging die can in principle be supported on the flanging die unit such that it can be moved in the pressing direction; preferably, however, the relative movement in the pressing direction occurs between the flanging bed and the flanging die unit. In such embodiments, the flanging bed and the flanging die unit can be moved relative to each other in the pressing direction by means of the pressing drive, in order to exert the pressing force. Although the flanging die unit can be mounted in or on a framework of its own, independently of the base structure and such that it can be moved relative to the environment, and/or the flanging bed can be mounted in or on a framework of the base structure, independently of the flanging die unit and such that it can be moved relative to the environment, embodiments in which the flanging die unit is mounted on the base structure such that it can be moved in the pressing direction or the flanging bed is mounted on a supporting structure such that it can be moved in the pressing direction are preferred. The word "or" is understood here, as elsewhere, by the invention in its usual logical sense of "inclusive or", i.e. it encompasses both the meaning of "either . . . or" and the meaning of "and", unless only one of these two meanings can exclusively follow from the respectively specific context. In relation to for example the preferred relative mobility between the flanging bed and the flanging die unit, this means that in a first variant, the flanging die unit is mounted on the base structure such that it can be moved in the pressing direction, and the flanging bed cannot be moved relative to the environment, while in a second variant, the flanging bed is mounted on the supporting structure such that it can be moved relative to the flanging die unit, and the flanging die unit cannot be moved relative to the environment. In a third variant, the flanging die unit and flanging bed can be mounted on the base structure and a supporting structure, respectively, such that they can be moved relative to each other and can each be moved relative to the environment.

It is expedient if the flanging die unit comprises a bearing structure, and the flanging die can be moved relative to the bearing structure, transverse to the pressing direction. In such embodiments, the flanging press comprises a flanging die drive which is coupled to the flanging die in order to move the flanging die relative to the bearing structure of the flanging die unit, transverse to the pressing direction. This enables applying and retracting movements of the flanging die, in order to be able to insert the component or fold over the flange sequentially by a particular angle in each of for example two or more flanging steps. The flanging die drive can in particular be arranged on the bearing structure of the flanging die unit.

In all the variants mentioned, the flanging die participates in the relative movement of the flanging die unit, i.e. the pressing stroke and the return stroke. The flanging die can therefore be supported, for example in an abutting contact, on the flanging die unit such that it cannot be moved in the pressing direction. Since the pressing stroke is performed by the flanging die unit, which is larger and more massive than the flanging die, and the forces which have to be applied for transverse strokes of the flanging die are only small as compared to the pressing force, a simple and robust flanging die unit is created.

If, as is preferred, the flanging press comprises multiple flanging dies, these are each a constituent part of the flanging die unit. If only one flanging step is performed using the flanging die unit, the flanging dies can be arranged such that they cannot be moved on the flanging die unit. As already mentioned, the flanging die unit more preferably comprises a bearing structure on which the flanging dies are each supported such that they can be moved. Statements made with respect to at least one flanging die preferably apply similarly to any optional additional flanging die of the flanging die unit. Advantageously, the flanging die drive comprises multiple drive units which are fluidically, preferably pneumatically, or electrically operated, namely one dedicated drive unit for each of the movable flanging dies which is coupled to the assigned flanging die only. Using multiple flanging dies is in particular advantageous if the flange to be folded over is not simply straight, in a plan view onto the component as viewed in the pressing direction, but rather comprises at least two flange portions which do not lie on a common straight line. The flange can thus exhibit a curved or polygonal profile as viewed in the plan view, or it is necessary to flange the edge of a component on different sides. This is typically the case with the example components already mentioned, such as for example a vehicle door or hatchback. The flange can for example encircle a central region of the component, as viewed in the plan view, completely or partially, and can also as applicable be interrupted in sections. In order to be able to fold over such a flange by a particular angle in each of multiple flanging steps using the same flanging die unit, preferred embodiments of the flanging die unit comprise, as mentioned, multiple flanging dies which can be moved relative to a bearing structure of the flanging die unit and also relative to each other transverse to the pressing direction and which are arranged on the bearing structure such that they follow the profile of the flange to be folded over.

It is advantageous for the relative mobility between the flanging die unit and the flanging bed if a guiding element which extends in the pressing direction is provided on the base structure, and a guiding counter element which extends in the pressing direction is provided on the flanging die unit, and the base structure and the flanging die unit are guided relative to each other in the pressing direction during the pressing stroke and the return stroke by means of a guiding engagement between the guiding element and the guiding counter element. The relative movement can in particular be a linear movement. The guiding element and the guiding counter element can correspondingly each extend linearly in the pressing direction. If the flanging die unit is mounted on the base structure when the guiding element and guiding counter element are in guiding engagement, its weight is at least predominantly accommodated in the guiding engagement of the guiding element. If the flanging bed performs a pressing movement, the flanging bed can be mounted on the guiding counter element of the flanging die unit or a guiding counter element of said supporting structure when the guiding element and guiding counter element are in guiding engagement, such that at least some of the weight of the flanging bed is supported on the flanging die unit or the supporting structure. Multiple guiding elements and guiding counter elements are preferably arranged in a distribution around the flanging bed in the way described, respective pairs of which are in guiding engagement with each other, in order to guide the flanging die unit or the flanging bed during the pressing movement in the pressing direction.

In order to hold down the component in the flanging bed during flanging, a suppressor can be provided which fulfils the holding-down function only, as is usual. A suppressor which can not only fulfil this function but also comprises a fastening device for fastening to an actuator which can be spatially moved, such as for example a robot arm of an industrial robot, and a holding device for holding the component, for example a pneumatic sucker or mechanical grabber, is however more advantageous. By means of such a suppressor, the component can be moved to the flanging press, placed into the flanging bed and held down in the flanging bed during flanging. Advantageously, it can also be taken out of the flanging bed again by means of the suppressor. In such embodiments, the suppressor can process multiple components sequentially, i.e. pick one up, hold it, position it in the flanging bed, hold it down, and optionally also take it out of the flanging bed again and put it down, in order to then be able to pick up the next component. It can remain on the actuator during these actions. The suppressor is therefore also an inserting tool, and preferably also a picking-up or grabbing tool, by taking the flanged component out of the flanging press and putting it down in a component depository for further processing or for assembly, as applicable.

Such a suppressor, in particular the holding device, can be designed for picking up nested parts of a component to be joined, such as for example an outer part and an inner part of a vehicle door or hatchback or sunroof, and inserting them nested into the flanging bed. The suppressor, in particular the holding device, can also be designed for individually picking up the parts of such a component which are to be nested and inserting them sequentially into the flanging bed and/or flanging press, i.e. nesting them only once they are in the flanging press. This is for example advantageous if a nesting station is not arranged in the region of the flanging press or possibly cannot even be provided for reasons of space. The suppressor, in particular the holding device, can lastly also be designed for optionally either picking up the parts of such components individually and nesting them in the press or picking up the already nested parts collectively and inserting them collectively. It is advantageous for both approaches if the holding device comprises one or more suckers or one or more mechanical grabbers, using which one of the individual parts of a nested composite can be drawn towards another individual part of the nested composite and thus placed onto said other individual part, wherein this other individual part can for example be supported on a holding-down edge of the suppressor or held by one or more other grabber(s), for example one or more sucker(s) or one or more mechanical grabber(s).

In preferred embodiments, a suppressor which can be used for inserting is guided relative to the flanging bed while it is inserting. This function can in principle be provided by the actuator; more preferably, however, the actuator is relieved of this task and the suppressor is guided directly. The flanging die unit or the base structure can then comprise a guiding element and the suppressor can comprise a guiding counter element in order to guide the suppressor relative to the flanging bed in a guiding engagement between said guiding element and the guiding counter element of the suppressor while it is inserting the component, until the component is lying in the flanging bed. The suppressor is preferably guided in the pressing direction. The guide can be a linear guide. The guiding element for the suppressor can in particular be the guiding element for the flanging die unit which has already been described and which then guides the flanging die unit during the pressing stroke on the one hand and the suppressor while it is inserting on the other hand, in a dual guiding function. A guiding element for the suppressor can however also be provided in addition to a guiding element for the flanging die unit. The suppressor preferably comprises multiple guiding counter elements via which it is respectively in guiding engagement with an assigned guiding element of the base structure or an assigned guiding element of the flanging die unit while it is inserting the component.

The base structure or the flanging die unit can comprise a tensing element, and the suppressor can comprise a tensing counter element, which can be brought into tensing engagement with each other in order to tense the suppressor in the pressing direction relative to the flanging bed, for holding down the component in the tensing engagement. This relieves the actuator—preferably, an arm of a robot such as for example a conventional industrial robot—of this task. This can even extend to the actuator being freed up by the suppressor, i.e. no longer required for holding down and available for fulfilling some other function. Preferably, the base structure or the flanging die unit comprises one or more first tensing elements, and the suppressor comprises one or more second tensing elements, i.e. tensing counter elements, respective pairs of which can be brought into tensing engagement in order to tense the suppressor in the pressing direction relative to the flanging bed in the respective tensing engagement. Preferably, multiple first tensing elements are arranged in a distribution along the flanging bed or along the one or more flanging dies in order for the tensing engagement to generate a holding-down force which is uniform along the flanging bed. The first tensing element or elements can advantageously be arranged on the at least one or more guiding elements; in principle, however, they can also be provided separately from it/them. It is expedient for it/them to be arranged in a region of the respective guiding element which is behind the flanging die as viewed from the flanging bed.

The first tensing element and second tensing element can in particular be shaped such that a tensing force which acts in the pressing direction, and therefore the holding-down force of the suppressor in the tensing engagement, is generated by a wedge effect. The tensing engagement can thus for example be formed in the manner of a screw engagement, in that the first tensing element co-operates with the second tensing element—or the first tensing elements co-operate respectively with the second tensing elements—in the manner of a screw and a nut, wherein one of the first tensing element and second tensing element rises counter to the pressing direction of the flanging die(s) about a rotational axis, comparable to a thread pitch, and the other of the first tensing element and second tensing element slides on the rising area or line when the first tensing element and the assigned second tensing element are rotated about said rotational axis relative to each other.

In equally preferred embodiments, a tensing coupling is provided, by means of which the suppressor can be tensed relative to the flanging bed without a rotational movement. The tensing coupling comprises a first coupling structure and a second coupling structure which can be connected to the first coupling structure and detached again from the first coupling structure. The first tensing element is a constituent part of the first coupling structure, and the second tensing element is a constituent part of the second coupling structure. Preferably, one of the coupling structures comprises a receptacle which the other coupling structure can enter, in or counter to the pressing direction. One of the coupling structures, preferably the one with the receptacle, mounts one or more of the first tensing elements such that it/they can be moved transverse to the pressing direction, and supports the respective first tensing element in relation to the pressing direction. The other of the coupling structures comprises one or more recesses or cavities which form(s) the second tensing element or a respective second tensing element. If one of the coupling structures has entered the receptacle of the other coupling structure, the transversely movable tensing element(s) can be moved in the transverse direction into the one or more recesses or cavities and thus detachably fix the suppressor relative to the flanging bed. The tensing elements are advantageously shaped such that they generate a wedge effect, together with a resultant axial force, when co-operating and thus tense the suppressor towards the flanging bed.

The transversely movable tensing element(s) can be pressed into the recess or cavity or the respectively assigned recess by means of one or more mechanical springs. In a further development, the tensing coupling can be activated fluidically, preferably pneumatically. In this further development, the coupling structure which mounts the transversely movable tensing element(s) can be charged with a pressure fluid, for example pressurised air, in order to press the transversely movable tensing element(s) into the one or more assigned recesses of the other coupling structure by means of the pressure fluid. The transversely movable tensing element(s) can be charged with a restoring spring force by one or more mechanical springs, such that the transversely movable tensing element(s) is/are moved into the tensing engagement by means of the pressure fluid and, when relieved of pressure, out of the tensing engagement again by the spring force.

If the flanging press is designed for folding over the flange in two or more flanging steps, another flanging die can be provided in addition to the flanging die, such that one of these two flanging dies performs one of the flanging steps and the other flanging die performs another of the flanging steps. The first flanging die can be a pre-flanging die for pre-flanging and the other flanging die can be a final-flanging die for final-flanging. The flanging areas of the flanging dies can be arranged one on top of the other in the pressing direction. The multiple flanging dies can in particular be arranged on a common flanging die support. Alternatively, however, the flanging die unit and the flanging die can also be designed for performing multiple flanging steps sequentially. For this purpose, the flanging die comprises a first flanging area for folding over the flange by a first angle and another, second flanging area for folding over the flange by another angle. The first flanging area can protrude beyond the second flanging area transverse to the pressing direction and to the flange, i.e. can be arranged next to the second flanging area in the transverse direction. The flanging die can however also in principle comprise multiple flanging areas one on top of the other in the pressing direction.

The suppressor can be lifted off the component between two flanging steps performed on the same component. However, this means the component is no longer fixed to the flanging bed, or that it is necessary to fix the component in some other way.

In preferred embodiments, the flanging die and a suppressor are shaped such that at least two flanging steps, preferably including a final-flanging step, can be performed using the same flanging die, but the suppressor can nonetheless remain in the same holding-down position throughout the two flanging steps, including between the at least two steps. The suppressor and the flanging die are shaped such that the flanging die can overlap the suppressor transverse to the pressing direction and transverse to the flange during at least one of the flanging steps. The suppressor comprises a holding-down edge for contacting the component, and a region which borders the holding-down edge. In the region which borders the holding-down edge, i.e. which is behind the holding-down edge as viewed from the flange, the suppressor is preferably shaped such that the flanging die can overlap the holding-down edge, i.e. extend over it during flanging, while the holding-down edge holds down the component in the flanging bed, including in the overlapped portion of the edge.

The suppressor or the flanging die can (each) be shaped such that they interlock or mesh, for example in the manner of a comb, when they overlap or such that the flanging die merely extends over the suppressor. In the region which borders the holding-down edge, the suppressor can comprise a region which protrudes transverse to the pressing direction and the flange, and a region which is retracted transverse to the pressing direction and the flange, and the flanging die can similarly comprise a region which protrudes transverse to the pressing direction and the flange, and a region which is retracted transverse to the pressing direction and the flange, such that the flanging die and the suppressor can interlock or mesh transverse to the pressing direction and to the flange during flanging. The suppressor can then comprise one or more passages, and the flanging die can mesh with the suppressor, preferably only in the region which borders the holding-down edge, for example via multiple portions simultaneously, in the manner of a comb. The suppressor can instead also comprise one or more pockets facing the flanging die, again preferably only in the region which borders the holding-down edge, and the flanging die can merely engage with the pocket(s). The suppressor can also comprise one or more passages in addition to one or more pockets. In order to enable overlapping, the suppressor can be angled away from the flanging die in the region which borders the holding-down edge instead of or in addition to one or more passages or one or more pockets, such that the flanging die can overlap, i.e. extend over, the holding-down edge on its rear side during flanging.

The flanging die unit can comprise a passage which extends through the flanging die unit in the pressing direction and through which the component can be inserted into the flanging bed, preferably by means of the suppressor, from a rear side of the flanging die unit which faces away from the flanging bed. Such an embodiment is in particular advantageous for components which are flanged circumferentially on an outer edge or at least on multiple sides, i.e. components in which the flange to be folded over comprises flange portions which are continuous or separate from each other and which are not parallel to each other and which in their entirety extend in particular over an angular range of at least 90° or 180° or 270° or more and for example include one or more round portions in the shape of an arc. When flanging such components, the flanging die unit and the flanging bed can again perform the pressing movement relative to each other, as described with respect to preferred embodiments, but can be connected to each other such that they cannot be moved in all other degrees of freedom of movement as viewed over a series of components. If the flanging die unit comprises the passage, it is not necessary every time, for inserting a respective component to be flanged, to move the flanging die unit away from the flanging bed, for example pivot or linearly move it away, or to move the flanging bed away from the flanging die unit, for example pivot or linearly move it away, far enough that the relevant component can be inserted from the side of the flanging press. The flanging die unit and the flanging bed can retain the positions relative to each other which they also assume relative to each other after the component has been inserted and for example directly before a flanging stroke is performed. It is for example not necessary to release any guiding engagement, such as for example a guiding engagement in which the flanging die unit or the flanging bed is guided or as applicable are each guided while the pressing stroke is performed. Another advantage is that the component can be inserted through the passage at least substantially parallel to the pressing direction, i.e. can be moved up to and against the flanging bed.

The passage is defined by an inner circumference of the flanging die unit, preferably a flanging die bearing structure for the one or more flanging dies. In a plan view onto the flanging bed in the pressing direction, the inner circumference extends radially outside the flanging bed and extends on the outside at least partially and preferably completely over 360° around the circumference of the flanging bed. The one or more flanging dies protrude beyond the inner circumference in the transverse direction during flanging and can preferably (each) be transversely moved from a retracted position into a front position and back again. The one or more flanging dies are advantageously supported on the inner circumference, i.e. near an edge, and preferably directly on an edge of the inner circumference during flanging. The inner circumference preferably follows the contour of the flange to be folded over, at a slight distance, in the pressing direction plan view and extends in this sense close-to-contour. The distance is advantageously set close-to-contour over the length of the flange to be folded over, such that the component can be moved through the passage, preferably by a robot arm which can be moved in multiple axes or by another actuator which can be spatially moved, but the flanging die or dies is/are nonetheless subject to only slight bending forces due to being supported correspondingly close-to-contour on the inner circumference.

The application of the pressing force by means of a pressure bellows advantageously co-operates with the close-to-contour inner circumference and therefore the close-to-contour passage. If the end-facing area of the pressure bellows and/or the effective bellows area of the pressure bellows is correspondingly configured up to the support of the flanging die(s), the flow of force can more closely approximate the direction of the pressing force during flanging than in the prior art, and the sum of the bending forces occurring in the flow of force is reduced. The pressing force can be transmitted more linearly.

The one or more flanging dies arranged on the flanging die unit can extend along an edge of the flanging die unit and laterally define the passage. When the component is lying in position and held down in the flanging bed, the one or more flanging dies can be moved transverse to the pressing direction over the flange and then in the pressing direction against the flange in order to fold it over. The one or more flanging dies can advantageously be collectively advanced, transverse to the pressing direction and relative to a bearing structure of the flanging die unit which comprises the passage, beyond an inner circumference of the bearing structure and inwards towards a central region of the passage. It is advantageous, in particular for final-flanging, if the flanging dies in an arrangement of multiple flanging dies can be advanced beyond the inner circumferential edge of the bearing structure far enough inwards that they form a closed, uninterrupted contour over the length of the flange to be folded over, as viewed in the plan view, and press against the flange with said contour during flanging. A bearing structure of the flanging die unit on which the flanging die(s) is/are supported can completely frame the passage. The bearing structure as a whole can be formed as a frame exhibiting a frame beam which is narrower than the passage.

The pressing drive can be a pneumatic, hydraulic or electric drive. If it is an electric drive, its force and/or torque is preferably transmitted by means of a knuckle joint mechanism onto the component of the press which performs the pressing stroke, preferably the flanging die unit. A hydraulic pressing drive can advantageously act directly on the component of the press which is to be moved and can therefore be embodied in a very compact form. Multiple hydraulic linear stroke units can in particular be arranged in a distribution along the flanging bed and/or along the flange to be folded over. Alternatively, a fluidic pressing drive can comprise a bellows which can be charged with pressure fluid, preferably pressurised gas, and which acts on the flanging die unit or the flanging bed when charged with pressure in the pressing direction and thus generates the pressing force, which is also the subject of protection in the present application.

The flanging process can be combined in the flanging press with another joining process, for example a welding or soldering process, in particular spot welding. If a sufficiently thin joining tool such as for example a welding lance is available for the other joining process, then when the flanging die is retracted, such a joining tool can be moved between the flanging die and the suppressor, which is opposite the flanging die transverse to the pressing direction, towards the flanging bed and pressed against the flange in order to create a joined connection, for example a material-fit joined connection, in the pressure contact. In this way, nested parts which are joined to each other by flanging can for example, in addition to the hemmed connection thus created, also be fixed relative to each other in a material fit. In many applications, the suppressor presses against an inner part in an arrangement of multiple nested parts, wherein a flange on the edge of said part protrudes into a hemmed pocket of an outer part which is created by flanging. The suppressor can therefore advantageously be further developed into a welding electrode, preferably the earth electrode, in order to weld the folded-over flange to the inner part which protrudes into the hemmed pocket. The welding electrode and the earth electrode can each press against the component from the same side, one electrode against the folded-over flange and the other electrode against the part which protrudes into the hemmed pocket, in order to close the circuit. In principle, the flanging bed can for example also form one of the two electrodes necessary for welding, if two parts of a component which lie one on top of the other in the flanging bed are to be welded, rather than the folded-over flange. In principle, however, an earth electrode necessary for welding can also be additionally provided and moved in the pressing direction from the outside between the flanging die and the suppressor until it is in contact with one of the parts which are to be joined to each other by welding. As an alternative to for example an externally supplied welding lance, a welding electrode can also be a constituent part of the flanging die unit. The welding electrode can then be integrated into the flanging die, preferably such that it can be moved in the pressing direction. It can for example also be advantageous for such an additional material join, such as for example soldering or gluing or in particular welding, if the fastening device of the suppressor is a docking port for automatically docking with and undocking from the actuator. If, as described further above, the suppressor is pressed into the holding-down position by means of at least one tensing element of the flanging die unit or preferably of the base structure and a tensing counter element of the suppressor, i.e. if the holding-down force necessary for holding down is generated in the tensing engagement, the actuator can automatically undock the suppressor when it is in the tensing engagement and instead dock a joining tool such as for example a welding lance in order to perform the additional joining process using the corresponding joining tool. Once the additional joining process has been performed, the actuator—or another actuator—can dock with the suppressor again, in order to take it out of the flanging press together with the flanged component. In order to be able to move a joining tool up to the component, the suppressor can comprise a cavity in (each of) one or more regions in (each of) which joining is to be performed, in order to simplify access to the joining location by the joining tool.

In a further development, the flanging bed and the flanging die unit are mounted in a framework such that they can be rotated or pivoted about an axis which is at least substantially horizontal, such that the flanging bed and the flanging die unit can be moved back and forth between the vertical position and a horizontal position in which the flanging bed points upwards. They are preferably mounted such that they can be pivoted or rotated collectively. Mounting them in this way can for example be advantageous in applications in which the component consists of multiple parts, for example an outer part and an inner part of a vehicle door, and is joined by hemming and gluing, and glue is provided in the joining region. When using this pivoting or rotating arrangement, the operator of the flanging press is free to decide whether to perform flanging in the horizontal or vertical alignment. When they are not being used, the operator can move the flanging bed and the flanging die unit into the space-saving vertical alignment.

The one or more flanging dies can (each) comprise a wear-resistant ceramic surface via which it presses or they press against the flange of the component during flanging. No dirt or at least less dirt sticks to the ceramic surface than to metallic surfaces; in particular, no build-up welding effect occurs.

The respective flanging die can consist of a ceramic material. In preferred embodiments, however, the respective flanging die comprises a metallic base body which merely comprises a wear-resistant ceramic coating on its one or more flanging areas. The coating can be embodied using a thick-film technique or in particular a thin-film technique. A thin wearing layer, i.e. a thin film, with a thickness of at most 30 μm, more preferably at most 20 μm, is preferred. The wearing layer can be produced in a CVD (chemical vapour deposition) method or preferably in a PVD (physical vapour deposition) method; alternatively, it can also be produced galvanically. A small layer thickness is beneficial to surface-finishing the base body true-to-contour with the protective wearing layer. The protective wearing layer can be closed, i.e. can completely cover the metallic surface of the base body. This is not however essential. It is also sufficient if the ceramic protective wearing layer does not form a closed covering layer on the metallic base body, but rather the ceramic layer material merely fills, at least partially, the depressions in the roughness of the metallic base body.

In another further development, the flanging press comprises another, second flanging bed and another, second flanging die unit. The second flanging bed can be provided on the base structure or on an optional second base structure. A second component can be placed into the second flanging bed and pressed in a pressing direction opposite to the pressing direction in order to fold over a flange. The second flanging die unit faces the second flanging bed and comprises at least one second flanging die for folding over the flange of the second component. The two flanging beds are arranged between the flanging die units in the pressing direction. The flanging beds and the flanging die units together form a sandwich arrangement in which the two flanging beds are arranged back-to-back. The at least one second flanging die and the second flanging bed can be moved relative to each other in the second pressing direction by means of the pressing drive, in order to also be able to exert a pressing force on the second component. The flanging beds and flanging die units are preferably arranged at least substantially mirror-inverted with respect to each other in relation to a plane pointing perpendicular to the pressing direction. In this dual embodiment, the flanging press is in particular suitable for simultaneously flanging components which are similar in terms of their size and form, for example a right-hand and left-hand vehicle door. The two single flanging presses which are combined to form a dual press can correspond exactly to each other.

Preferably, the second flanging press likewise comprises the features claimed and described herein using the example of the first flanging press. The two single presses can however differ from each other with regard to their geometry, for example the profile of the flanging beds and correspondingly the contour of the flanging dies, in order for example to be able to flange a right-hand vehicle door using one flanging press and a left-hand vehicle door using the other flanging press or also to simultaneously flange vehicle doors of different types of motor vehicle or other components which differ from each other. The components which can be flanged simultaneously in the dual press should however be sufficiently identical that the forces to be applied in the two single presses correspond approximately to each other in terms of their size and distribution.

The pressing drive can be connected to the two flanging die units and in particular supported on the flanging dies in and counter to the pressing direction in such a way that one serves as a support for the other. In first embodiments, the pressing drive only acts on the flanging die units in and counter to the pressing direction and moves them apart in opposite directions and, during the pressing stroke, towards each other and thereby towards the respective flanging bed. If the pressing drive is formed as a linear stroke drive, the base structure can guide a stroke element of the drive in the pressing direction but need not support the drive in or counter to the pressing direction.

If the pressing drive comprises the pressure bellows, a framework can be arranged in a central region of such a dual press, wherein a pressure bellows is supported on said framework on each of a front side facing the flanging die unit and a rear side facing the second flanging die unit. The flanging press advantageously comprises the second base structure mentioned. One pressure bellows acts on a bearing structure of the base structure, in order to press its flanging bed against the flanging die unit. The other pressure bellows acts on a bearing structure of the second base structure, in order to press its flanging bed against the second flanging die unit.

The dual press can also be fitted with just one pressure bellows which for example presses the two flanging beds or instead the two flanging die units away from each other if either the flanging beds are arranged back-to-back or the flanging die units are arranged back-to-back and the pressure bellows is arranged in between. In principle, a common pressure bellows for both single presses can also be arranged between the flanging bed of one single press and the flanging die unit of the other single press and move the flanging bed of the first single press towards the flanging die unit of the first single press and move the flanging die unit of the other single press towards the flanging bed of the other single press. The retracting movement for opening the single presses can for example be generated electromotively or by means of a mechanical or pneumatic spring device. Arranging two pressure bellows, however, allows the two single presses to be decoupled with regard to the pressing movement, such that one single press can be operated while the other is at rest, or the two single presses can be operated using different cycle times or intervals.

The invention also relates to a method for manufacturing the flanging press, wherein the base structure comprising at least one guiding element which is finished, i.e. produced within the tolerances required for the press, and the flanging die unit comprising at least one guiding counter element which is finished, i.e. produced within the tolerances required for the press, are prepared, and the flanging die is assembled on the flanging die unit. The base structure and the flanging die unit with the flanging die assembled are aligned relative to each other by a guiding engagement between the guiding element and the guiding counter element. The flanging die or the flanging bed is/are finished while the guiding engagement is in effect. Since the guiding element and the guiding counter element are the structures which when the press is subsequently in operation are in the guiding engagement which guides the pressing movement, the flanging bed or the flanging die—preferably, the flanging bed and the flanging die—can be completed by being finished in the guiding engagement of subsequent press operations and therefore also to a high level of precision relative to each other using a base structure which aside from the guiding element is only crudely pre-shaped and as applicable pre-processed and a flanging die which aside from the guiding counter element is only crudely pre-shaped and as applicable pre-processed. Costly reworking and readjusting can be omitted, or at least the effort to be expended on such work is significantly reduced.

In a further development, the suppressor is also provided with at least one finished guiding element but only a crudely shaped and as applicable pre-processed region of the holding-down edge, and is only finished once it is in guiding engagement with one or more guiding elements of the base structure or flanging die unit, preferably the guiding element(s) of the base structure provided for the flanging die unit.

The flanging press can comprise one or more component suckers in order to draw the component onto the flanging bed by means of a suction force. One or more component suckers is/are in particular advantageous when the component is a nested composite comprising for example an outer part and an inner part which are only nested one inside the other or are at least not yet connected to each other sufficiently fixedly before the flange is folded over. Of such a component, the suppressor can usually only hold a structural part directly facing it, for example the inner part of a vehicle door or other vehicle part, while a structural part which faces away from it, such as for example the outer part of a vehicle door or other vehicle part, is held only comparatively loosely. This other structural part can be drawn into the flanging bed and thus fixed relative to the flanging bed by means of the one or more component suckers.

In a further development, the flanging press comprises a large-area component sucker. Said component sucker comprises a suction chamber which is surrounded laterally by side wall structures of the flanging press, preferably side wall structures of the flanging bed, and defined over a large area on an end-facing side by the component. The suction device can always be realised at least when the component comprises a closed surface within the flanging bed, such that the component—in pressure contact with the flanging bed—seals the suction chamber gas-tight, aside from negligible losses, on said end-facing side. The component forms a first end-facing wall structure of the suction chamber. On the end-facing side opposite the component, the flanging bed comprises a second end-facing wall structure which defines the suction chamber. One or more perforations is/are provided in the circumferential side wall structure or preferably in the end-facing wall structure facing opposite the component, wherein the suction chamber can be evacuated through said perforation(s) in order to generate a partial vacuum.

The second end-facing wall structure can comprise a surface which faces the component and is adapted to the contour of the component, such that the component, when suctioned, is supported in regions on the second end-facing wall structure. The support region or regions thus obtained can be shaped and arranged as viewed over the area of the component in such a way that the component is prevented from being warped due to the partial vacuum which prevails in the suction chamber.

In preferred embodiments, the suction chamber is only flat in the pressing direction in order to obtain a small suction chamber volume. The second end-facing wall structure can in particular be shaped such that the interior volume of the suction chamber corresponds to a volume which is obtained, if the geometry of the suction chamber is otherwise unaltered, when the second end-facing wall structure has a uniform distance of at most 10 mm, preferably at most 5 mm, from the component throughout. This virtual comparative volume is obtained if the second end-facing wall structure is considered to conform to the shape of the facing surface of the component, and an identical distance of preferably at most 10 mm, more preferably at most 5 mm and even more preferably at most 3 mm is maintained as viewed over the entire opposing area of the component.

The second end-facing wall structure can in particular be shaped, for example machined, together with a component bearing support of the flanging bed. The second end-facing wall structure can in particular be formed from plastic. A plastic semi-finished product can thus for example be fixedly connected to the flanging bed and, once connected, can be finished in order to obtain the surface which is adapted to the component. Plastic material can instead also be poured into the flanging bed, filling one of its end-facing sides, and—once hardened—can be finished, together with the bearing support of the flanging bed, to conform to the component Figures Particularly advantageous subject-matter which can also be realised separately from the pressure bellows or in particular together with it includes for example the embodiment of the flanging die unit comprising a passage through which a component to be flanged can be inserted at least substantially parallel to the pressing direction and moved up to and into the flanging bed, as well as the embodiments of the suppressor and the transverse mobility of the one or more flanging dies and the embodiment of one or more flanging dies with a ceramic surface, to name but a few examples. Additional subject-matter is disclosed by the aspects below.

The aspects below are worded in the manner of claims. As is usual in claims, reference signs taken from the example embodiments described below are placed in brackets in the aspects. As is also usual in claims, the aspects are not restricted to the specific example embodiments, although the specific embodiments can be adduced for the purpose of substantiation.

Aspect 1: A flanging press for folding over a flange of a component, preferably a vehicle part, wherein the flanging press is arranged in a stationary manner and comprises at least:
(a) a base structure (1) featuring a flanging bed (11) onto which the component (B) can be pressed in a pressing direction (F) in order to fold over the flange (C);
(b) a flanging die unit (2) featuring a flanging die (21) for folding over the flange (C);
(c) and a pressing drive (60) for generating a pressing force which acts on the component (B) for the purpose of folding over;
(d) wherein the flanging die (21) and the flanging bed (11) can be moved relative to each other in the pressing direction (F) by means of the pressing drive (14; 60) in order to exert the pressing force.

Aspect 2: The flanging press according to the preceding aspect, wherein the pressing drive (60) comprises a bellows (60) which can be charged with pressure fluid, preferably pressurised gas, and acts on the flanging die unit (2) or flanging bed (11) in the pressing direction (F) when charged with pressure, thus generating at least some of the pressing force, and the pressure bellows (60) comprises a bellows area (62) which extends transverse to the pressing direction (F) and which can be charged with the pressure fluid.

Aspect 3: The flanging press according to the preceding aspect, wherein the bellows area (62) is large enough that the pressing force necessary for flanging can be applied through the pressure bellows (60) when the pressure bellows (60) is connected to a pressurised air source which delivers pressurised air at a pressure of 20 bars or less, preferably 6 bars or less.

Aspect 4: The flanging press according to any one of the preceding aspects, wherein the pressure bellows (60) is arranged on a rear side of the flanging bed (11) facing away from the flanging die unit (2) or on a rear side of the flanging die unit (2) facing away from the flanging bed (11).

Aspect 5: The flanging press according to any one of the preceding aspects, wherein the pressure bellows (60) acts directly on the flanging bed (11) or the flanging die unit (2) in the pressing direction (F).

Aspect 6: The flanging press according to any one of the preceding aspects, wherein the base structure (1) comprises a framework (13) and a bearing structure (10) which can be moved relative to the framework (13) in the pressing direction (F), the flanging bed (11) is arranged on a front side of the bearing structure (10) which faces the flanging die unit (2), and the pressure bellows (60) is arranged on a rear side of the bearing structure (10) which faces away from the flanging die unit (2).

Aspect 7: The flanging press according to any one of the preceding aspects, wherein the pressure bellows (60) supports either the flanging bed (11) or the flanging die unit (2) on a framework (13) of the base structure (1), such that it/they can be moved in and counter to the pressing direction (F).

Aspect 8: The flanging press according to any one of the preceding aspects, wherein: the pressure bellows (60) comprises a flexible bellows wall (61), a first bellows mounting structure (62; 63) and a second bellows mounting structure (62; 63), one of which can in particular form the bellows area (62) which can be charged with the pressure fluid; the flexible bellows wall (61) encircles a pressing axis which extends in the pressing direction (F); the first bellows mounting structure (62; 63) is arranged on one of the end-facing sides of the flexible bellows wall (61), and the second bellows mounting structure (62; 63) is arranged on the other end-facing side of the flexible bellows wall (61); and the bellows mounting structures (62, 63) are each fixedly connected, preferably in a fluidic seal, to the flexible bellows wall (61).

Aspect 9: The flanging press according to the preceding aspect, wherein at least one of the bellows mounting structures (62, 63) follows the profile of an end-facing side edge of the bellows wall (61), circumferentially around the pressing axis (F), in an end-facing view onto the respective bellows mounting structure (62; 63) either along an outer circumference only or in the form of a thin strip.

Aspect 10: The flanging press according to any one of the preceding two aspects, wherein at least one of the bellows mounting structures (62) closes off the pressure bellows (60) in a fluidic seal on one end-facing side.

Aspect 11: The flanging press according to any one of the preceding three aspects, wherein the flexible bellows wall (61) forms a ring, at least when the pressure bellows (60) is charged with pressure, wherein said ring can in particular be a circular ring or more specifically a circular ring which is adapted to the profile of a flange (C) which extends non-circularly in a plan view of the component (B).

Aspect 12: The flanging press according to any one of the preceding aspects, further comprising a stroke bearing structure (110) which can be moved relative to the base structure (1) and the flanging die unit (2) in and counter to the pressing direction (F), wherein the pressure bellows (60) is indirectly or preferably directly supported on the stroke bearing structure (110) and can be moved together with the stroke bearing structure (110) in order to be able to shorten an expanding stroke of the pressure bellows (60) by way of a movement which the stroke bearing structure (110) and the pressure bellows (60) perform collectively relative to the base structure (1) and the flanging die unit (2).

Aspect 13: The flanging press according to any one of the preceding aspects, wherein one or more filler bodies (109) are arranged in an interior space of the pressure bellows (60) which can be charged with the pressure fluid, and the filler body or bodies (109) reduce the volume of the interior space, as compared to an otherwise identical interior space with no filler bodies, by at least 20%, preferably at least 30%, even more preferably at least 40% or more in relation to the maximally expanded pressure bellows (60) when the flanging press is in operation, in order to reduce the amount of pressure fluid required.

Aspect 14: The flanging press according to any one of the preceding aspects, wherein the first bellows mounting structure (62; 63) according to any one of Aspects 8 to 11 is fastened to a framework (13) of the flanging press or to the stroke bearing structure (110) according to any one of the preceding two aspects, and either the flanging bed (11) or the flanging die unit (2) is supported on the second bellows mounting structure (62; 63).

Aspect 15: The flanging press according to any one of the preceding aspects, further comprising another pressure bellows (60), wherein the at least two pressure bellows (60) are arranged one on top of the other or next to each other in the pressing direction (F).

Aspect 16: The flanging press according to the preceding aspect, wherein the pressure bellows (60) are arranged such that they expand axially in the same pressing direction (F) or axially in mutually opposite pressing directions (F).

Aspect 17: The flanging press according to any one of the preceding two aspects, wherein the pressure bellows (60) can be charged with the same or different pressure fluids or relieved of pressure independently of each other.

Aspect 18: The flanging press according to any one of the preceding aspects, wherein an additional drive (69), preferably a pneumatic additional drive, is provided in addition to the pressure bellows (60), and the additional drive (69) is either coupled to the flanging bed (11) and can move the flanging bed (11) in or counter to the pressing direction (F) or is coupled to the flanging die unit (2) and can move the flanging die unit (2) in or counter to the pressing direction (F).

Aspect 19: The flanging press according to any one of the preceding aspects, wherein the flanging bed (11) or the flanging die unit (2) is arranged over the pressure bellows (60) and can be raised by means of the pressure bellows (60) in order to fold over the flange (C), wherein the pressure bellows (60) can be relieved of pressure by gravity or by means of an additional drive (69) in order to lower the flanging bed (11) or the flanging die unit (2) again.

Aspect 20: The flanging press according to any one of the preceding aspects, wherein the flanging die (21) can be moved relative to the flanging die unit (2) transverse to the pressing direction (F), and a flanging die drive (22) is coupled to the flanging die (21), preferably arranged on the flanging die unit (2), in order to move the flanging die (21) transverse to the pressing direction (F).

Aspect 21: The flanging press according to any one of the preceding aspects, wherein the flanging die unit (2) comprises a bearing structure (20) exhibiting an inner circumference (28) which extends around a pressing axis (F) which points in the pressing direction (F), and multiple flanging dies (21) for folding over the flange (C), and the flanging dies (21) are each supported on the bearing structure (20) in the pressing direction (F) and arranged next to each other along the inner circumference (28) and can be moved relative to the bearing structure (20) transverse to the pressing direction (F) and transverse to the inner circumference (28).

Aspect 22: The flanging press according to the preceding aspect, wherein the flanging dies (21) each exert a pressing force on the flange (C) when the flange (C) is being folded over and are supported in the pressing direction (F) on the inner circumference (28) of the bearing structure (20), and wherein the distance between the pressing force of the respective flanging die (21) and the inner circumference (28) and therefore the respectively effective lever arm per flanging die (21) has a length, as measured in the transverse direction ($Q_i$), of at most 8 cm, preferably at most 5 cm.

Aspect 23: The flanging press according to any one of the preceding two aspects, wherein the inner circumference (28) extends either partially or preferably completely over 360° around the pressing axis (F).

Aspect 24: The flanging press according to any one of the preceding three aspects, wherein one or more first flanging dies (21$_i$) of the flanging dies can be moved relative to the bearing structure (20) transverse to the pressing direction (F) and transverse to the inner circumference (28) in a first transverse direction ($Q_i$), and one or more second flanging dies (21$_k$) of the flanging dies can be moved relative to the bearing structure (20) transverse to the pressing direction (F) and transverse to the inner circumference (28) in a second transverse direction ($Q_k$) which is not parallel to the first transverse direction ($Q_i$).

Aspect 25: The flanging press according to any one of the preceding aspects, wherein the flanging bed (11) is connected to a first abutment (101, 102) such that it cannot be moved in and counter to the pressing direction (F), and the flanging die (21) is connected to a second abutment (103, 104) such that it cannot be moved in and counter to the pressing direction (F), and the flanging bed (11) or the flanging die (21) can be moved in the pressing direction (F) relative to a framework (13) of the base structure (1), until the abutments (101, 102, 103, 104) pass into abutting contact with each other, in order to fold over the flange (C).

Aspect 26: The flanging press according to the preceding aspect, wherein at least one of the abutments (101, 103), preferably the second abutment (103) together with the flanging die (21), can be transversely moved in a transverse direction (Q) which points transverse to the pressing direction (F) and transverse to the flange (C), and at least one of the abutments (101, 103) comprises an abutting area which is inclined with respect to the pressing direction (F) and the transverse direction (Q) such that the transversely movable abutment (103) can be moved in the transverse direction (Q) out of the abutting contact and into a new transverse position.

Aspect 27: The flanging press according to the preceding aspect, wherein the transversely movable abutment (103), in its new transverse position, lies opposite the other abutment (101) at an axial distance in the pressing direction (F), such that the flanging bed (11) or the flanging die (21) can be moved further in the pressing direction (F) up to and into another abutting contact of the abutments (101, 103).

Aspect 28: The flanging press according to any one of the preceding three aspects, wherein the first abutment (102) can be transversely moved relative to the flanging bed (11), counter to a restoring force of a spring device (106), in a transverse direction (Q) which points transverse to the pressing direction (F) and transverse to the flange (C), or the second abutment (104) can be transversely moved relative to the flanging die (21), counter to a restoring force of a spring device (106), in a transverse direction (Q) which points transverse to the pressing direction (F) and transverse to the flange (C).

Aspect 29: The flanging press according to any one of the preceding aspects, wherein the flanging die (21) comprises a first flanging area (21$a$) for pre-flanging and a second flanging area (21$b$) preferably for final-flanging, or a flanging die (21) comprising the first flanging area (21$a$) and another flanging die (21) comprising the second flanging area (21$b$) are arranged on a flanging die support (29), and wherein the flanging areas (21$a$, 21$b$) are arranged either next to each other in a transverse direction (Q) which points transverse to the pressing direction (F) and transverse to the flange (C) or one on top of the other in the pressing direction (F).

Aspect 30: The flanging press according to any one of the preceding aspects, wherein the flanging press comprises a flanging slider (71) which can be moved transverse to the pressing direction (F) in an overlap with the hemming bed (11), in order to be able to fold over a flange (C) into a slot of the component (B).

Aspect 31: The flanging press according to any one of the preceding aspects, wherein the flanging press comprises a component sucker, by means of which the component (B) can be held in position in the flanging bed (11) by a suction force, and the component sucker comprises a suction chamber which is laterally defined by a side wall structure, on the end-facing side of which the flanging bed (11) is arranged or formed, and on an end-facing side by the component (B).

Aspect 32: The flanging press according to the preceding aspect, wherein the suction chamber is defined by an end-facing wall structure on the end-facing side axially opposite the component (B) and can be charged with a partial vacuum through at least one perforation in the end-facing wall structure or the side wall structure.

Aspect 33: The flanging press according to the preceding aspect, wherein the end-facing wall structure is shaped to conform to the surface of the end-facing side of the component (B) which defines the suction chamber, in order to reduce the volume of the suction chamber.

Aspect 34: The flanging press according to any one of the preceding aspects, wherein a guiding element (15) which extends in the pressing direction (F) is provided on the base structure (1), and a guiding counter element (25) which extends in the pressing direction (F) is provided on the flanging die unit (2), and the base structure (1) and the flanging die unit (2) are guided relative to each other in the pressing direction (F), preferably linearly, by means of a guiding engagement between the guiding element (15) and guiding counter element (25).

Aspect 35: The flanging press according to any one of the preceding aspects, wherein the base structure (1) comprises a guiding element (15) which extends in the pressing direction (F) and a bearing structure (10) which can be moved in the pressing direction (F) and on which the flanging bed (11) is supported in the pressing direction (F), preferably fastened to or directly formed on it, and the guiding element (15) is connected, such that it cannot be moved in the pressing direction (F), to the bearing structure (10) and is axially guided relative to a framework (13) of the base structure (1) in a guiding engagement with a guiding counter element (13a) of the framework (13).

Aspect 36: The flanging press according to any one of the preceding aspects, wherein a suppressor (3) is provided for holding down the component (B) during flanging, and the base structure (1) or the flanging die unit (2) comprises a first tensing element (16; 116), and the suppressor (3) comprises a second tensing element (36), which can be brought into tensing engagement with each other in order to tense the suppressor (3) in the pressing direction (F) relative to the flanging bed (11), for holding down the component (B) in the tensing engagement.

Aspect 37: The flanging press according to the preceding aspect, wherein the tensing elements are a constituent part of a tensing coupling which comprises a first coupling structure and a second coupling structure, wherein the first coupling structure is connected, such that it cannot be moved in relation to the pressing direction (F), to the base structure (1), preferably a framework (13) or a bearing structure (10) of the base structure (1) which can be axially moved, or to the flanging die unit (2), and the second coupling structure is connected, such that it cannot be moved in relation to the pressing direction (F), to the suppressor (3), and one of the coupling structures mounts one of the tensing elements such that it can be moved back and forth transverse to the pressing direction (F), and the other of the tensing elements (116) is a recess or cavity in the other coupling structure, and wherein the transversely movable tensing element can be moved transverse to the pressing direction (F) into the recess or cavity, preferably linearly, in order to establish the tensing engagement.

Aspect 38: The flanging press according to the preceding aspect, wherein one of the coupling structures, preferably the coupling structure which mounts the transversely movable tensing element, comprises a receptacle which the other coupling structure can enter, in or counter to the pressing direction (F), such that the transversely movable tensing element and the tensing element (116) which is formed as a recess or cavity are situated in the region of the receptacle, and the transversely movable tensing element is charged, either constantly or only in order to establish the tensing engagement, with a force which acts transverse to the pressing direction (F).

Aspect 39: The flanging press according to Aspect 36, wherein the tensing elements (16, 36) co-operate in the manner of a screw and a nut, wherein one of the tensing elements (16, 36) rises in or counter to the pressing direction (F) about a rotational axis, and the other of the tensing elements (16, 36) slides on the rising area or line when the tensing elements (16, 36) are rotated about the rotational axis relative to each other.

Aspect 40: The flanging press according to Aspect 34 or 35 and any one of the preceding four aspects, wherein one of the tensing elements (16; 116) is supported in the pressing direction (F) on the guiding element (15) or is formed directly by the guiding element (15).

Aspect 41: The flanging press according to the preceding aspect, wherein one of the tensing elements (16) is detachably and preferably exchangeably connected to the guiding element (15) or can be moved relative to the guiding element (15) in order to make it easier to adapt to different suppressors (3).

Aspect 42: The flanging press according to any one of the preceding aspects, wherein the flanging die (21) comprises a ceramic surface (21a, 21b) via which it presses against the flange of the component (B) during flanging.

Aspect 43: The flanging press according to the preceding aspect, wherein the flanging die (21) consists of a ceramic material.

Aspect 44: The flanging press according to any one of the preceding aspects, wherein the flanging die (21) comprises a protective ceramic layer on a surface (21a, 21b) via which it presses against the flange of the component (B) during flanging.

Aspect 45: The flanging press according to the preceding aspect, wherein the coating is embodied using a thin-film technique, preferably by means of a PVD or CVD method, or using a thick-film technique, preferably by means of a thermal spraying method.

Aspect 46: The flanging press according to any one of the preceding aspects, further comprising a suppressor (3) for holding down the component (B) during hemming, said suppressor (3) comprising a fastening device (34) for fastening to an actuator which can be spatially moved, and a holding device for holding the component (B), such that the component (B) can be moved to the flanging press and placed into the flanging bed (11) by means of the suppressor (3).

Aspect 47: The flanging press according to the preceding aspect, wherein the base structure (1) or the flanging die unit (2) comprises a guiding element (15) and the suppressor (3) comprises a guiding counter element (35) in order to guide the suppressor (3), preferably in the pressing direction (F), relative to the flanging bed (11) by means of a guiding engagement between the guiding element (15) and the guiding counter element (35) of the suppressor (3) while it is inserting the component (B), wherein the guiding element (15) for the suppressor (3) is preferably also the guiding element (15) of Aspect 34 for the flanging die unit (2).

Aspect 48: The flanging press according to any one of the preceding aspects, wherein:
a suppressor (3), preferably a suppressor (3) according to any one of the preceding two aspects, is provided for holding down the component (B) during flanging;
the suppressor (3) comprises a holding-down edge (31) for contacting the component (B), and a region which borders the holding-down edge (31);
and the region of the suppressor (3) which borders the holding-down edge, and the at least one flanging die (21), are shaped such that the at least one flanging die (21) can overlap
the holding-down edge (31) of the suppressor (3) transverse to the pressing direction (F) and transverse to the flange during flanging.

Aspect 49: The flanging press according to the preceding aspect and at least one of the following features:
(i) in the region which borders the holding-down edge (31), the suppressor (3) comprises a region (32) which protrudes transverse to the pressing direction (F) and a region (33) which is retracted transverse to the pressing direction (F), and the flanging die (21) similarly comprises a region which protrudes transverse to the pressing direction (F) and a region which is retracted transverse to the pressing direction (F), such that the flanging die (21) and the suppressor (3) can interlock transverse to the pressing direction (F) and to the flange during flanging;
(ii) the suppressor (3) is angled away (37) from the flanging die (21) in the region which borders the holding-down edge (31), such that the flanging die (21) can overlap the holding-down edge (31) on its rear side during flanging.

Aspect 50: The flanging press according to any one of the preceding aspects, wherein the flanging die (21) comprises a first flanging area (21a) for folding over the flange by a first angle and a second flanging area (21b) for folding over the flange by another angle, and the first flanging area protrudes beyond the second flanging area transverse to the pressing direction (F) towards a free front end of the flanging die (21).

Aspect 51: The flanging press according to any one of the preceding aspects, wherein the flanging die unit (2) comprises a passage (20a) through which the component (B) can be inserted into the flanging bed (11) from a rear side of the flanging die unit (2) which faces away from the flanging bed (11), and the flanging die (21) is arranged on an inner circumference (28) of the flanging die unit (2) which surrounds the passage (20a) partially or preferably completely over 360° of its circumference, wherein multiple flanging dies (21) are preferably arranged next to each other along the inner circumference (28), wherein the flanging die unit (2) preferably comprises a frame-like bearing structure (20) which surrounds the passage (20a) at least partially and preferably completely over 360° of its circumference, in the manner of a frame.

Aspect 52: The flanging press according to the preceding aspect, wherein the inner circumference (28) follows the contour of the flange (C) close-to-contour, as viewed in a plan view in the pressing direction (F), and in an axial projection onto the flanging bed (11) exhibits a distance (d) from the contour of the flange (C) of at most 8 cm, preferably at most 6 cm, over the entire length of the flange (C) respectively.

Aspect 53: The flanging press according to any one of the preceding aspects, wherein the base structure (1) and the flanging die unit (2) are at least substantially installed vertically upright or mounted such that they can be installed vertically upright, such that the flanging bed (11) points in the pressing direction (F) which in such embodiments is at least substantially horizontal.

Aspect 54: The flanging press according to the preceding aspect, further comprising at least:
an additional flanging bed (12) which is provided on the base structure (1) or on an optional additional base structure (8) and onto which an additional component (B) can be pressed in a pressing direction (−F) which is opposite to the pressing direction (F) in order to fold over a flange of the additional component (B);
an additional flanging die unit (4) which faces the additional flanging bed (12) and comprises an additional flanging die (41) for folding over the flange of the additional component (B);
wherein the flanging beds (11, 12) are arranged between the flanging die units (2, 4) in the pressing direction (F) and the additional flanging die (41) and the additional flanging bed (12) can be moved relative to each other in the pressing direction (F) by means of the pressing drive (14), in order to also exert a pressing force on the additional component (B).

Aspect 55: The flanging press according to any one of the preceding aspects, wherein either the flanging die unit (2) is mounted on the base structure (1) such that it can be moved in the pressing direction or the base structure (1) is mounted on the flanging die unit (2) such that it can be moved in the pressing direction (F).

Aspect 56: The flanging press according to any one of the preceding aspects, wherein the base structure (1) and the flanging die unit (2) and therefore the flanging die (21) and the flanging bed (11) can be moved relative to each other in the pressing direction (F) by means of the pressing drive (14), in order to exert the pressing force, wherein the flanging die (21) is supported in the pressing direction (F) on the flanging die unit (2), preferably arranged such that it cannot be moved in the pressing direction (F).

Aspect 57: The flanging press according to any one of the preceding aspects, wherein the flanging bed (11) and the flanging die unit (2) are mounted such that they can be rotated or pivoted about an axis which is at least substantially horizontal.

Aspect 58: A method for folding over a flange of a component, preferably a vehicle part, by means of a flanging press according to any one of the preceding aspects, wherein
(a) the component (B) is moved through the passage (20a) according to Aspect 51 towards the flanging bed (11), preferably up to and against the flanging bed (11), by means of an actuator which can be spatially moved
(b) and placed, preferably pressed, into the flanging bed (11) by means of the actuator or a tensing device (16, 36; 116),
(c) and the flange (C) is folded over by a pressing stroke which the flanging die unit (2) performs together with the flanging die (21).

Aspect 59: The method according to the preceding aspect, wherein
(d) a suppressor (3) according to any one of Aspects 36 to 41 and 46 to 49 is fastened to the actuator and holds the component (B) while it is moved through the passage (20a) and inserted into the flanging bed (11)
(e) and holds it down in the flanging bed (11) during flanging.

Aspect 60: A method for folding over a flange of a component, preferably a vehicle part, by means of a flanging press according to any one of the preceding aspects, wherein:
(a) the pressure bellows (60) is supported on the stroke bearing structure (110), in accordance with Aspect 12;
(b) either the flanging die unit (2) or the flanging bed (11) performs a stroke movement relative to a framework (13) of the flanging press in order to fold over the flange (C) of the component (B) lying in the flanging bed (11);
(c) and the stroke movement is composed of a stroke which the stroke bearing structure (110) performs together with the pressure bellows (60) and an expanding stroke of the pressure bellows (60).

BRIEF DESCRIPTION OF THE DRAWINGS

Example embodiments of the invention are described below on the basis of figures. Features disclosed by the example embodiments, each individually and in any combination of features, advantageously develop the subject-matter of the claims and the embodiments and aspects described above. There is shown:

DETAILED DESCRIPTION OF THE INVENTION

Figure 1:
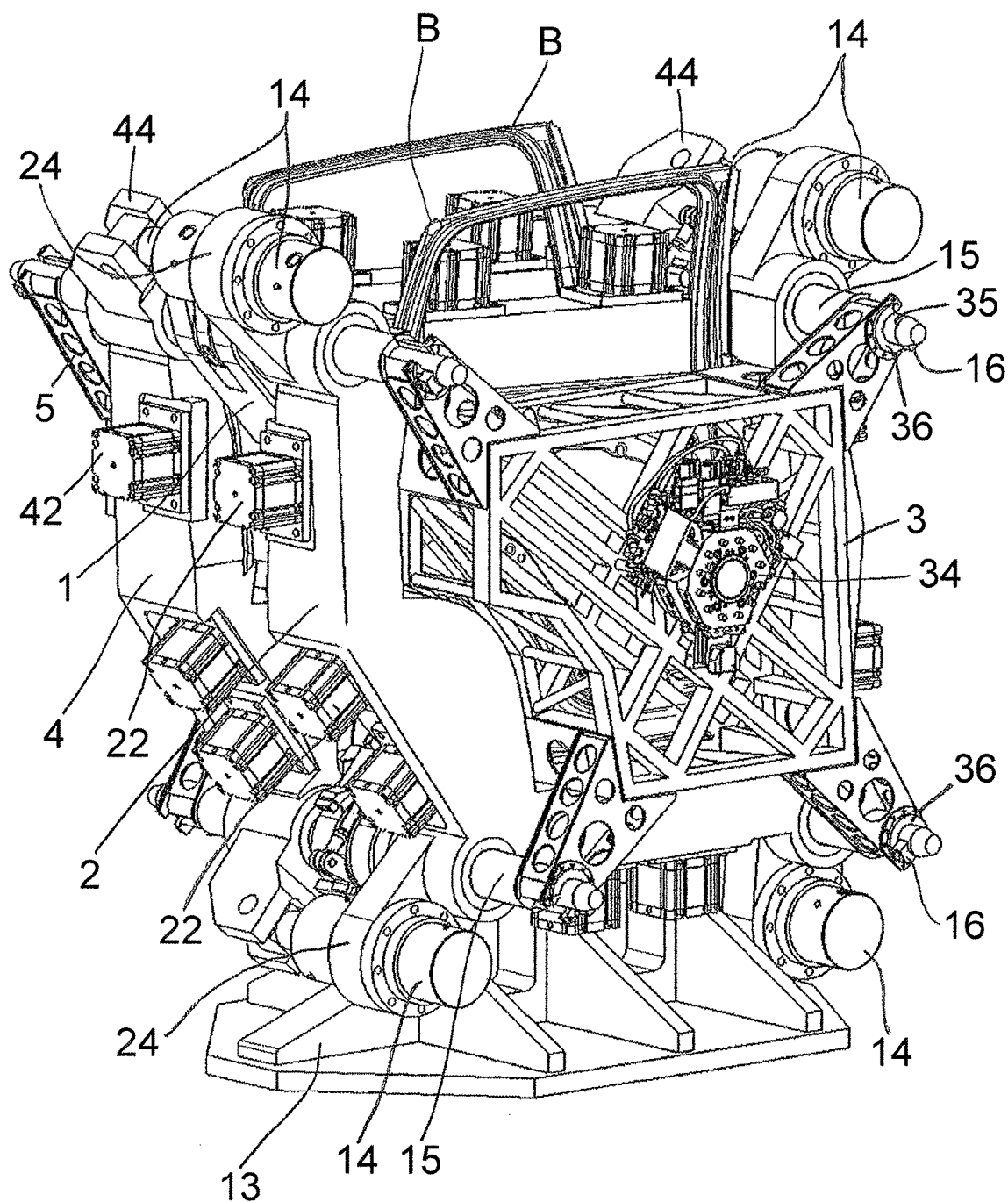
FIG. 1 a flanging press in a first example embodiment.

FIG. 1 shows a flanging press of a first example embodiment. The flanging press is embodied as a dual press, i.e. it comprises a first flanging press and a second flanging press which are arranged next to each other in a sandwich arrangement, back-to-back and upright. The press is arranged in a stationary manner in the production plant.

Figure 2:
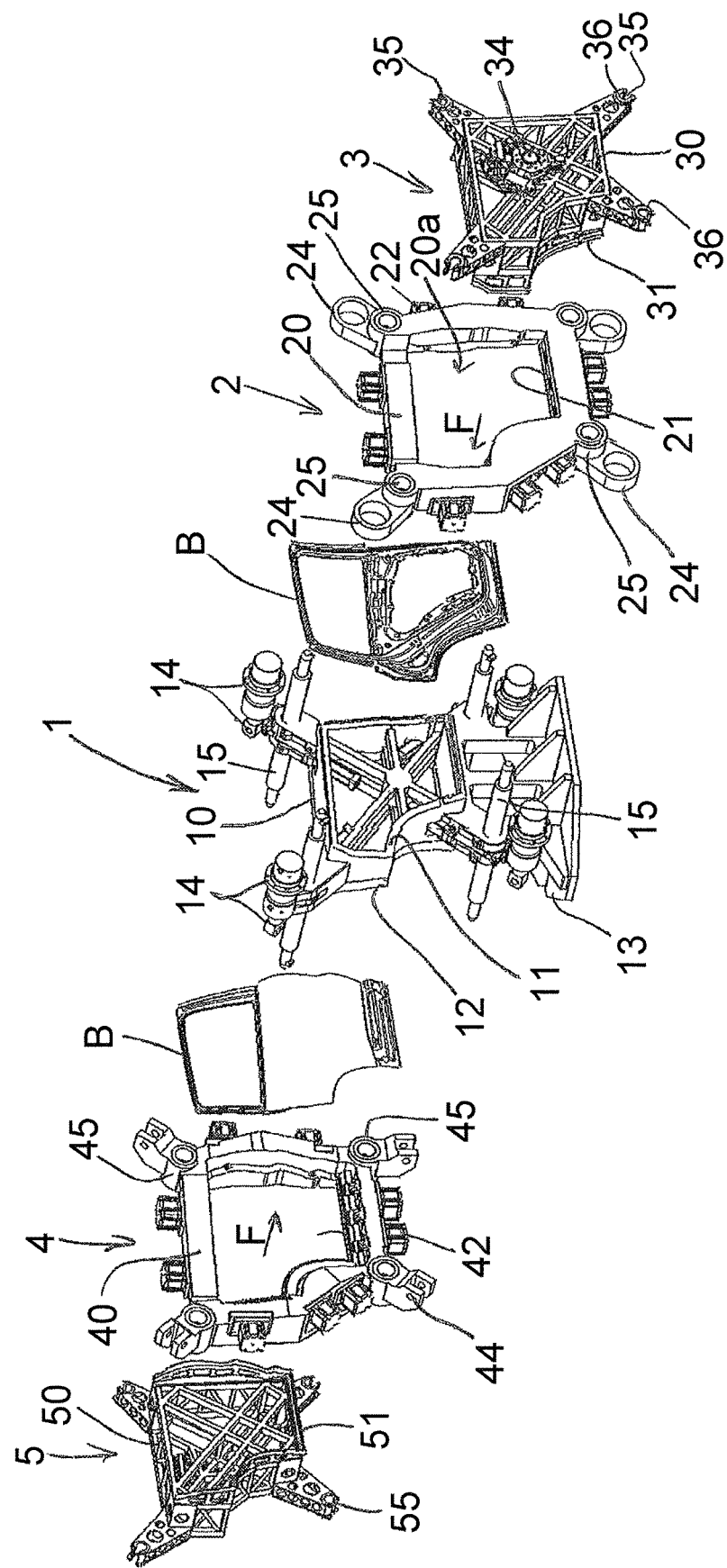
FIG. 2 the flanging press, separated into its main components.

FIG. 2 shows the flanging press separated into its main components, wherein the main components are lined up parallel to a pressing direction F. Said main components include a base structure 1 which is centrally arranged in relation to the pressing direction F, a first flanging die unit 2 which is arranged to the right of the base structure 1, a first suppressor 3, a second flanging die unit 4 which is arranged to the left of the base structure 1, and a second suppressor 5. Two components B can be simultaneously flanged using the press. The components are for example the left-hand door B and the right-hand door B of a passenger car. In the case of such components, an outer part and an inner part of the respective component are joined by flanging, i.e. by creating a hemmed connection.

The base structure 1 comprises a bearing structure 10, to the right of which—facing the flanging die unit 2—a first flanging bed 11 for receiving the component B is formed or fixedly assembled, and to the left of which—facing the flanging die unit 4—a second flanging bed 12 for receiving the other component B is formed or fixedly assembled. During flanging, one of the components B lies in the flanging bed 11 and the other component B lies in the flanging bed 12, as can be seen for example in FIG. 8. During flanging, the components B are supported by the respectively assigned flanging bed 11 or 12. The flanging beds 11 and 12 absorb the pressing force which acts on the respective component B in the pressing direction F and/or opposite direction, during flanging. The base structure 1 also comprises a framework 13 on which the bearing structure 10 rests and which is for example formed as a pedestal. The base structure 1, together with the framework 13, can be arranged vertically on a floor of the production plant.

The press is aligned vertically upright. Correspondingly, the flanging beds 11 and 12 point to the sides, the flanging bed 11 to the right and the flanging bed 12 to the left. The pressing direction F is correspondingly a horizontal direction. As illustrated inter alia by FIG. 1, installing the press vertically significantly reduces the installation area of the press as compared to a press which is arranged horizontally, as is usual in the prior art, such that the flanging beds 11 and 12 would point upwards and downwards. A press in accordance with the invention, for example for conventionally sized vehicle doors, requires an installation area of less than two meters by two meters, advantageously about 1.5 meters by 1.2 meters, while current presses for flanging vehicle doors require an installation area of about 2.7 meters by 2.7 meters due to the horizontal arrangement of the flanging bed.

Figure 8:
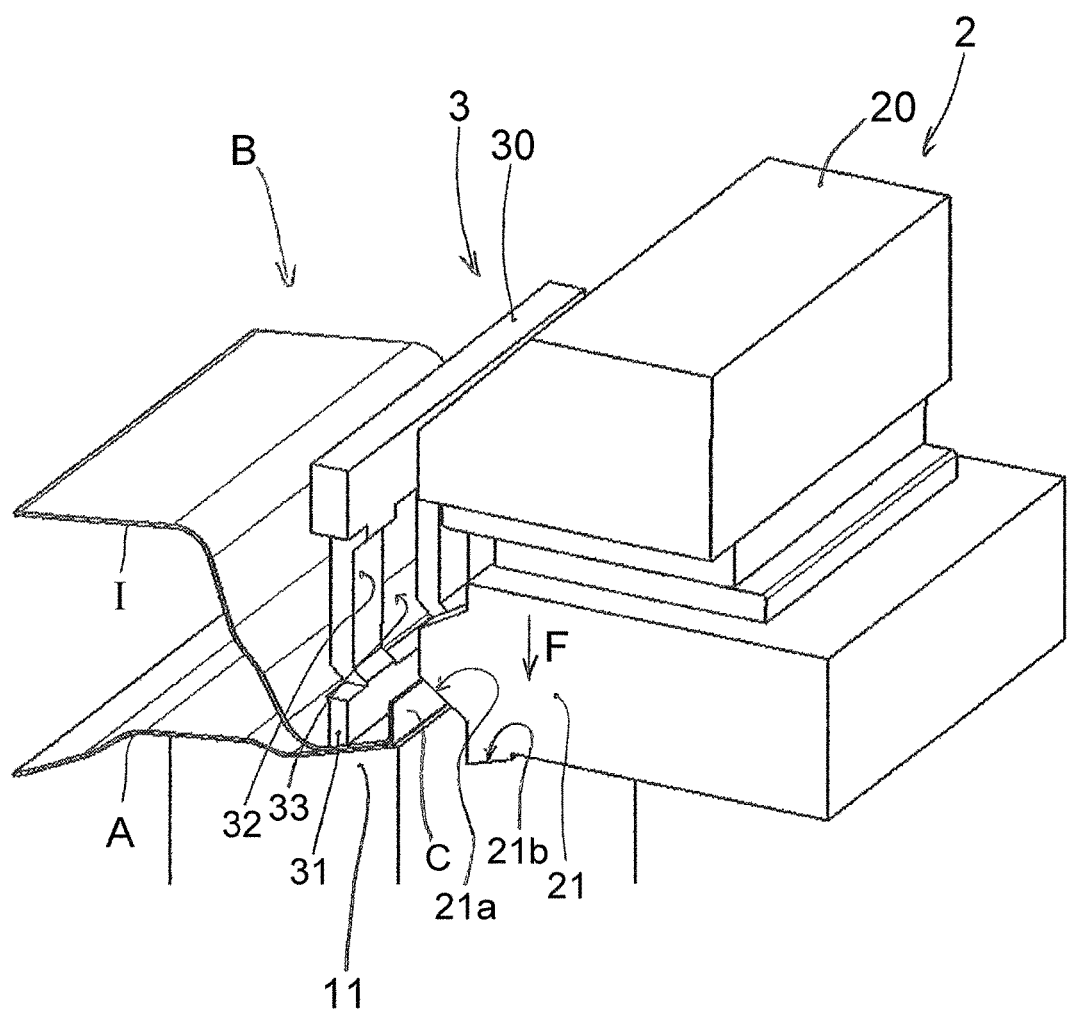
FIG. 8 a flanging die and a suppressor of a first variant.

FIG. 8 shows a flange region of the component B in which the flanging bed 11 and the flanging die unit 2 co-operate to join an outer part A and an inner part I to form a component B, a vehicle door, by folding over a flange C on the edge of the outer part A, such that an edge of the correspondingly positioned inner part I protrudes into a hemmed pocket of the outer part A which is thus created, and the parts A and I are fixed relative to each other by the hemmed connection thus created. A free front holding-down edge 31 of the suppressor 3 presses the two parts A and I in the pressing direction F, into the flanging bed 11. The flanging die unit 2 comprises a bearing structure 20 and multiple flanging dies 21 which are arranged on the bearing structure 20 along the flange C to the folded over, wherein the flanging dies 21 of the flanging die unit 2 press against the flange C in the case of a pressing stroke in the pressing direction F and thereby fold it over, as described further below.

In principle, it is not necessary to distinguish between a pressing direction and an opposite pressing direction. The opposite direction is the pressing direction of the flanging bed, such that only "pressing direction" is mentioned in the following. At most, a distinction is made when the movement direction of the flanging die unit or, in alternative embodiments, the movement direction of the flanging bed is to matter.

Figure 3:
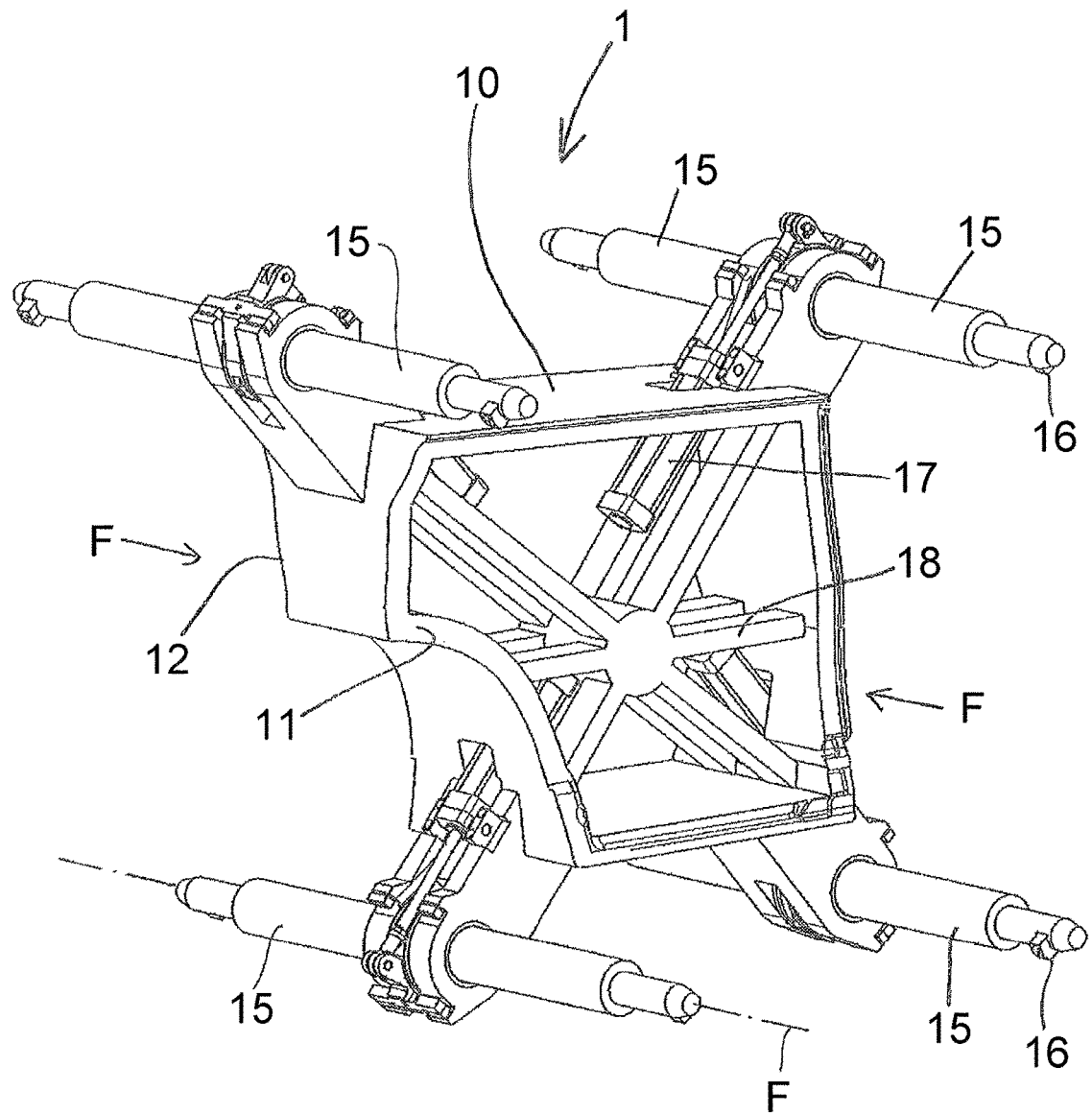
FIG. 3 a base structure of the flanging press.
Figure 4:
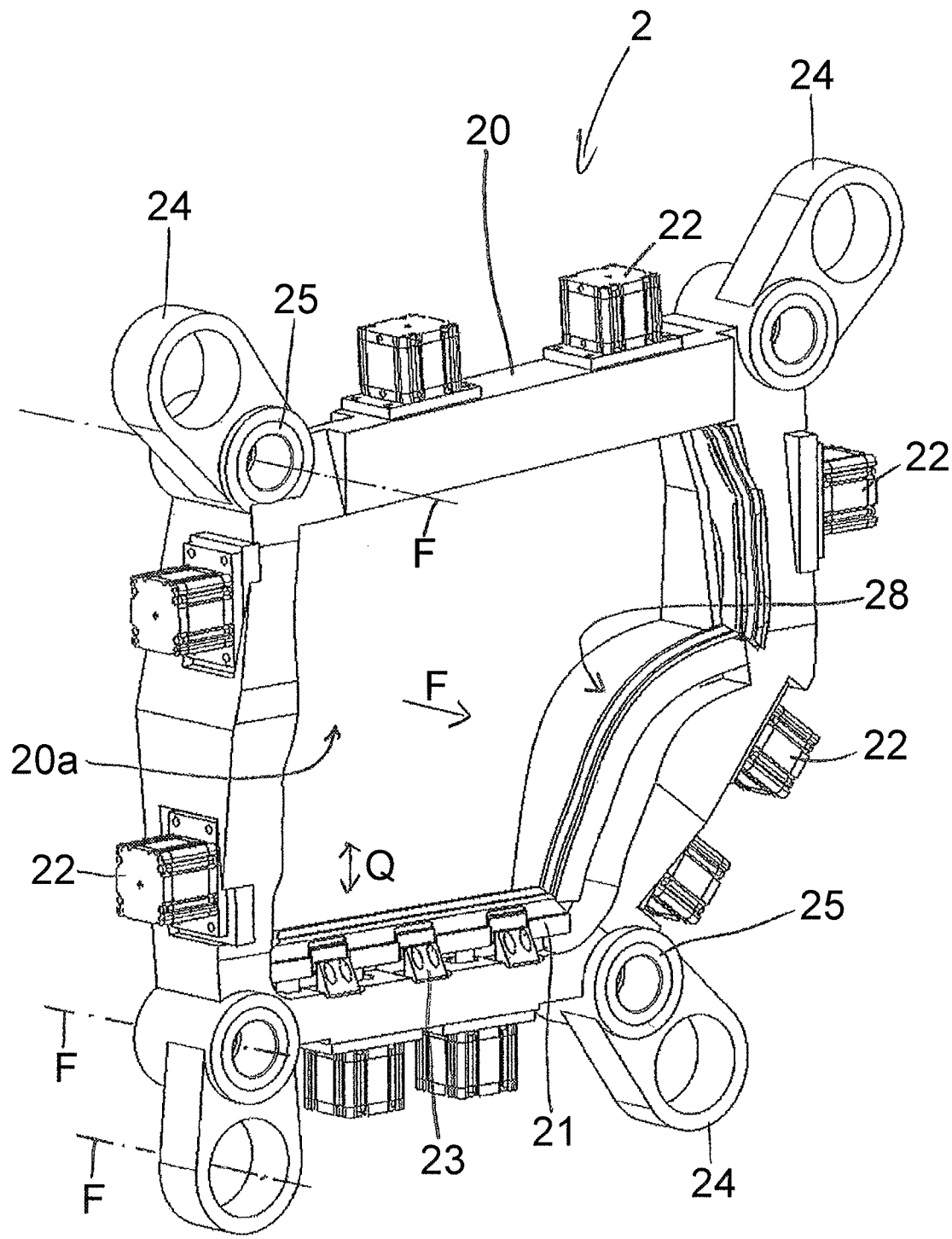
FIG. 4 a flanging die unit of the flanging press.
Figure 5:
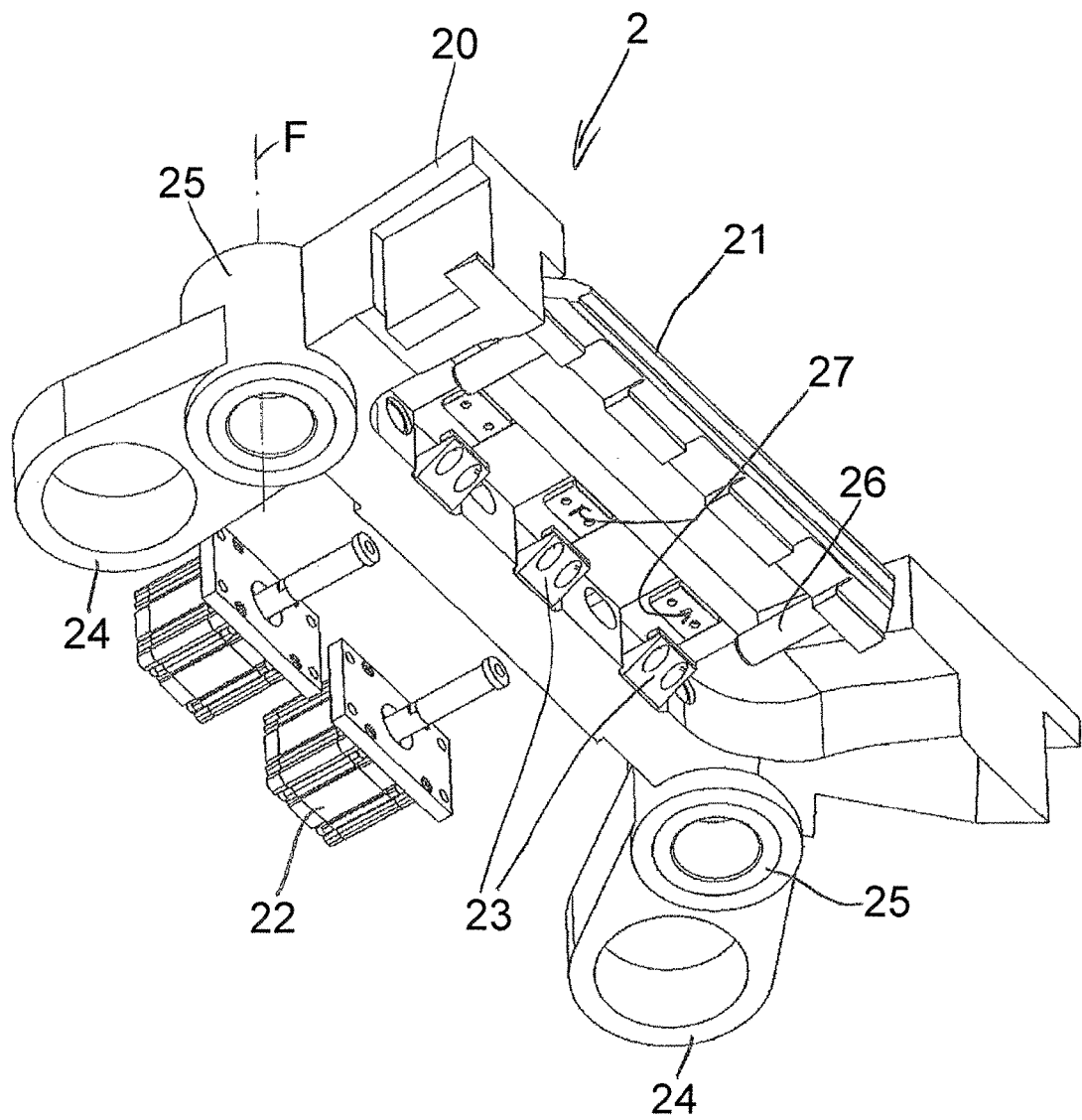
FIG. 5 a part of the flanging die unit.
Figure 6:
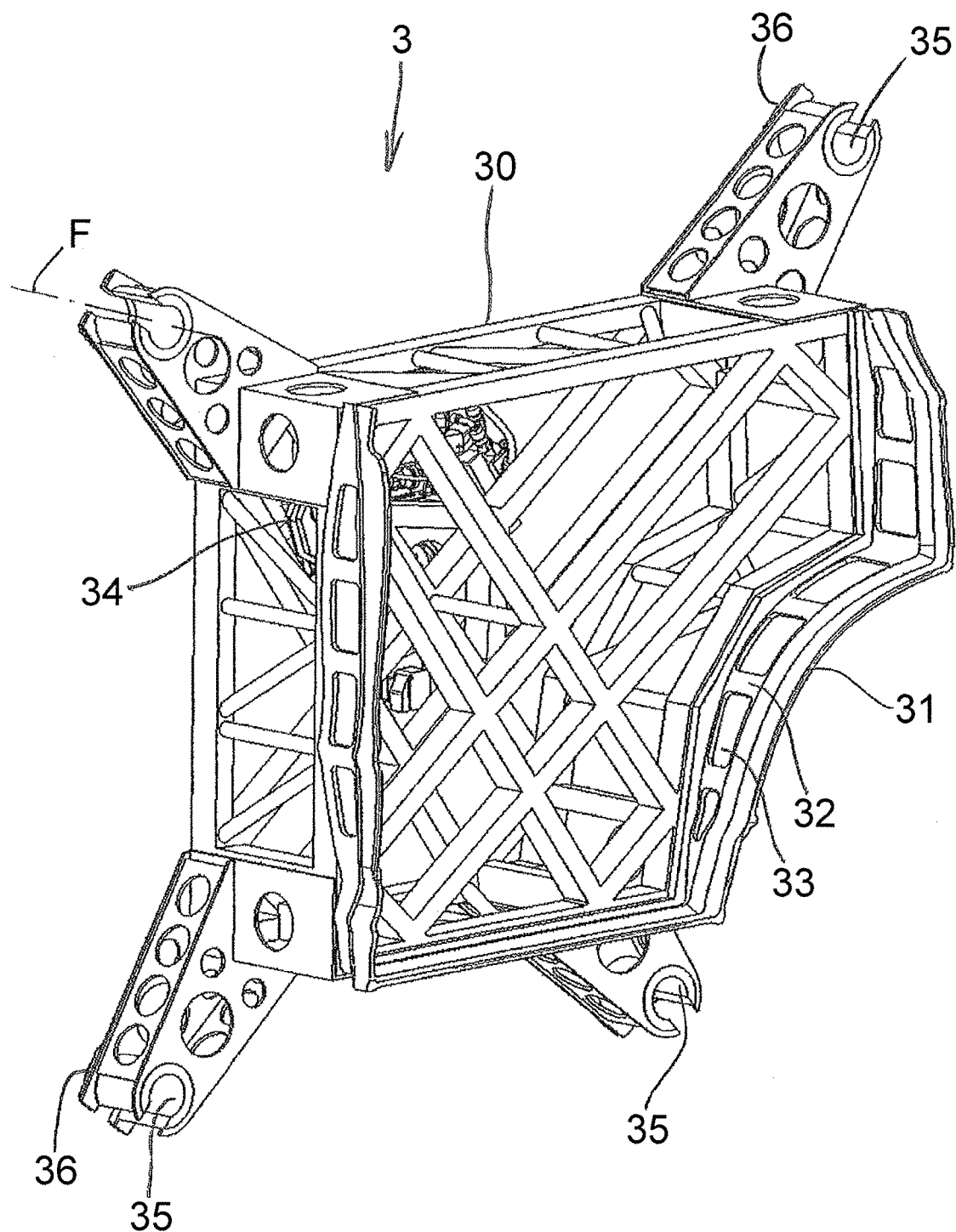
FIG. 6 a suppressor of the flanging press.
Figure 7:
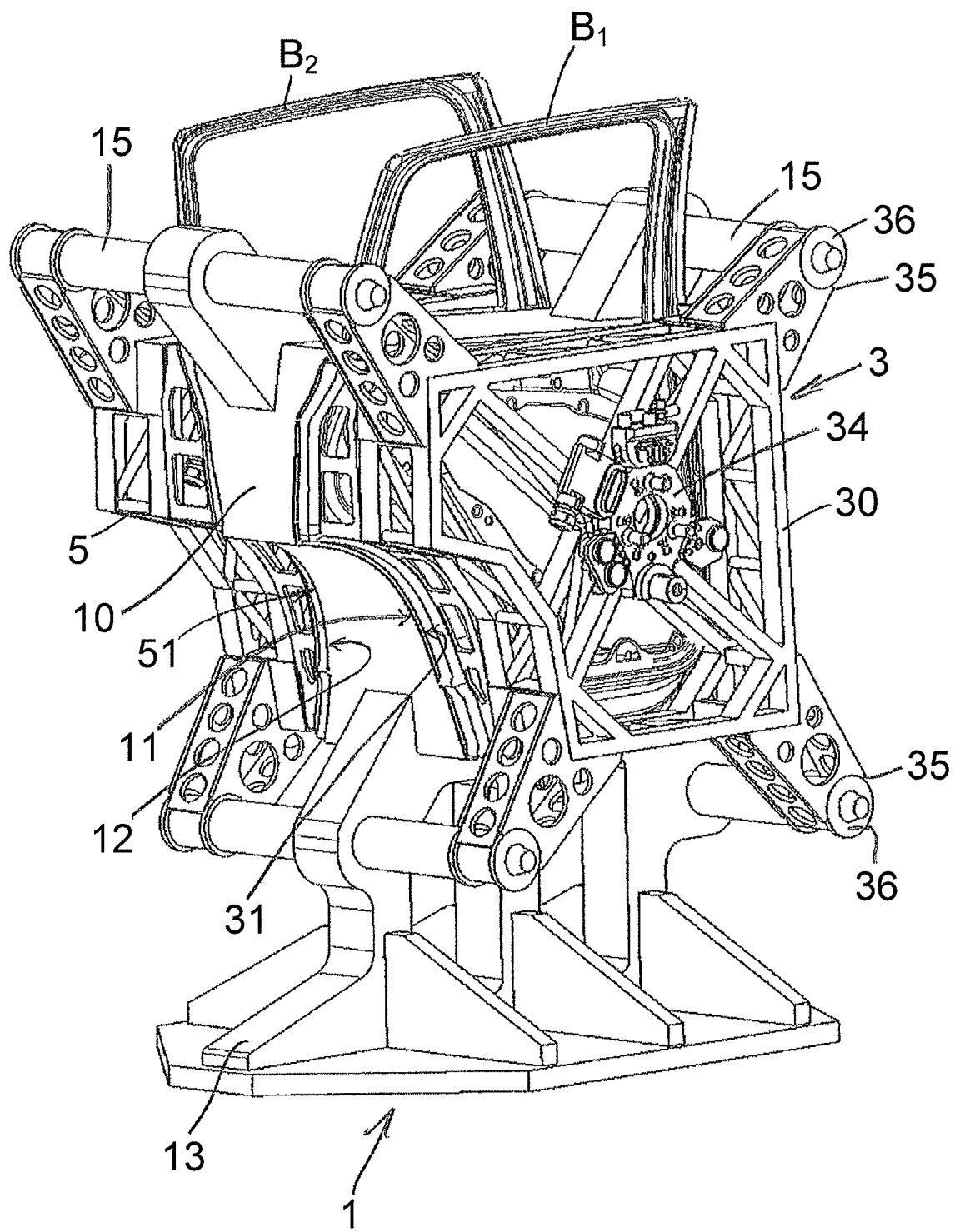
FIG. 7 the flanging press including the suppressor but not the flanging die unit.

FIGS. 3, 4 and 6 show the main components—the base structure 1 without the framework 13; the flanging die unit 2; and the suppressor 3—individually. FIG. 5 also shows a part of the flanging die unit 2 in an enlarged representation. FIG. 7 shows the press as in FIG. 1, with the components B received. In order to illustrate the interaction between the suppressors 3 and 5 and the flanging beds 11 and 12 and also the flanging die units' 2 and 4, the press is shown without the flanging die units 2 and 4.

As can be seen in FIG. 3, the base structure 1 comprises multiple guiding elements 15 in a distribution around the flanging beds 11 and 12, wherein the guiding elements 15 each extend in the pressing direction F. The pressing movement is a linear movement; the pressing direction F is correspondingly indicated in FIG. 3 as a pressing axis F, and the guiding elements 15 are correspondingly linear guides. The guiding elements 15 are each circular-cylindrical, as is preferred but merely by way of example, over at least the majority of their length.

The flanging beds 11 and 12 are formed on the two end-facing sides of the bearing structure 10 which face away from each other, or are assembled as separately formed flanging beds 11 and 12 on the bearing structure 10. The bearing structure 10 as a whole is shaped as a frame and contoured to match the profile of the flanging beds 11 and 12.

The guiding elements 15 are mounted by the bearing structure 10—in the example, on extensions which project from the bearing structure 10—such that they can each be rotated about an axis which is parallel to the pressing direction F and likewise indicated as F in FIG. 3, wherein the guiding elements 15 can be rotationally motor-driven by means of tensing drives 17. Each of the guiding elements 15 comprises a radially projecting tensing element 16 near its free axial end. The tensing elements 16 serve to tense the two suppressors 3 and 5 in the pressing direction F relative to the respectively assigned flanging bed 11 or 12.

The bearing structure 10 is reinforced, in an inner region which it frames, by means of a reinforcement 18. The reinforcement 18 is formed by multiple reinforcing crosspieces which extend from the centre to the inner circumference of the bearing structure 10 in the shape of a star, some of which extend outwards beyond the bearing structure 10 in order to form said extensions on which the guiding elements 15 are arranged. The tensing drives 17 are also supported on the reinforcing crosspieces.

FIG. 4 shows the flanging die unit 2. The flanging die unit 2 comprises a bearing structure 20 which is shaped like a frame such that it follows the profile of the assigned flanging bed 11. The frame-like bearing structure 20 surrounds a central passage 20a which remains free. Multiple flanging dies 21 are arranged next to each other along the inner circumference 28 of the bearing structure 20 which surrounds the passage 20a. Only one of the flanging dies 21 is shown. The flanging dies 21 are arranged along the inner circumference on the side of the bearing structure 20 which faces the flanging bed 11, each in the manner shown by way of example for the flanging die 21.

The flanging dies 21 are each shaped as beams. They are each supported on the bearing structure 20 such that they cannot be moved counter to the pressing direction F, i.e. on an end-facing area of the bearing structure 20 in an axial abutting contact. The abutting contact can best be seen in FIG. 5. Multiple abutting pieces are fastened to the bearing structure 20 in order to form an abutting area 27. Supporting elements 23 are also fastened to the bearing structure 20 and lie axially opposite the abutting area 27. When assembled, the flanging dies 21 are each axially trapped between the abutting area 27 and at least one support 23. The supports 23 absorb the torque which acts on the flanging dies 21 during flanging, i.e. they serve as torque supports. The supports 23 could for example be replaced with a groove which is worked into the bearing structure 20.

The flanging dies 21 can however be moved back and forth relative to the bearing structure 20 in a transverse direction Q transverse to the pressing direction F. Due to their distribution over the inner circumference of the bearing structure 20, the flanging dies 21 can be moved in different transverse directions Q, namely one transverse direction Q per flanging die 21. During the transverse movement, they are linearly guided between the abutments 27 and the supports 23 and then through guides 26. In one modification, either the guides 26 can replace the supports 23 or the supports 23 can replace the guides 26. The flanging dies 21 are each coupled to at least one—in the example embodiment, two—flanging die drives 22 in order to be able to generate the transverse movements of the flanging dies 21. The flanging die drives 22 are linear stroke drives, for example pneumatic drives. The coupling is direct, as is preferred but merely by way of example, in that the movable component of the respective flanging die drive 22—in the example, the piston—is connected, such that it cannot be moved in the direction of its mobility, to the assigned flanging die 21.

The flanging die unit 2 comprises multiple guiding counter elements 25, one for each of the guiding elements 15 of the base structure 1 respectively. The guiding counter elements 25 cannot be moved relative to the bearing structure 20 and can be formed in one piece with the bearing structure 20 or fixedly joined to the bearing structure 20. The guiding counter elements 25 are formed as hollow-cylindrical guides which conform to the guiding elements 15. In a guiding engagement, the guiding elements 15 protrude through the guiding counter elements 25 in the pressing direction F and form a narrow-tolerance guiding engagement with them, in which the flanging die unit 2 is exactly guided relative to the assigned flanging bed 11 in the pressing direction F during the pressing stroke and the return stroke.

The second flanging die unit 4 corresponds to the flanging die unit 2 in all the features disclosed herein. The flanging die units 2 and 4, as also the flanging beds 11 and 12, differ from each other only to the extent necessitated by the geometric differences between the components B. The functionally identical structures and elements of the flanging die unit 4 are provided with the corresponding reference numerals in FIG. 2, namely 40 for the bearing structure, 41 for the flanging dies, 42 of the flanging die drives, etc., i.e. reference signs respectively raised by the number 20 for functionally identical components.

The press comprises a hydraulic pressing drive 14 which is shown in FIGS. 1 and 2. The pressing drive 14 is formed by multiple hydraulic linear stroke drive units—in the example embodiment, four such units. The drive units 14 are arranged in a distribution over the outer circumference of the flanging beds 11 and 12, such that the pressing force necessary for flanging is uniformly distributed over the profile of the flanging beds 11 and 12 and therefore of the flange C (FIG. 8). The drive units 14 each comprise a cylinder and a piston which is guided in the respective cylinder. Of these two drive elements which can be linearly moved in the pressing direction F relative to each other, one is respectively connected, such that it cannot be moved axially, to the flanging die unit 2 and the other is respectively connected, such that it cannot be moved axially, to the flanging die unit 4. A relative movement between the pistons and the cylinders of the drive units 14 therefore either moves the flanging die units 2 and 4 in the respective pressing direction towards each other and towards the respectively assigned flanging bed 11 or 12 or away from each other and away from the respectively assigned flanging bed 11 or 12, correspondingly performing the pressing stroke and return stroke. The flanging die units 2 and 4 can each be tensed away from the respectively assigned flanging bed 11 or 12 into an end position by means of a spring device. In such a drive variant, the pressing drive 14 generates the pressing stroke of the flanging die units 2 and 4 respectively counter to the restoring spring force of the respective spring device. Instead of or in addition to being sprung, the flanging die units 2 and 4 can also be damped. In principle, however, neither a spring device nor a damping device is absolutely necessary.

The flanging die units 2 and 4 comprise drive flanges 24 and 44, namely one drive flange 24 or 44 per drive unit 14, respectively. The drive flanges 24 of the flanging die unit 2 are connected, such that they cannot be moved axially, to one of the two drive elements of the respective drive unit 14, and the drive flanges 44 of the flanging die unit 4 are connected, such that they cannot be moved axially, to the other drive element of the respective drive unit 14 in each case.

As has already been briefly described on the basis of FIG. 8, the components B are pressed into the respective flanging bed 11 or 12 by means of the suppressors 3 and 5 and thus fixed for flanging. FIG. 1 shows the suppressors 3 and 5 on the press, each fulfilling its holding-down function. FIG. 6 shows the suppressor 3, by way of representation for the suppressor 5 also, on its own, i.e. separated off from the press. The suppressor 3 comprises a bearing structure 30 which, as is preferred but merely by way of example, is joined from sheet metal profiles or other types of struts. As viewed in its entirety, the bearing structure 30 is a lattice. A side of the suppressor 3 which faces the flanging bed 11 comprises a holding-down edge 31 via which the suppressor 3 presses against the component B and thus holds it down in the flanging bed 11 during flanging.

The side of the suppressor 3 which faces away from the flanging bed 11 during flanging comprises a fastening device 34 for fastening to the end of an actuator which can be spatially moved, preferably a robot arm of for example an industrial robot. The fastening device 34 can in particular be a docking device for automatically docking with and undocking from the actuator. In addition to a device for fastening to the actuator, the docking device can also comprise a media port, for example for supplying the suppressor with electrical energy or connecting the suppressor to a pressure device or suction device, in particular for connecting one or more suckers if such a grabber is a constituent part of the suppressor. The suppressor 3 also comprises a holding device (not shown), by means of which the respective component B can be held on the suppressor 3. The holding device can in particular comprise one or more pneumatic suckers or one or more mechanical grabbers. The suppressor 3 is correspondingly designed for holding the respective component $B_1$ in a position relative to the holding-down edge 31 which is suitable for flanging, and inserting it into the flanging bed 11 in this state, by means of the suppressor 3. The suppressor 3 can therefore fulfil the holding-down function and an inserting function, i.e. it can serve as a holding-down and inserting tool. In series production, it preferably also serves as a picking-up and/or grabbing tool, in that the robot—with the suppressor 3 fastened to its robot arm—picks up the respective component B, moves it to the press and guides it through the central passage of the flanging die unit 2 up to the flanging bed 11 and also then places the component B into the flanging bed 11 and holds it down. The holding-down edge 31 of the suppressor 3 remains in pressure contact with the component B during the entire flanging process. Once flanging is complete, the component B is taken out of the flanging bed 11 by means of the suppressor 3 and transported to a depository station. The suppressor 3 is then free again to pick up the next component B.

In order to relieve the robot while it is inserting the component B, the suppressor 3 comprises multiple guiding counter elements 35 in a distribution over the outer circumference of the bearing structure 30, wherein the guiding counter elements 35 are in guiding engagement with the guiding elements 15 of the base structure 1 while the component B is being inserted. The robot merely has to move the suppressor 3 into guiding engagement with the guiding elements 15, i.e. thread the guiding counter elements 35 of the suppressor 3 into guiding engagement with the guiding elements 15 and then move the suppressor 3 in the pressing direction F in the guiding engagement.

In order to also relieve the robot of the holding-down function, the suppressor 3 is fitted with tensing counter elements 36 which tense the suppressor 3 towards the flanging bed 11 in a tensing engagement with the tensing elements 16 of the base structure 1 (FIGS. 1 and 3). The tensing elements 16 and tensing counter elements 36 pass into tensing engagement with each other at the end of the guided inserting movement. The tensing engagement is embodied in a similar way to a screw engagement or spindle engagement. For axially tensing, the tensing elements 16 and tensing counter elements 36 co-operate in the manner of a screw and a nut. The tensing elements 16 and tensing counter elements 36 generate the holding-down force necessary for holding down in the tensing engagement by a wedge effect. The tensing elements 16 and tensing counter elements 36 simultaneously act as latching elements, by securing the suppressor 3 in the holding-down position. The tensing counter elements 36 are each formed on the side of the suppressor 3 facing away from the flanging bed 11 as a thread pitch which extends around the guiding counter element 35, i.e. they each rise in the shape of a screw in the axial direction. The tensing device formed in this way also acts as a bayonet lock, in that the guiding counter elements 35 each comprise an axially extending slot through which the respective tensing element 16 protrudes while the component B is being inserted and exits again at the end of the inserting movement, such that the guiding elements 15 can then be rotated by means of the tensing drives 17 in order to tense the suppressor 3 axially towards the flanging bed 11 in the tensing engagement with the tensing counter elements 36.

The conditions are the same for the other suppressor 5. The functionally identical components of the suppressor 5 are increased by the number 20 as compared to the respectively functionally identical components of the suppressor 3; correspondingly, its bearing structure is indicated as 50, its holding-down edge as 51, etc.

FIG. 7 shows the suppressors 3 and 5 in their holding-down position relative to the respectively assigned flanging bed 11 or 12. Merely for the purpose of representation, the flanging die units 2 and 4 have been left out; in reality, it is necessary to connote the flanging die units 2 and 4 as shown in FIG. 1.

FIGS. 9 to 16 illustrate a two-stage flanging process in the form of a sequence of movements by the flanging die unit 2 and the flanging dies 21 arranged on it.

Figure 9:
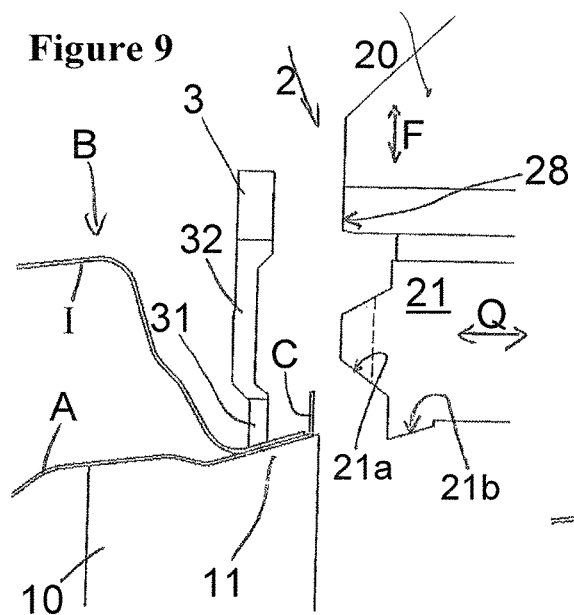
FIGS. 9-16 a flanging process.

In FIG. 9, the flanging die unit 2 is situated in its end position retracted from the flanging bed 11. The flanging dies 21 are situated in positions retracted from the flanging bed 11 with regard to both the pressing direction F and the transverse direction Q. As already described, the flanging dies 21 can be moved back and forth together with the bearing structure 20 of the flanging die unit 2, in and counter to the pressing direction F and relative to the bearing structure 20 in the transverse direction Q, as indicated in FIG. 9 by the respectively double-headed directional arrows F and Q. The component B has been inserted into the flanging bed 11 by means of the suppressor 3, and the holding-down edge 31 of the suppressor 3 presses the adjoining edge region of the component B—in the example embodiment, the edge regions of the parts A and I lying one on top of the other—onto each other along the component flange C and collectively against the flanging bed 11.

The flanging dies 21 are designed for two-stage flanging, i.e. pre-flanging and final-flanging, in that they each comprise a first flanging area 21a for pre-flanging and a second flanging area 21b for final-flanging. The flanging area 21a protrudes beyond the flanging area 21b in the transverse direction Q.

Figure 10:
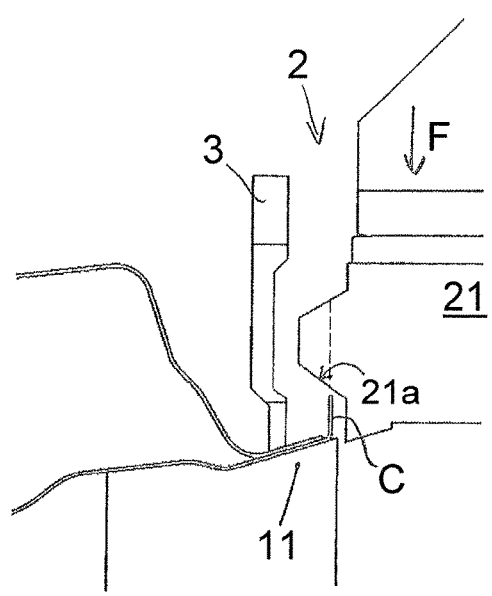
Figure 11:
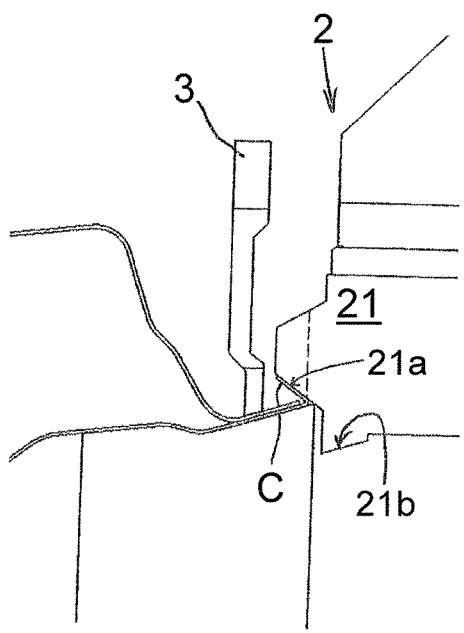

The first flanging step is initiated by a transverse movement of the flanging dies 21, radially outwards in relation to the pressing direction F. In FIG. 10, this transverse movement has been performed, such that the first flanging area 21a of each of the flanging dies 21 is over the flange C. From this position, the entire flanging die unit 2, i.e. the bearing structure 20 together with the flanging dies 21 arranged on it, is moved in the pressing direction F. This is indicated in FIG. 10 by the directional arrow F. At the end of this pressing stroke, the entire flanging die unit 2 assumes the position shown in FIG. 11. During the pressing stroke, the flange C is folded over by a first angle. The flanging die unit 2 is then moved counter to the pressing direction F, away from the flanging bed 11, until it assumes the position shown in FIG. 12.

Figure 12:
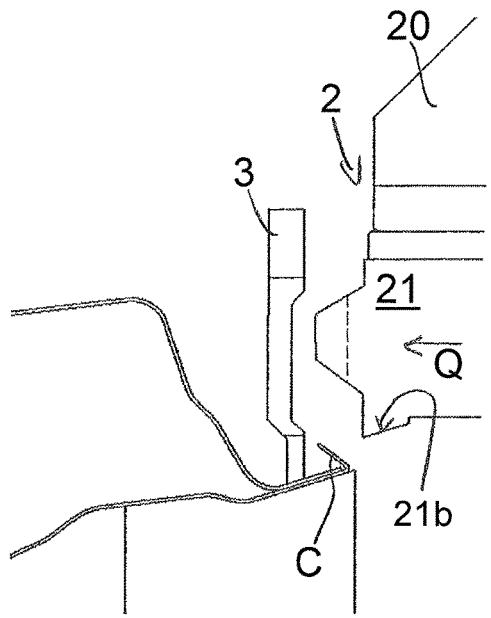
Figure 13:
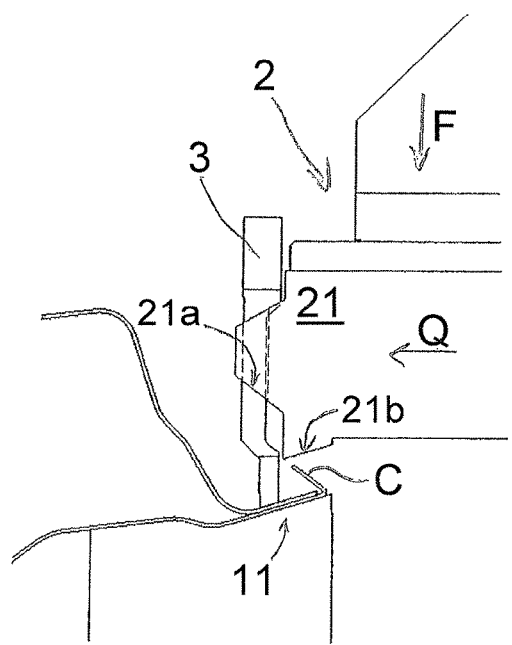

Within the context of the next flanging step, the flanging dies 21 are firstly advanced from their positions as assumed in FIG. 12 in the transverse direction Q relative to the bearing structure 20 to above the flanging bed 11 and the partially folded-over flange C. FIG. 13 shows the arrangement with the flanging dies 21 already situated over the flange C, only one of which is shown by way of representation for the other flanging dies 21 in all of FIGS. 9 to 16. The entire flanging die unit 2, together with the flanging dies 21 situated over the flange C, is then moved in the pressing direction F again. At the end of this second pressing stroke, the flanging dies 21 assume the position shown in FIG. 14. The flange C has been completely folded over by the pressure contact with the flanging area 21a and the hemmed connection has thus been established. The flanging die unit 2 is then moved counter to the pressing direction again, away from the hemming bed 11, into the end position assumed in FIG. 15. While the return stroke is being performed or only once the return stroke has been completely performed, the flanging dies 21 are moved back in the transverse direction Q again, such that the component B is free of the flanging die unit 2, as shown in FIG. 16, and can be taken out of the flanging bed 11 by means of the suppressor 3.

Figure 15:
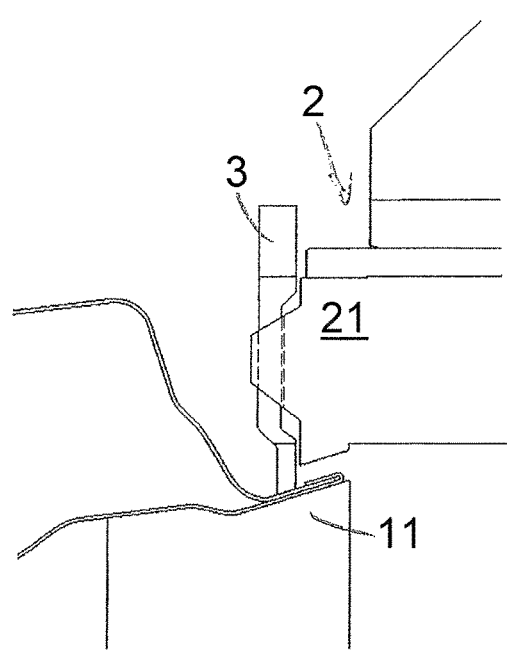
Figure 16:
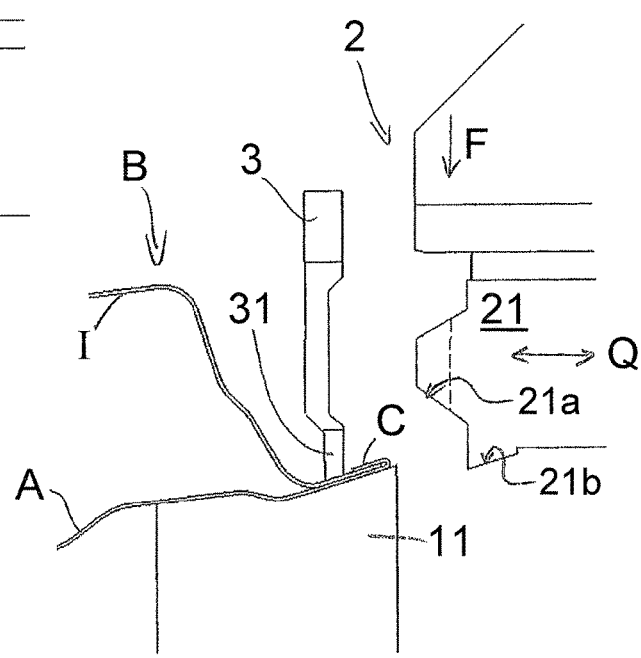

An additional joining process can optionally be performed while the state shown in FIG. 16 still obtains, in which the component B which has already been joined by flanging is pressed against the hemming bed 11 and thus held down by the suppressor 3 and in which the one or more flanging dies 21 is/are (each) retracted from the suppressor 3 in the transverse direction Q. The additional joining process can in particular serve to additionally fix the outer part A and the inner part I relative to each other. The additional joining process can in particular be a welding process such as for example spot welding or stitch welding. The suppressor 3, the holding-down edge 31 of which presses against the inner part I near the folded-over flange C, can serve as an earth electrode during welding. A welding electrode, which can in particular be arranged on the tip of a thin welding lance, can be moved between the flanging die unit 2 and the suppressor 3, up to and against the flange C, and pressed against it in order to establish a local welded connection. A welding electrode can also be an integrated constituent part of one or more flanging dies 21. A welding electrode integrated in this way can be arranged, preferably such that it can be moved in the pressing direction F, in the region of the flanging area 21a which is used for pre-flanging. For welding, the respective flanging area 21a of the flanging die(s) 21 would be moved in the transverse direction Q to above the flange C, and the respective integrated welding electrode would be pressed against the flange C. For performing the welding process using an integrated welding electrode, the flanging die 21 also need not be moved into the retracted position after flanging. Instead, it is sufficient if only the flanging area 21a of the flanging die 21 is transversely moved out of the position assumed in FIG. 15 to above the flange C and then either the movable welding electrode only or the flanging die unit 2 and optionally also the welding electrode is/are (each) moved in the pressing direction F. In another modification, a welding electrode can be arranged in the region of the flanging area 21b for final-flanging. In such a modification, the welding process can be performed directly following final-flanging or directly at the end of the pressing stroke, in the position shown in FIG. 14. The parts A and I can be more strongly fixed relative to each other by respectively contacting the electrodes on the side of these parts A and I which faces away from the flanging bed 11.

The suppressor 3 and the flanging dies 21 are shaped to conform to each other, so that the suppressor 3 can remain in the holding-down position throughout the entire flanging process in order to fix the component B and/or its parts A and I to the flanging bed 11 over the entire flanging process.

Figure 14:
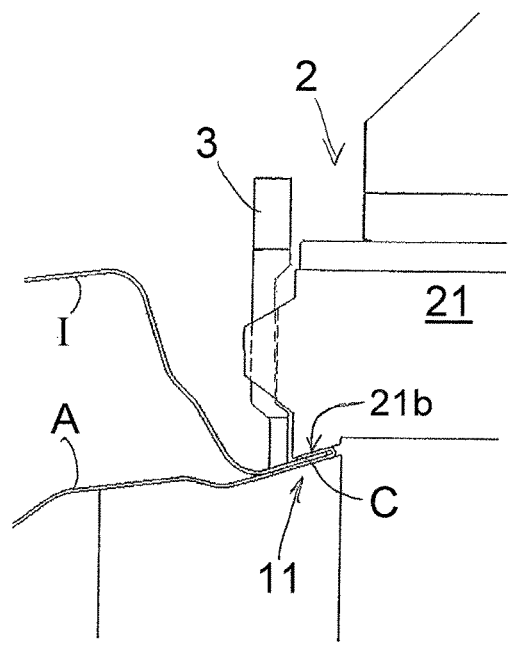

FIGS. 8 to 16 show a suppressor 3 and one of the flanging dies 21 in a first variant of such an adaption. The suppressor 3 of the first variant comprises protruding regions 32 in the form of crosspieces and retracted regions 33 in the form of passages in a region adjoining the holding-down edge 31. In the region of their respective flanging area 21a, the flanging dies 21 likewise comprise regions which protrude in the transverse direction Q and regions which are retracted in the transverse direction Q, wherein a protruding region 32 of the suppressor 3 respectively overlaps with a retracted region of the flanging die 21 and a retracted region 33 respectively overlaps with a protruding region of the flanging die 21 as viewed along the flanging bed 11. Due to this arrangement of protruding and retracted regions on both the suppressor 3 and the flanging dies 21, the suppressor 3 and the flanging dies 21 can interlock in the transverse direction Q, as can be seen in FIGS. 13, 14 and 15, such that each of the flanging dies 21 meshes in the region of its first flanging area 21a with the suppressor 3 in the region of its retracted regions 33. The flanging dies 21 can therefore perform both flanging steps despite the two flanging areas 21a and 21b being respectively formed on the same flanging die 21, and the suppressor 3 can remain in the holding-down position throughout the entire flanging process.

Figure 17:
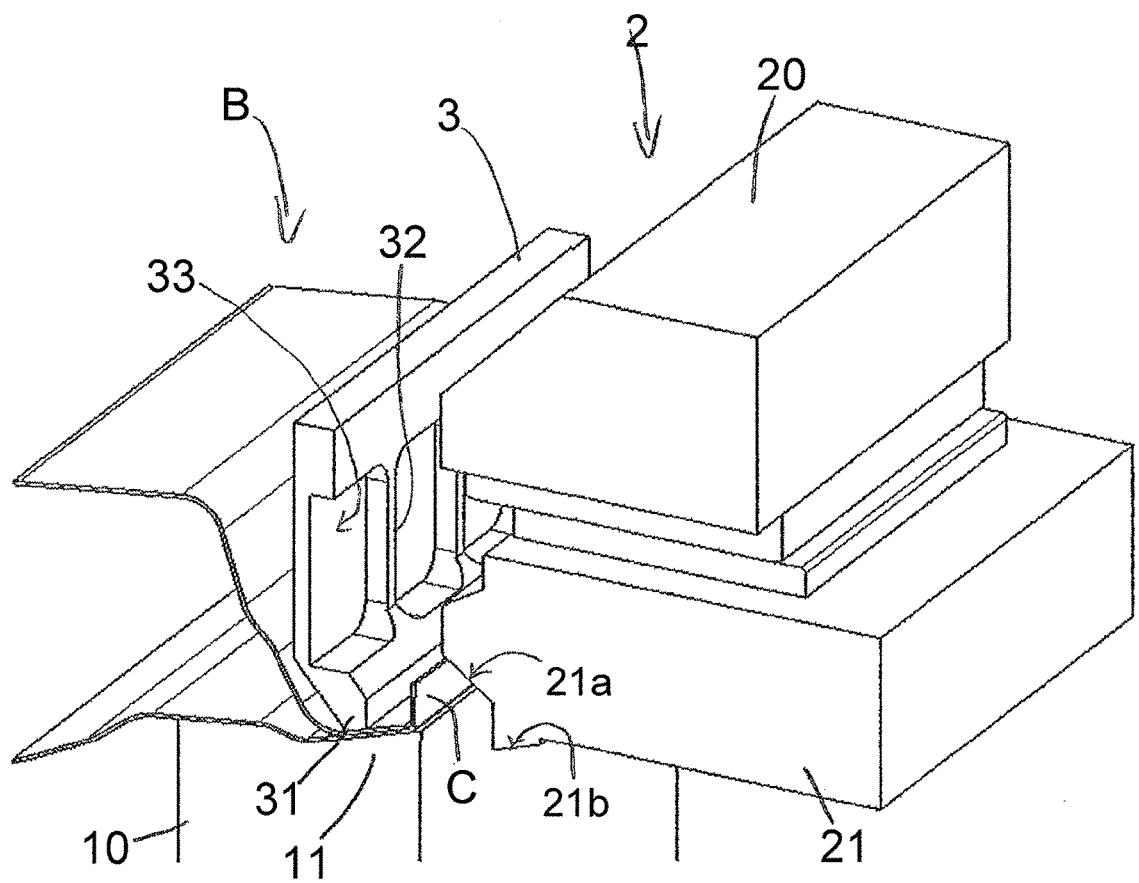
FIG. 17 a flanging die and a suppressor of a second variant.
Figure 18:
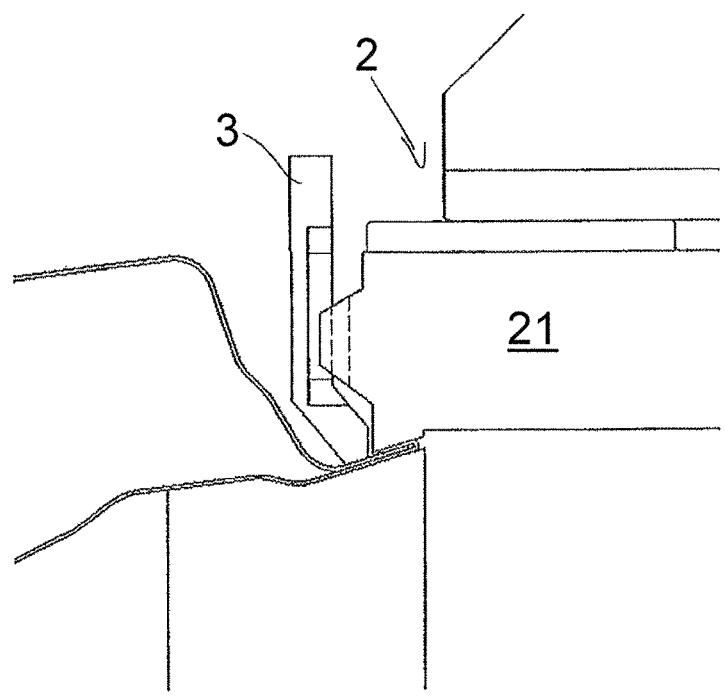
FIG. 18 the flanging die and the suppressor of the second variant.

FIGS. 17 and 18 show a suppressor 3 and a flanging die unit 2 comprising flanging dies 21, in a second variant. The suppressor 3 of the second variant differs from the suppressor 3 of the first variant only in that the retracted regions 33 are shaped as pockets and/or recesses in the region adjoining the holding-down edge 31, rather than as passages. The flanging die 21 does not therefore mesh with the suppressor 3 during final-flanging; rather, as can be seen in FIG. 18, its protruding regions merely protrude into the retracted regions 33. The second variant otherwise corresponds to the first variant.

Figure 19:
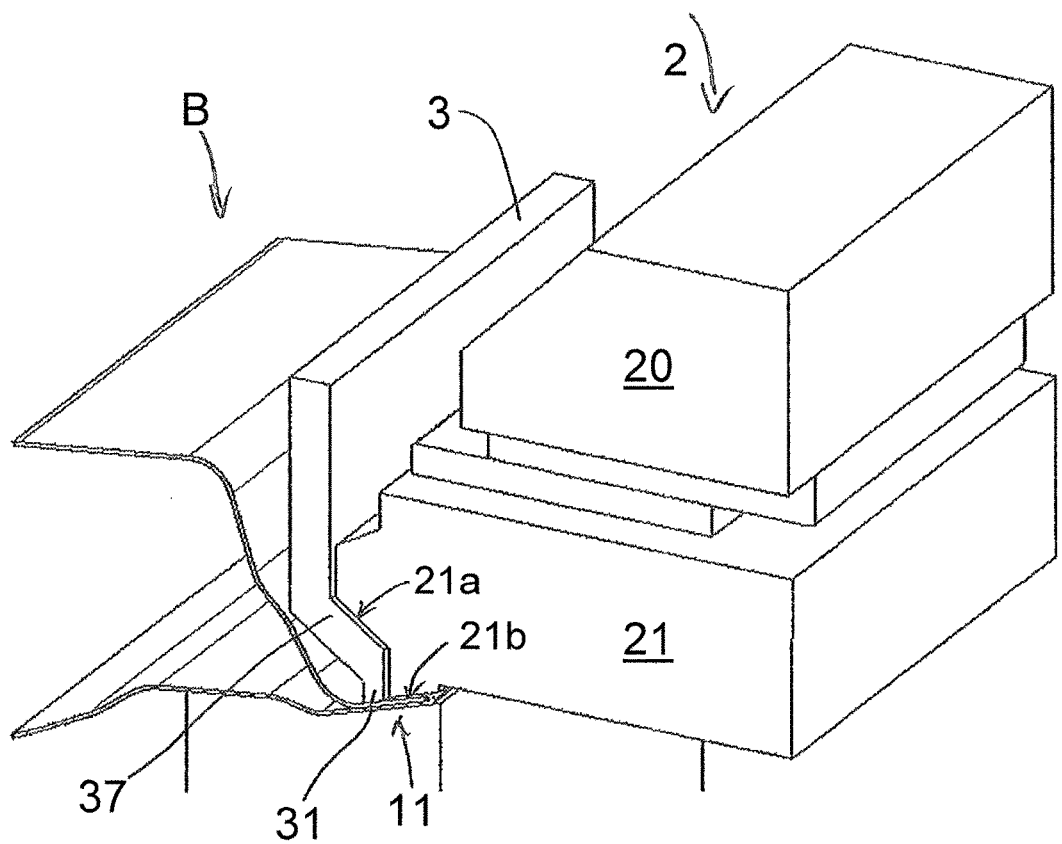
FIG. 19 a flanging die and a suppressor of a third variant.
Figure 20:
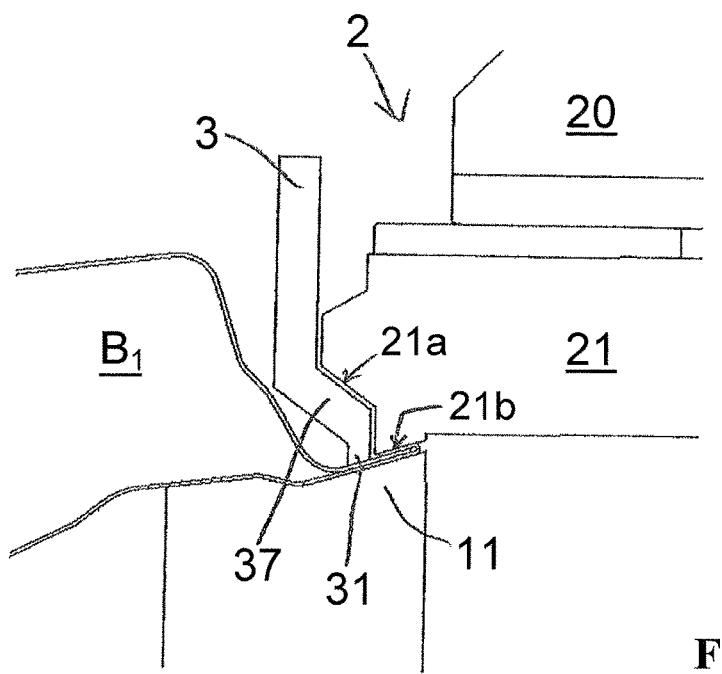
FIG. 20 the flanging die and the suppressor of the third variant.

FIGS. 19 and 20 show an arrangement of the suppressor 3 and the flanging die unit 2 in a third variant. In the third variant, the region of the suppressor 3 which borders the holding-down edge 31 comprises an angled region 37 which is shaped such that in this region, the suppressor 3 is angled away from the respectively opposite flanging die 21 in the transverse direction Q. The regions of the flanging dies 21 which protrude in the transverse direction Q, and in which the first flanging area 21a is respectively formed, can therefore protrude beyond the holding-down edge 31, i.e. can extend over the holding-down edge 31 as viewed from the flanging bed 11, in the second flanging step. This also enables flanging in multiple flanging steps using respectively the same flanging dies 21 and a suppressor 3 which is continuously situated in the holding-down position.

Figure 21:
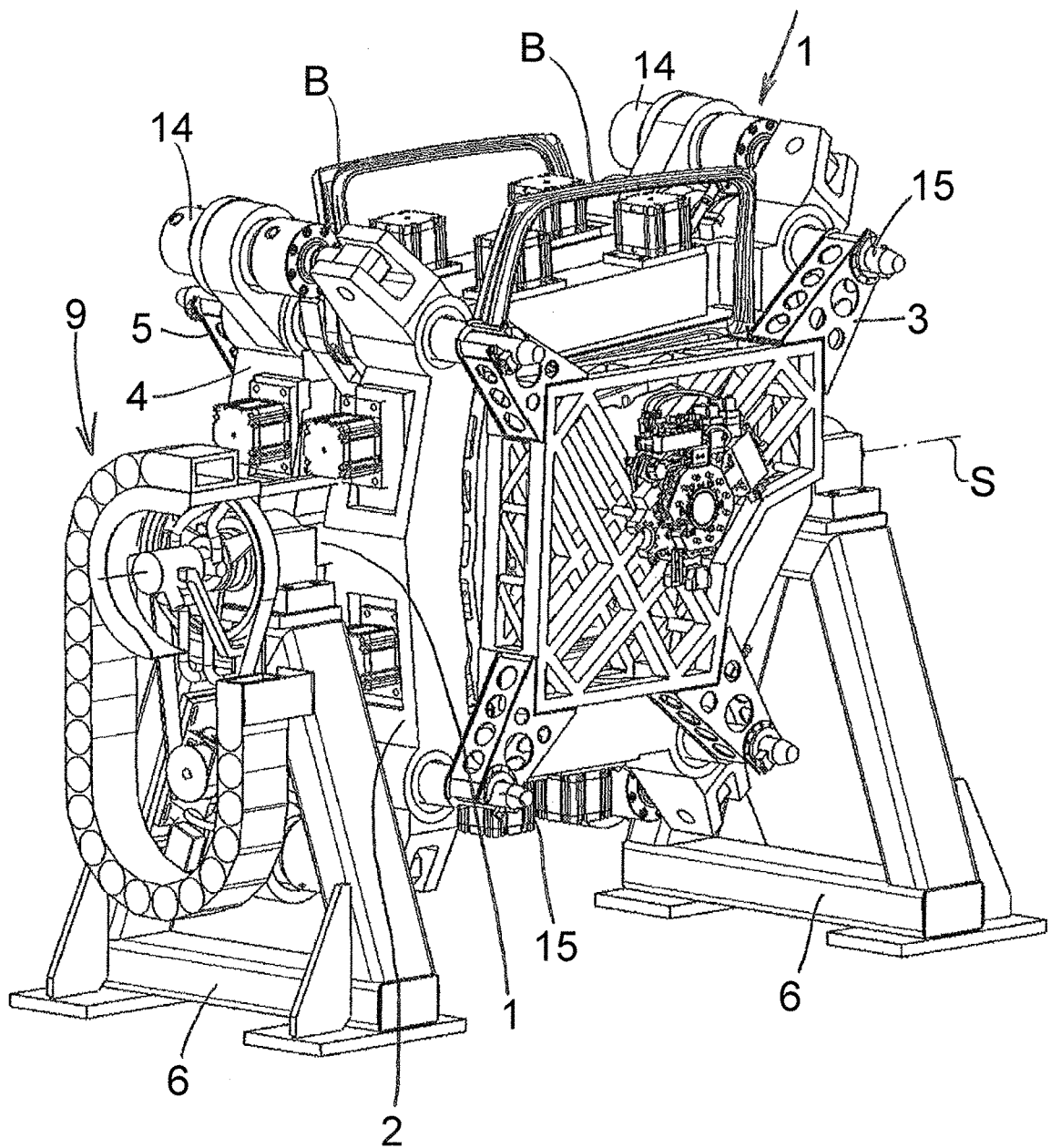
FIG. 21 a flanging press in a second example embodiment.

FIG. 21 shows a flanging press in a second example embodiment. The flanging press is again embodied as a dual press comprising a central base structure 1, a first flanging die unit 2, a second flanging die unit 4, a first suppressor 3, a second suppressor 5 and a pressing drive 14. These main components of the flanging press correspond to the first example embodiment. As in the first example embodiment, the flanging press is formed as a dual press in a sandwich arrangement in which two single presses such as in the first example embodiment are arranged back-to-back on the central, common base structure 1.

Unlike the first example embodiment, this dual press is mounted, such that it can be pivoted about a horizontal axis S, in a framework 6 which is arranged in a stationary manner. Within the context of the pivoting movement, the entire press can be pivoted about the pivoting axis S from the upright alignment assumed in FIG. 21 into a horizontal alignment in which either the flanging bed 11 or the flanging bed 12 points upwards and the other flanging bed points downwards.

The flanging press comprises a pivoting drive 9 which can generate the pivoting movement. In order to pivot, the flanging press is mounted such that it can be pivoted in the framework 6 via its base structure 1. The pivoting drive 9 comprises a pivoting motor, which is supported on the framework 6, and a traction drive which transmits a rotational movement of the pivoting motor onto the base structure 1 and therefore onto the entire press.

Figure 22:
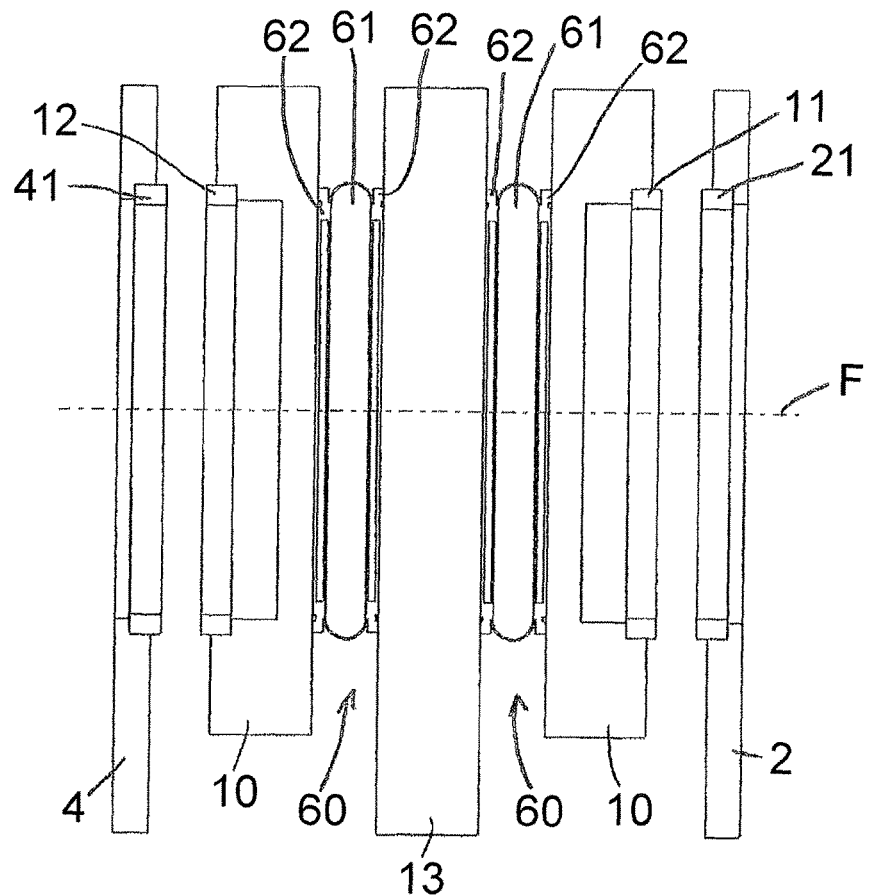
FIG. 22 a flanging press in a third example embodiment comprising a pressure bellows.

FIG. 22 shows a flanging press in a third example embodiment. This flanging press is also formed as a dual press, i.e. it comprises two single presses. In the third example embodiment, the hydraulic pressing drive 14 of the other two example embodiments is replaced with a pressure bellows drive which generates the pressing movements. The framework of the flanging presses described thus far is replaced with a central supporting structure which is likewise indicated as a framework 13. Unlike the other example embodiments, the pressing movements are not performed by the flanging die units 2 and 4 but rather by the two bearing structures 10 and therefore their flanging beds 11 and 12, while the flanging die units 2 and 4 are arranged such that they cannot be moved in their respective pressing direction F.

The flanging press of the third example embodiment is similarly aligned vertically upright. A right-hand bearing structure 10 and the flanging die unit 2 are arranged to the right of the framework 13, and the left-hand bearing structure 10 and the second flanging die unit 4 are arranged to the left of the framework 13. A first pressure bellows 60 which is arranged between the framework and the right-hand bearing structure 10 and a second pressure bellows 60 which is arranged between the framework 13 and the left-hand bearing structure 10 respectively form the pressing drive. When charged with pressure, the first pressure bellows 60 expands and thus moves the right-hand bearing structure 10 towards the flanging die unit 2. The second pressure bellows 60 similarly expands when charged with pressure and thus moves the left-hand bearing structure 10 towards the second flanging die unit 4. Aside from the differences which follow from this arrangement, the bearing structures 10 can correspond to those of the other two example embodiments, wherein each of the bearing structures 10 of the third example embodiment comprises only one flanging bed 11 or 12, respectively. Aside from the pressing drive and the reversed kinematics, the two single presses 10, 2 and 10, 4 correspond to the single presses of the other two example embodiments.

In one modification, the two pressure bellows 60 can be replaced with a single pressure bellows. In such a modification, the central framework 13 can be omitted. The solitary pressure bellows can however only move the two bearing structures 10 simultaneously in opposite directions towards the respectively assigned flanging die unit 2 or 4. In such a modification, the return stroke would be generated by a return stroke device, for example a mechanical or pneumatic spring device or also an electromotive return stroke device.

It may also be added with respect to the flanging press of the third example embodiment that the bearing structures 10 can comprise guiding elements comparable to the guiding elements 15, and the flanging die units 2 and 4 can correspondingly comprise guiding counter elements comparable to the guiding counter elements 25 and 45, as in the other two example embodiments. As also in the other example embodiments, rod-shaped or lance-shaped guiding elements can instead also be provided on the flanging die units 2 and 4 or on the framework 13 and corresponding guiding counter elements comparable to the guiding counter elements 25 and 45 can be provided on the bearing structures 10.

Figure 23:
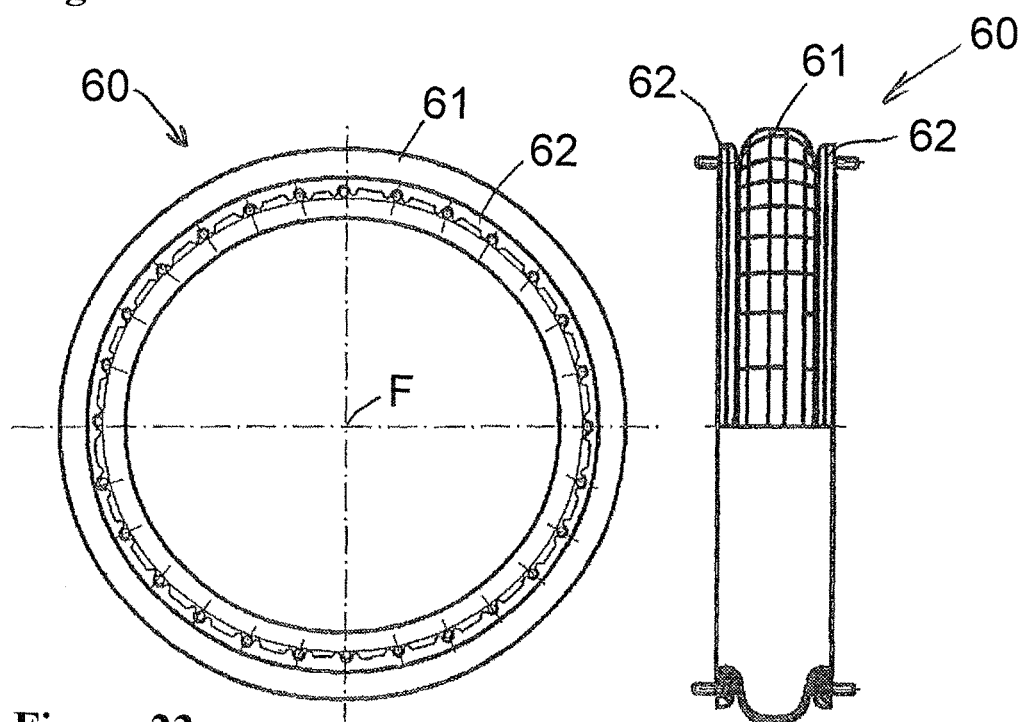
FIG. 23 the pressure bellows in a plan view.
Figure 24:
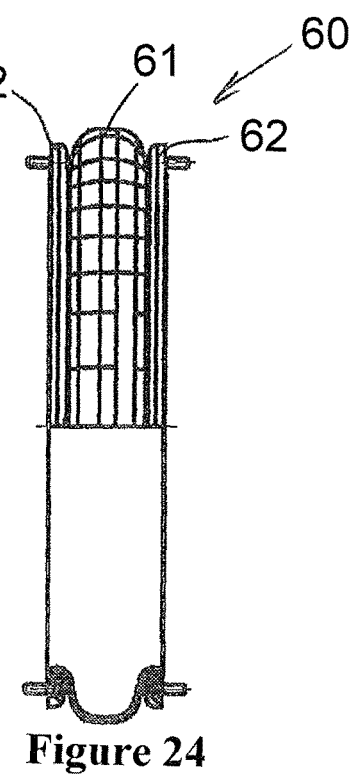
FIG. 24 the pressure bellows in a side view.

FIGS. 23 and 24 show one of the two pressure bellows 60 in a plan view and in a side view. The pressure bellows 60 each comprise a flexible part of the bellows and/or a flexible bellows wall 61 which can be charged with pressure, preferably pressurised air, and relieved of pressure, and two mounting structures 62 and 63 for fastening to the framework 13 or another supporting structure and to the respectively assigned bearing structure 10. The mounting structures 62 and 63 can be embodied to be annular or also full-faced. The flexible bellows wall 61 can be restricted to almost the outer circumference of the respective bellows 60, as in the example embodiment. The mounting structures 62 and 63 can then for example be circular discs or discs which are shaped to conform to the profile of the flanging bed 11 or 12. The flexible bellows wall 61 can extend along the circumferential edge of the mounting structures 62 and 63, which lie opposite each other at a distance as in FIG. 24, and be connected to the two mounting structures 62 and 63 in a fluidic seal over the circumferential edge. The flexible bellows wall 61 roughly corresponds to the tyre arranged on a wheel rim of a motor vehicle. If the structures of the flanging press which are arranged to the left and right of the flexible bellows wall 61—in the example embodiment, the bearing structures 10 and the framework 13—are in a fluidic seal as viewed over the area of the respective pressure bellows 60, then annular mounting structures 62 and 63 can also be used instead of disc-shaped mounting structures 62 and 63. It is merely necessary to ensure a fluidically sealed connection between such mounting structures 62 and 63 and the respective structure 10, 13 of the press. This can be ensured, as in the example embodiment, by a sufficiently sealed screw connection along the circumferential edge, optionally including a gasket.

Figure 25:
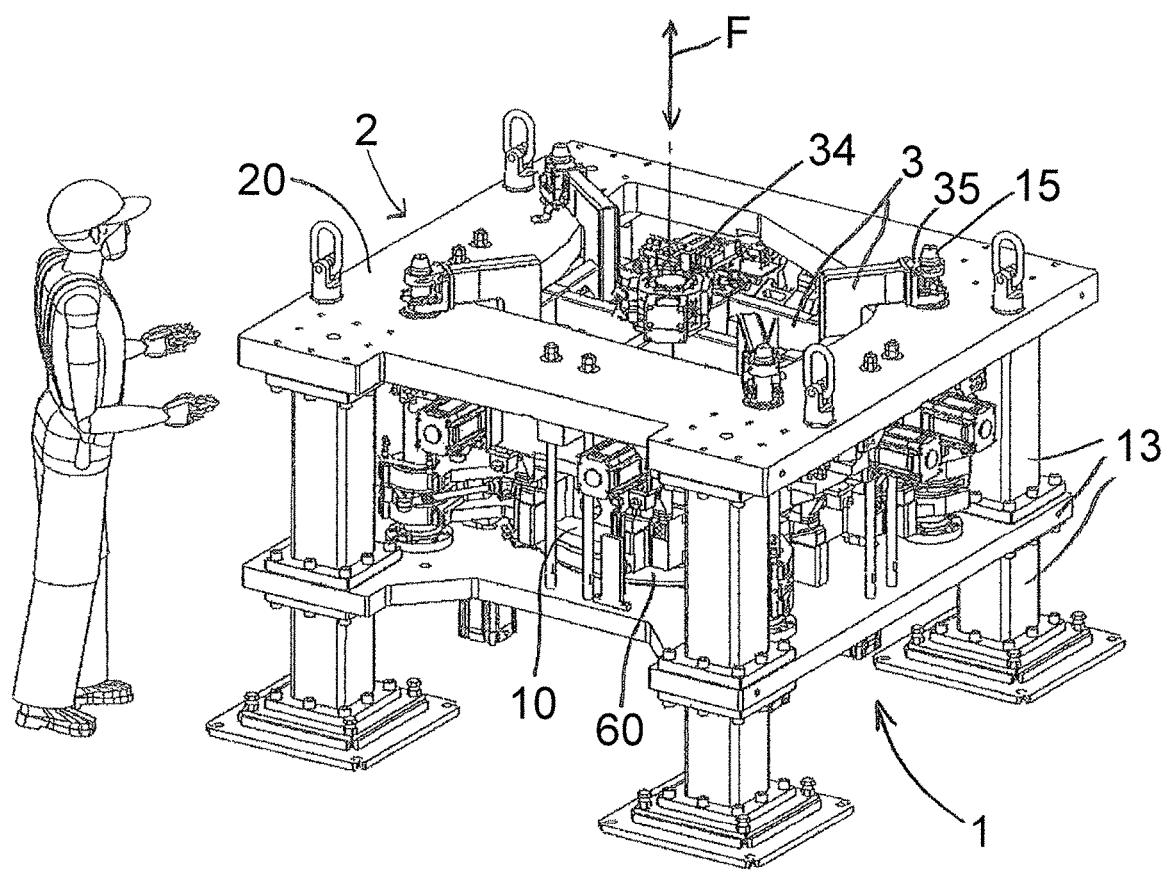
FIG. 25 a flanging press in a fourth example embodiment.

FIG. 25 shows a flanging press of a fourth example embodiment which, unlike the other example embodiments, is arranged horizontally. The pressing direction F is correspondingly vertical. The essential design does however correspond to that of the other example embodiments. Thus, the flanging press comprises a base structure 1 featuring a bearing structure 10 and a framework 13 and also a cartridge-shaped flanging die unit 2 featuring a bearing structure 20. A suppressor 3 is also provided which can be moved through the central passage of the frame-like flanging die unit 2 into the holding-down position assumed in FIG. 25 in order to hold down and preferably also insert and take out a component to be flanged. As in the other example embodiments, the suppressor 3 comprises a fastening device 34 on its rear side for fastening to a multiple-axis robot arm. As in the other example embodiments, the flanging press comprises axially extending guiding elements 15 which axially guide the suppressor 3 once its guiding counter elements 35 have been threaded in, such that the robot merely has to hold the component or correspondingly move it axially in order to insert it or take it out, but no longer needs to position it relative to the hemming bed in a direction transverse to the pressing axis F. The pressing force necessary for folding over the component flange is generated by a pressure bellows 60 which can correspond to the pressure bellows 60 already described.

FIGS. 26 to 34 show the flanging press in different stages of assembly, from which the design of the flanging press of the fourth example embodiment can be more easily inferred.

Figure 26:
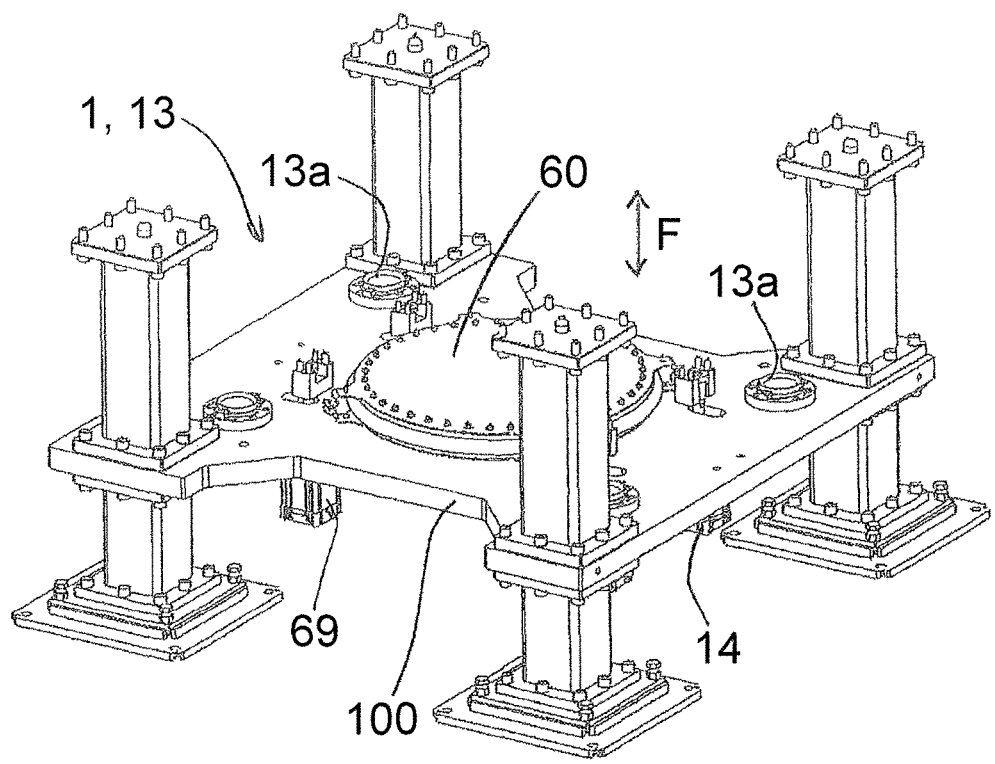
FIG. 26 a framework and a pressure bellows of the fourth example embodiment.

FIG. 26 shows only the framework 13 of the base structure 1, but also a pressure bellows 60 which is supported on the framework 13. The framework 13 comprises a framework bearing structure 100, for example a framework plate 100 as is preferred, which is borne by framework columns. The framework plate 100 can in particular be a steel plate with a thickness of preferably at least 70 mm and more preferably at least 80 mm. The pressure bellows 60 is arranged in a central region of the framework plate 100, on the upper side of the framework plate 100 as is preferred, and fixedly connected to it. An additional drive 69 is also supported on the framework 13 and comprises multiple drive units which are arranged in a distribution over the periphery of the pressure bellows 60. In the example embodiment, four drive units are provided. The additional drive 69 can in particular be a pneumatic drive. The drive units comprise stroke elements which can be moved back and forth in the pressing direction F. The framework plate 100 can be replaced with a framework bearing structure 100 which is not shaped as a plate, as long as said bearing structure can fulfil the supporting functions of the framework plate 100; a plate is favourable not least for reasons of production and therefore in respect of the manufacturing cost.

Figure 27:
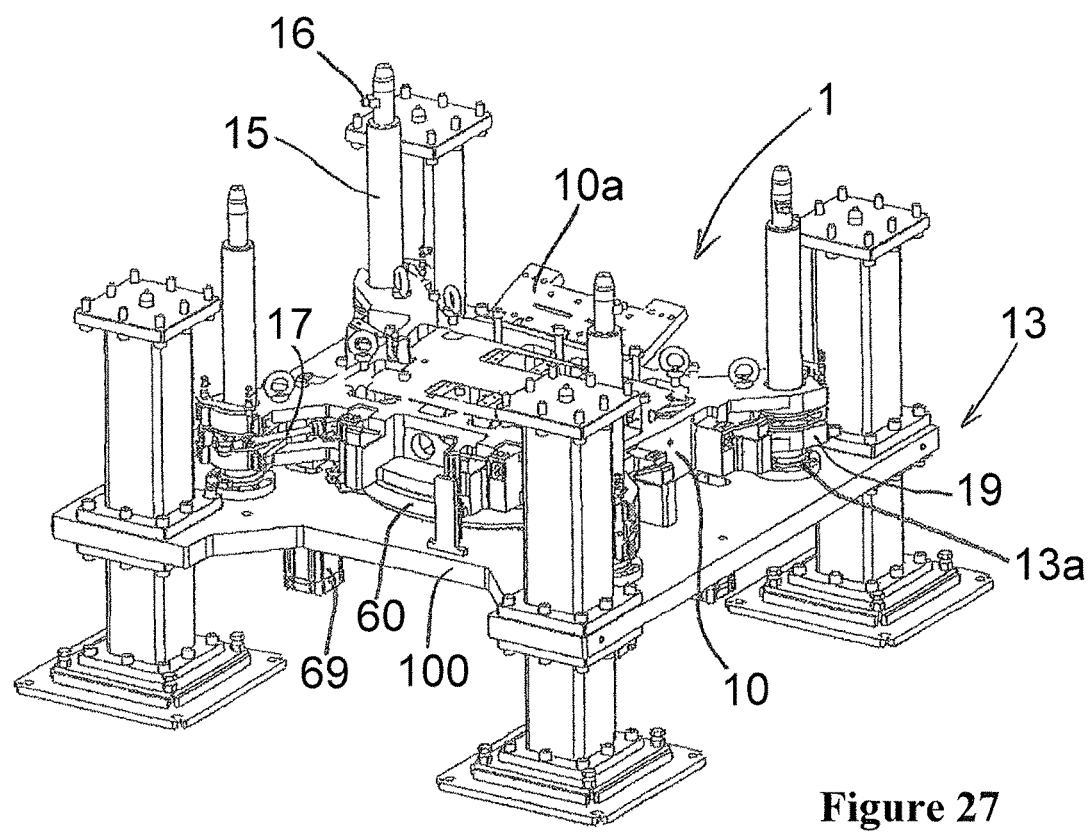
FIG. 27 the framework, the pressure bellows and a base bearing structure of the fourth example embodiment.

FIG. 27 shows the base structure 1 including the bearing structure 10. The bearing structure 10 is arranged on the pressure bellows 60 and preferably fixedly connected to the pressure bellows 60, such that the bearing structure 10 cannot be moved relative to the pressure bellows 60 at least in the transverse direction or at least axially. The bearing structure 10 can be moved relative to the framework 13 in the pressing direction F. The guiding elements 15 are a constituent part of the base structure 1, as in the other example embodiments, but can be moved together with the bearing structure 10 relative to the framework 13 in the pressing direction F and/or axially. The guiding elements 15 are axially guided by guiding counter elements 13a of the framework 13. In the example embodiment, the guiding elements 15 protrude through the framework plate 100 in the region of each of the guiding counter elements 13a.

The bearing structure 10 comprises laterally projecting rotational guiding elements 19 by means of which the bearing structure 10 is connected, such that it cannot be moved axially, to the guiding elements 15, such that the bearing structure 10 axially slaves the guiding elements 15 during stroke movements of the pressure bellows 60 and is thus guided relative to the framework 13. The rotational guiding elements 19 are passages and/or guiding eyes adapted to the outer circumference of the respectively assigned guiding element 15. The guiding elements 15 can be rotated relative to the bearing structure 10 in the engagement with the rotational guiding elements 19, in order to be able to tense the suppressor 3 by means of the tensing elements 16 as in the other example embodiments.

An extension 10a projects from the bearing structure 10 on one side and serves as a platform for an additional flanging device which will be described further below.

Figure 28:
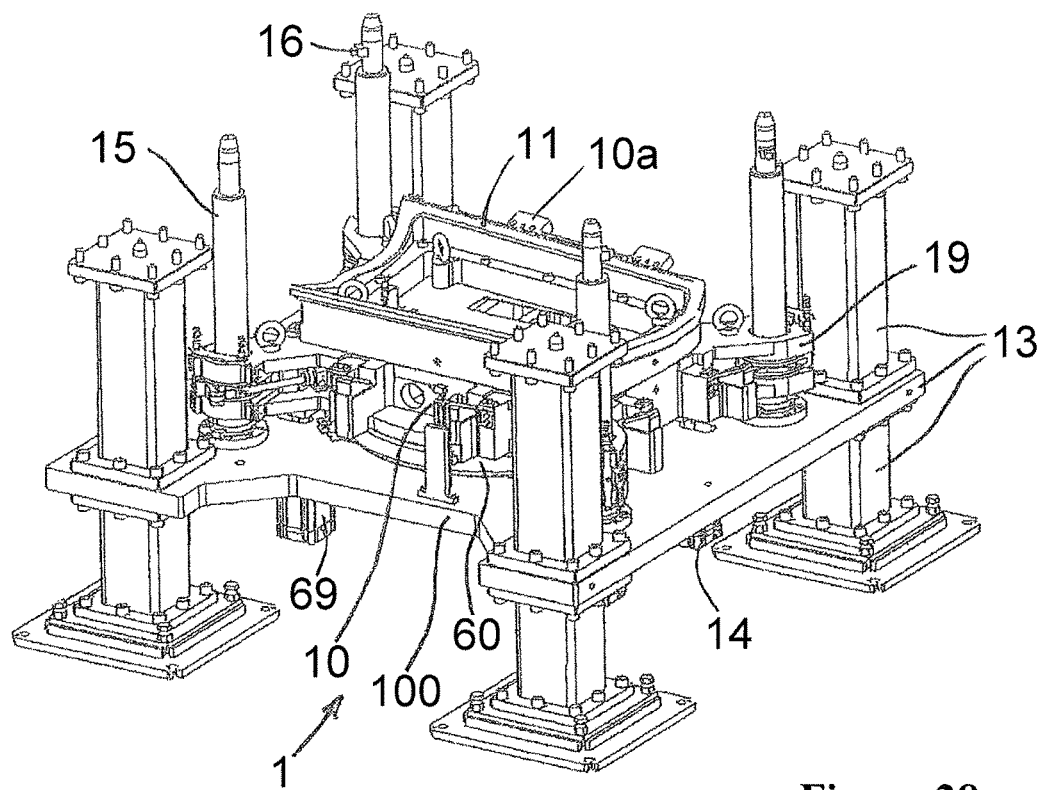
FIG. 28 a base structure comprising the pressure bellows of the fourth example embodiment.

In FIG. 28, the base structure 1 has been complemented by the flanging bed 11. The flanging bed 11 is arranged on the bearing structure 10 and joined, such that it cannot be moved, to the bearing structure 10. If, as is preferred, the bearing structure 10 and the flanging bed 11 are detachably connected to each other, for example by means of a screw connection, then components which differ from each other in their geometry can be flanged using the otherwise unaltered base structure 1 by exchanging the flanging bed 11 only. It is thus possible to flange vehicle doors using a first flanging bed 11, as in the example embodiment, and to flange for example bonnets, hatchbacks or vehicle doors of another vehicle model or other doors of the same vehicle model using another, exchangeable flanging bed 11. In respect of exchangeability, it is advantageous if the flanging bed 11 is relieved of all functions which are not absolutely necessary for providing the respective component with the bearing support necessary for flanging. In preferred embodiments, therefore, it merely comprises one side wall structure, as in the example, the profile of which is adapted to the profile of the flange to be flanged, wherein the bearing support for the component as well as the joining elements necessary for a permanent or preferably detachable joined connection to the bearing structure 10 and optionally also one or more abutments for limiting the one or more flanging strokes are formed on an end-facing side of the side wall structure. The guiding counter element 19 in particular need not form part of the flanging bed 11; they are advantageously a constituent part of the bearing structure 10 which remains the same when a flanging bed is changed.

Figure 29:
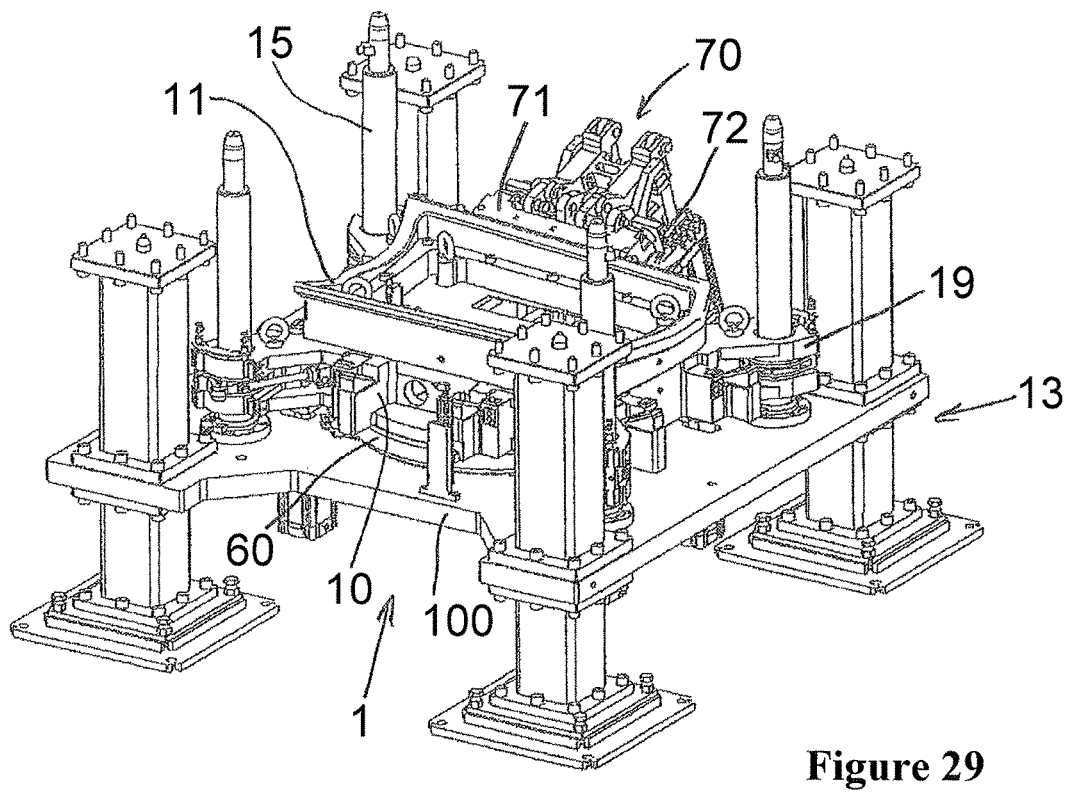
FIG. 29 the base structure of the fourth example embodiment comprising an additional flanging device for flanging a window slot flange.

FIG. 29 shows the base structure 1 after an additional flanging device 70, which has already been mentioned, has been assembled. The additional flanging device 70 is arranged on the extension 10a of the bearing structure 10. The additional flanging device 70 comprises a flanging slider 71 and a slider drive 72. The flanging slider 71 can be advanced in a direction transverse to the pressing direction F into an overlap with the flanging bed 11, and moved back out of the overlap again, by means of the slider drive 72. A flange can in particular be folding over into a slot of the component, for example a window slot of a vehicle door, by means of the additional flanging device 70.

Figure 30:
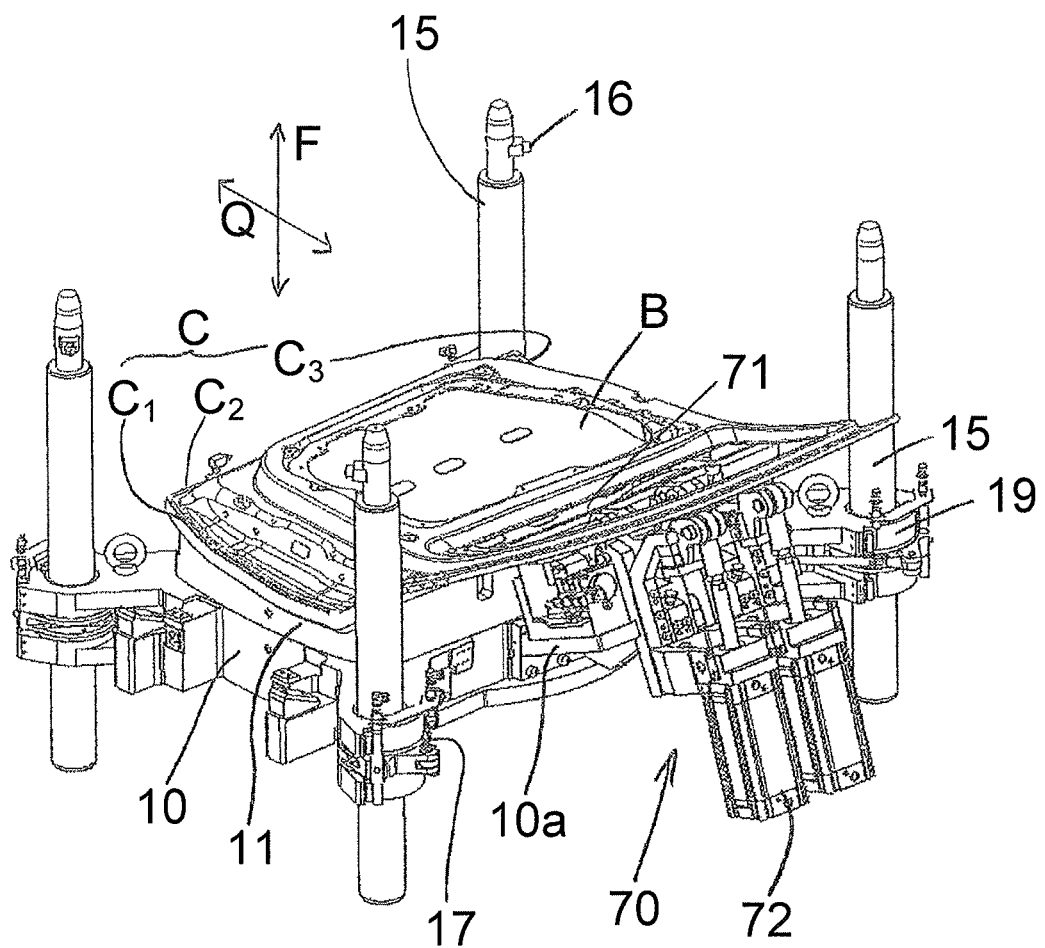
FIG. 30 the base bearing structure and a hemming bed of the fourth example embodiment, with a component inserted.

FIG. 30 shows only the bearing structure 10 of the base structure 1, including the extension 10a, as well as the guiding elements 15 which cannot be moved axially relative to the bearing structure 10 but can be moved rotationally relative to the bearing structure 10, and the flanging bed 11 which is assembled on the bearing structure 10. The additional flanging device 70, which is supported on the extension 10a, is also shown. A component B is positioned on the flanging bed 11. As in the other example embodiments, the component B is a vehicle door. The flange C which is to be folded over by means of the flanging die unit 2 extends along the left-hand, right-hand and lower edge of the component B and therefore over an angular range of 180°±20° along the outer edge of the component B, as is usual with vehicle doors. The flange C is expediently interrupted in cornered regions, such as for example the regions in which the two side edges respectively transition into the lower edge. In the chosen example of a vehicle door B, the flange C is composed of multiple flange portions and in particular comprises a first side edge flange $C_1$, a bottom edge flange $C_2$ and a second side edge flange $C_3$. In a rough approximation, the flange C exhibits a U-shaped profile, wherein the mutually opposite side edge flanges $C_1$ and $C_3$ are not however generally parallel to each other and also exhibit a curved profile. The bottom edge flange $C_2$ extends at least substantially linearly but can in principle also be curved.

Figure 31:
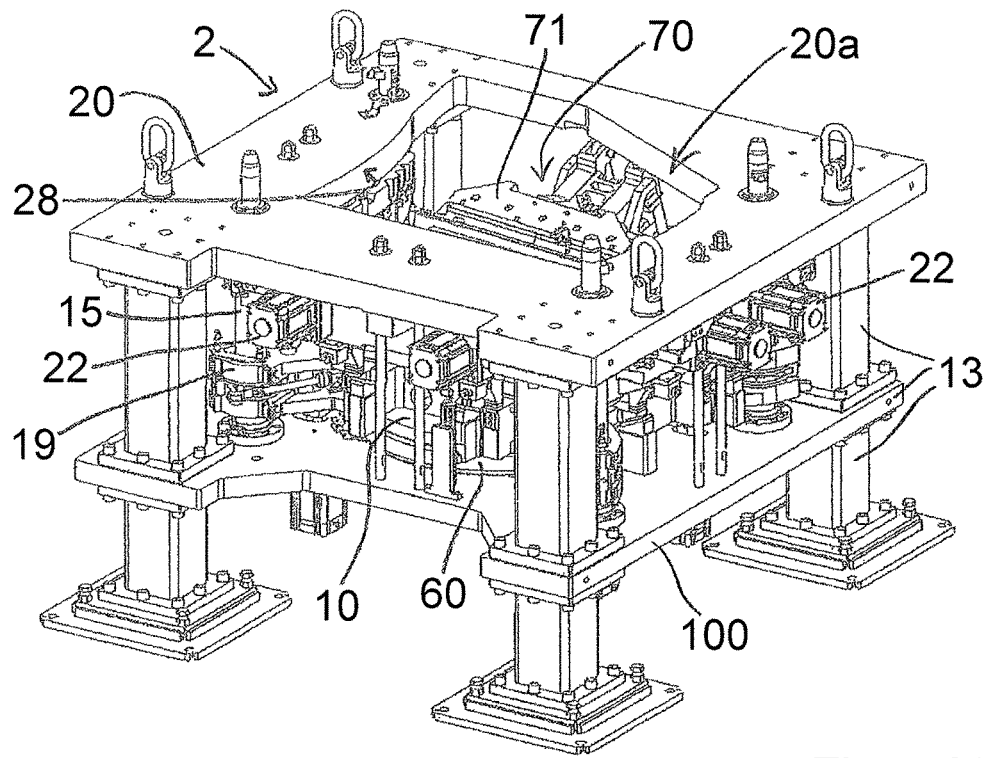
FIG. 31 the base structure and a flanging die unit of the fourth example embodiment.

In FIG. 31, the flanging press of the fourth example embodiment is complemented by the flanging die unit 2. Unlike the other example embodiments, the bearing structure 20 of the flanging die unit 2 is connected, such that it cannot be moved, to the framework 13 of the base structure 1. As is preferred, the bearing structure 20 rests on the columns of the framework 13. The bearing structure 20 is formed as a plate, preferably a steel plate, with a thickness of preferably at least 70 mm and more preferably at least 80 mm, comparable to the framework plate 100.

Figure 32:
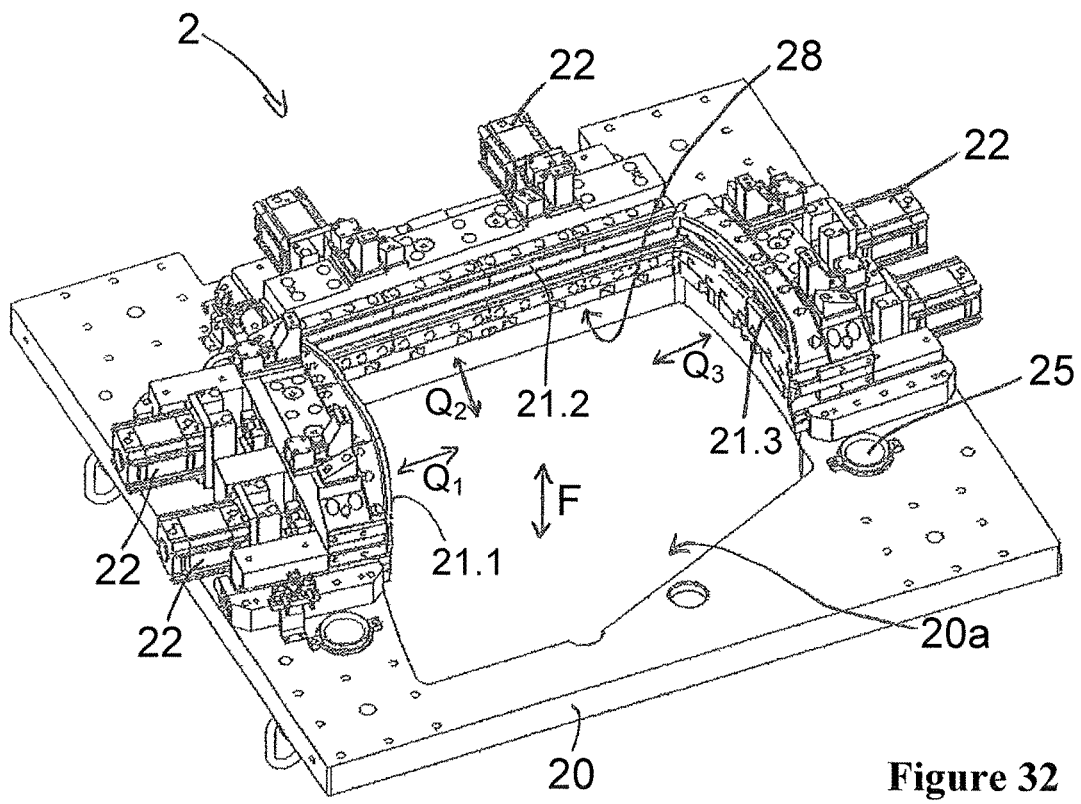
FIG. 32 the flanging die unit of the fourth example embodiment.

FIG. 32 shows the flanging die unit 2 before it is assembled, in an isometric view onto its lower side which faces the flanging bed 11 when assembled. As in the other example embodiments, the bearing structure 20 comprises a central passage which is defined by an inner circumference 28 which is adapted to the contour of the component flange C. Multiple flanging dies 21 are arranged along the inner circumference 28 of the passage and are indicated as $21.i$ in assignment with the flange $C_i$ to be respectively folded over. In the example embodiment, flanging dies $21.i$ are provided in accordance with the profile of the flange C which, as shown in FIG. 30, can be sub-divided into the three flange portions $C_1$, $C_2$ and $C_3$, wherein the flanging dies are indicated in the figure in their respective assignment, i.e. one or more flanging dies 21.1 for the side edge flange $C_1$, one or more flanging dies 21.2 for the bottom edge flange $C_2$, and one or more flanging dies 21.3 for the other side edge flange $C_3$. The flanging dies $21.i$ can be moved back and forth relative to the bearing structure 20 in one transverse direction $Q_i$ each, for which purpose respectively assigned flanging die drives 22 corresponding to the other example embodiments are provided. The transverse directions $Q_i$ each point transverse to the pressing direction F and transverse to the respectively assigned flange $C_i$ and are indicated as $Q_1$, $Q_2$ and $Q_3$ in accordance with their assignment.

The flanging dies 21.1 and 21.3, which lie opposite each other across the passage of the bearing structure 20, can be transversely movable parallel to each other; generally, however, the transverse directions $Q_1$ and $Q_3$ can differ from each other, in particular when the mutually opposite side edge flanges $C_1$ and $C_3$ at least substantially do not point parallel to each other. In the case of many of the components which are usual in vehicle manufacture, such as for example doors, bonnets, hatchbacks and sunroofs, the angular deviation of the transverse directions $Q_1$ and $Q_3$ from being parallel will however only amount to a few degrees, for example 20° at most or 10° at most. In most applications, the directions $Q_1$ and $Q_3$ of the flanging dies 21.1 and 21.3 which face opposite each other across the passage of the bearing structure 20 will point at least substantially orthogonally with respect to the flanging die or dies 21.2 arranged transverse to the flanging dies 21.1 and 21.3. In most cases, possible deviations from being orthogonal amount to at most 20° or at most 10°. The flanging die unit 2 of the fourth example embodiment can correspond to the flanging die units 2 of the other example embodiments with regard to its mobility, the drives 22 and how they are coupled to the respectively assigned flanging die 21.$i$, and how the flanging dies 21.$i$ are mounted on the bearing structure 20. The guiding counter elements 25 are then for example also axial passages through the bearing structure 20.

Figure 33:
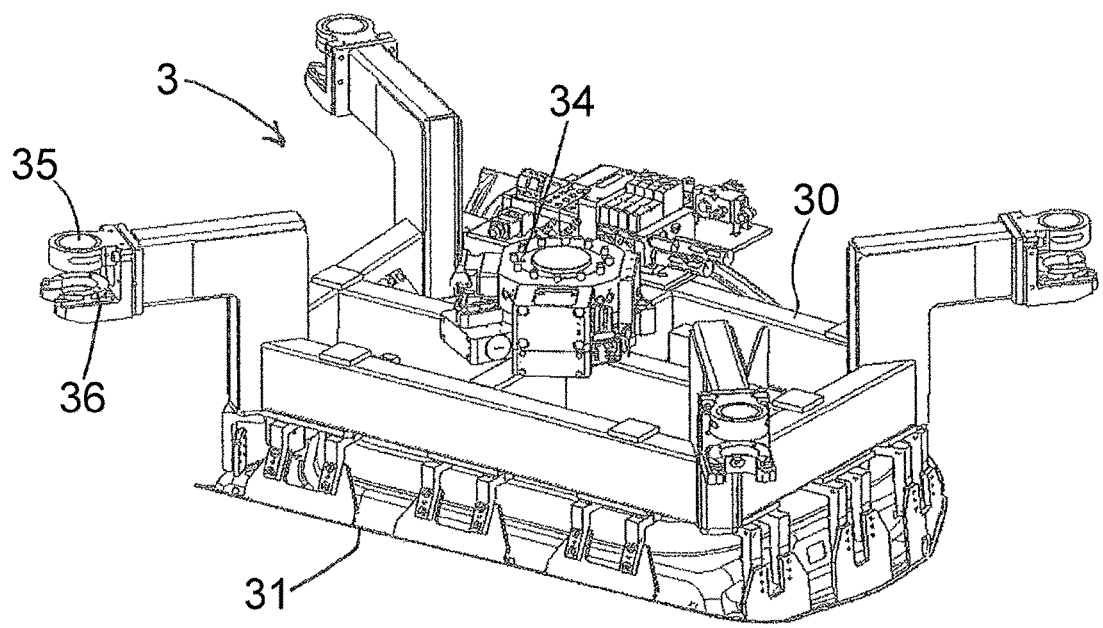
FIG. 33 a suppressor of the fourth example embodiment.

FIG. 33 shows the suppressor 3 of the fourth example embodiment. As in the other example embodiments, the suppressor 3 in particular comprises: a free holding-down edge 31 which is adapted in terms of its profile to the contour of the flange C to be folded over; guiding counter elements 35 for the guiding elements 15; and tensing counter elements 36 for the tensing elements 16. It corresponds to the suppressor 3 of the other example embodiments with regard to its functionality. It differs from the other example embodiments only in the design of its bearing structure 30. The structural elements of the bearing structure 30 are fewer, but larger in cross-section, than in the other example embodiments, but are again transversely strutted. In the central region, the fastening device 34 for the robot is arranged on the rear side of the suppressor 3.

Figure 34:
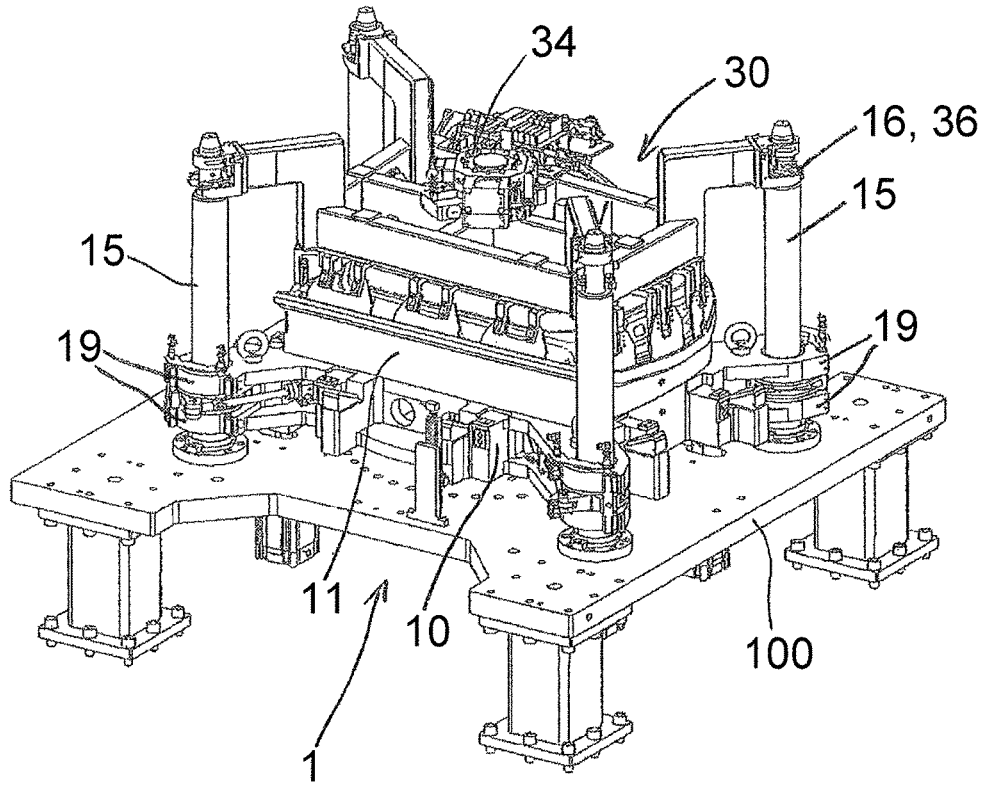
FIG. 34 the suppressor interacting with the flanging bed of the fourth example embodiment.

FIG. 34 shows the flanging press in accordance with FIG. 7 including the base structure 1 and the suppressor 3 but not the flanging die unit 2 which has been left out merely for the purpose of illustrating the position assumed by the suppressor 3 relative to the flanging bed 11 during flanging.

Figure 35:
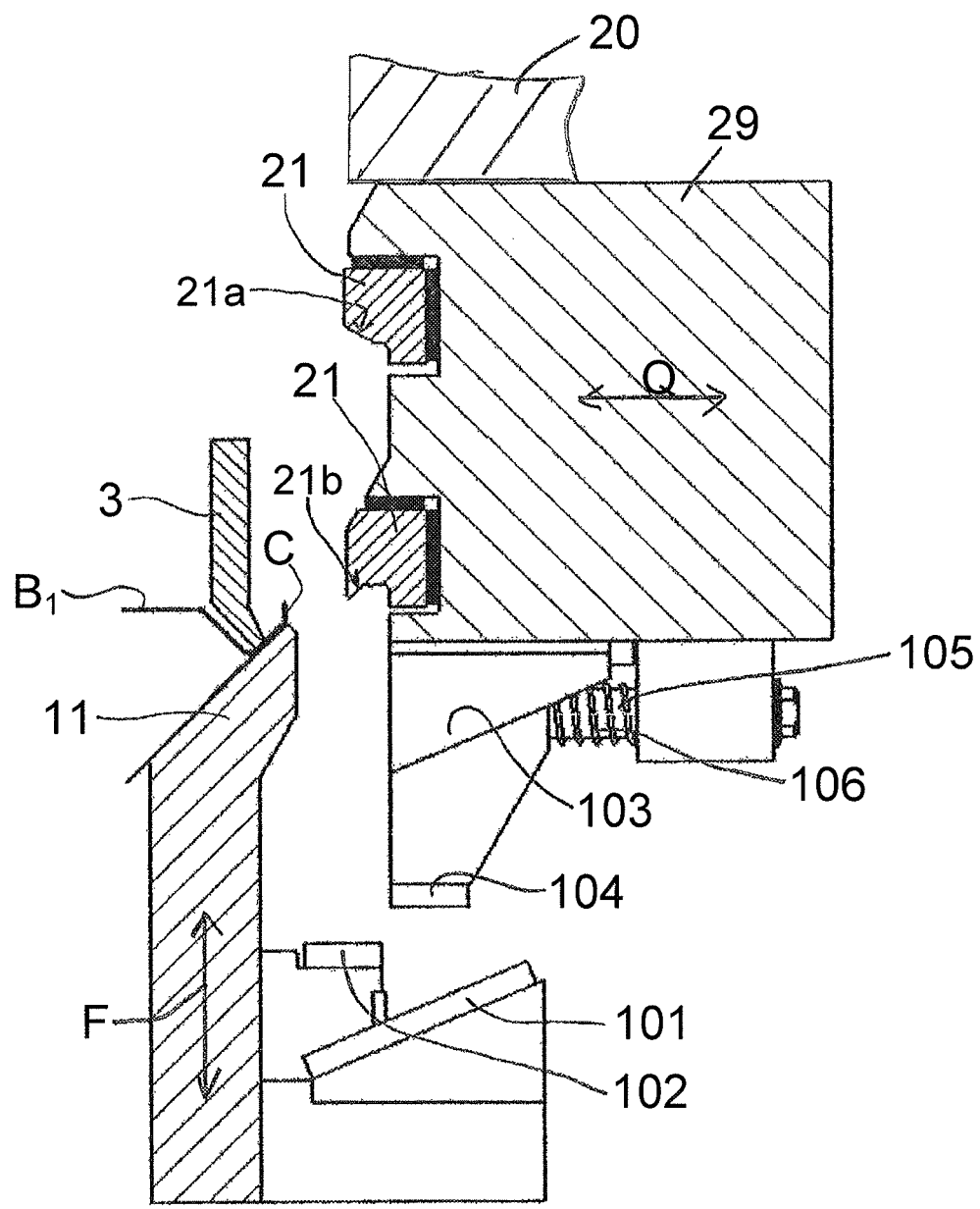
FIG. 35 the hemming bed, the suppressor and a flanging die unit of the fourth example embodiment, in a cross-sectional detail.

FIG. 35 shows the components of the fourth example embodiment which co-operate directly during flanging, in a base position relative to each other. In this base position, the component B is inserted by means of the suppressor 3 and the co-operating guiding elements 15 and guiding counter elements 35, i.e. is positioned on the bearing support of the flanging bed 11 and held down along the flange C with a holding-down pressure which is suitable for flanging, generated by the co-operating tensing elements 16 and tensing counter elements 36. Optionally, the suppressor 3 also holds the component B down along the window slot, preferably with a lesser force.

As in the other example embodiments, the flange C is again completely folded over in the fourth example embodiment in two flanging steps to be performed sequentially. Unlike the other example embodiments, however, the flanging areas 21$a$ and 21$b$ are not arranged next to each other in the transverse direction Q but rather one on top of the other in the pressing direction F. The flanging areas 21$a$ and 21$b$ are also formed on different flanging dies 21: the flanging area 21$a$ for pre-flanging is formed on a flanging die 21 which is further away from the flanging bed 11 in the base position and which is an upper flanging die due to the horizontal arrangement, and the flanging area 21$b$ for final-flanging is formed on a flanging die 21 which is nearer to the flanging bed 11 in the base position and which is a lower flanging die due to the horizontal arrangement. The flanging dies 21 are arranged on a flanging die support 29 which is arranged on the bearing structure 20 such that it can be moved back and forth in the transverse direction Q by means of the assigned drive 22.

In FIG. 32, in which the flanging die unit 2 is shown in its entirety, the units consisting of the flanging die support 29 and the flanging dies 21 in combination are respectively indicated as the flanging dies 21.$i$. Each of the flanging dies 21.$i$ exhibits the cross-sectional design which can be seen from FIG. 35. In modifications, the flanging areas 21$a$ and 21$b$ which are arranged one on top of the other could also be formed on the same flanging die 21. Forming each of them on a flanging die 21 of its own and arranging them in a flanging die support 29 made of a more ductile material is however associated with a reduction in the production cost. The flanging dies 21.$i$ which can be moved as a whole or as a unit, respectively, can be regarded as a bank of flanging dies, as moreover can the flanging dies 21 of the other example embodiments. Thus, each bank of flanging dies 21.$i$ can not only have multiple flanging dies 21 arranged in it one on top of the other, as in the fourth example embodiment, but also multiple flanging dies 21 arranged next to each other, in order to only then fold over one of the portions of the respective flange C, for example one of the flange portions $C_1$ to $C_3$, collectively as a respective bank of flanging dies 21.$i$ in its entirety.

During flanging, the flanging strokes are mechanically defined by co-operating abutments. A first abutment 101 and a second abutment 102 are connected to the flanging bed 11 such that they cannot be moved at least in the pressing direction F and preferably such that they cannot be moved at all. A third abutment 103 and a fourth abutment 104 are connected to the flanging die unit 2 (FIG. 32) such that they cannot be moved in the pressing direction F. The two abutments 103 and 104 are connected to the flanging die support 29 and therefore to the flanging dies 21, such that they participate in the latter's transverse movements. The abutment 103 also cannot be moved relative to the flanging dies 21 in the transverse direction Q and can in particular be arranged on the flanging die support 29 such that it cannot be moved at all. The abutment 104, by contrast, can be moved back and forth along a guide 105 in the transverse direction Q relative to the flanging dies 21 and is tensed by a spring 106 into a front position near the flanging bed 11.

The abutments 101 and 103 co-operate during pre-flanging, and the abutments 102 and 104 co-operate during final-flanging. Another particularity is that the abutting areas of the abutments 101 and 103 which pass into abutting contact during pre-flanging are inclined—in the example embodiment, simply obliquely—in the pressing direction F and in the transverse direction Q of the transverse mobility of the flanging dies 21. The inclination is however set such that the abutting function is ensured in the pressing direction F.

Figure 36:
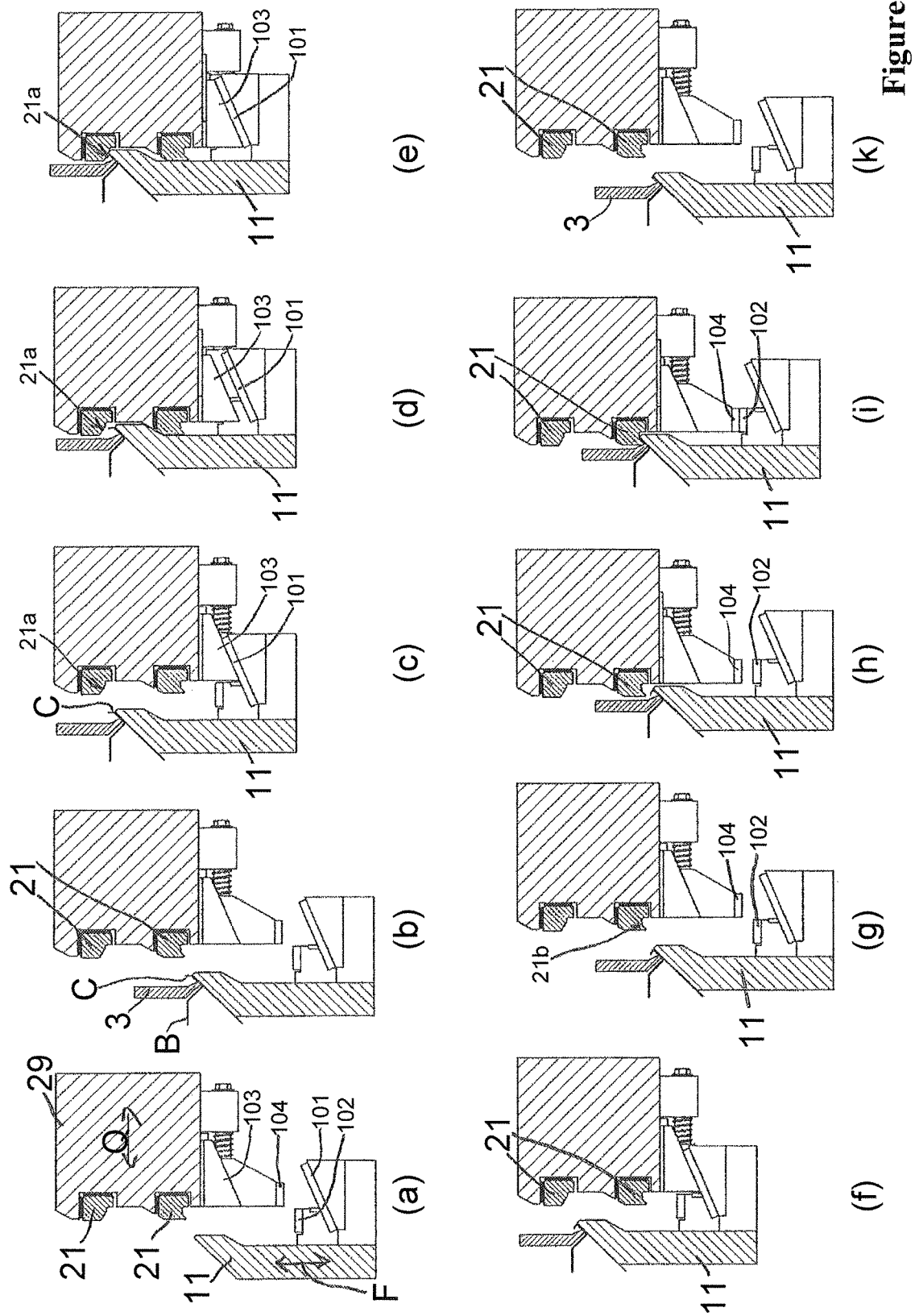
FIG. 36 a flanging sequence of the flanging press of the fourth example embodiment.

FIG. 36 illustrates the workflow for flanging in a sequence of flanging steps (a) to (k). In (a), the flanging bed 11 and the flanging dies 21 assume their base position relative to each other, as in FIG. 35. In the base position, the component is inserted. FIG. 36($b$) corresponds to FIG. 35. The flanging press is correspondingly still situated in its base position, but the component B has been inserted by means of the suppressor 3 and is pressed into the flanging bed 11, i.e. held down, by means of the tensing elements 16 and tensing counter elements 36 (FIG. 34).

The bearing structure 10, and together with it the flanging bed 11, is moved out of the base position in the pressing direction F—in the fourth example embodiment, raised in accordance with the vertical pressing direction F—by means of the additional drive 69 (FIGS. 28 and 29) until the abutment 101 passes into abutting contact with the abutment 103. During this intermediate stroke, the flanging dies 21 are still retracted from and/or free of the flanging bed 11 in the transverse direction Q.

FIG. 36(c) shows the hemming bed 11 after the intermediate stroke has been performed, in the intermediate position which is predetermined by the abutments 101 and 103. The flange C lies opposite the flanging area 21a at a distance and with a certain offset in the pressing direction F and in the transverse direction Q. The offset with respect to the pressing direction F is chosen such that the flanging die support 29 can be advanced in the transverse direction Q into a front position from which the pre-flanging stroke is performed.

In FIG. 36(d), the flanging dies 21 have been advanced for pre-flanging. The abutting areas are inclined in a direction such that the abutments 101 and 102 allow the transverse movement. The inclined abutting area of the abutment 101 also extends in the transverse direction Q towards the flanging bed 11 far enough that once the flanging dies 21 have been advanced, the abutments 101 and 103 are positioned opposite each other again at a distance in the pressing direction F. The axial distance between the abutments 101 and 103 in the new transverse position corresponds to the length of the pre-flanging stroke. In the intermediate position which it still assumes, the flanging bed 11 is supported on the additional drive 69 (FIG. 26) via the bearing structure 10. The actual flanging stroke—the pre-flanging stroke in the next step—is generated by the pressure bellows 60, preferably by the pressure bellows 60 only. The pressure bellows 60 is charged with a pressure fluid, preferably pressurised air, and thus presses the flanging bed 11 forwards in the pressing direction F via the bearing structure 10. In the course of the pre-flanging stroke, the flange C passes into pressing contact with the inclined flanging area 21a and is thus folded over in accordance with the inclination of the flanging area 21a, for example by about 45°.

FIG. 36(e) shows the flanging press after the pre-flanging stroke has been performed. Said flanging stroke is defined by another abutting contact between the abutments 101 and 103.

It may also be noted with respect to the other pair of abutments 102 and 104 that this pair of abutments 102, 104 have no function during pre-flanging. Conversely, in order that the abutments 102 and 104 cannot impede pre-flanging, the abutment 104 can be moved in the transverse direction Q, counter to a spring force. When the flanging bed 11 is moved into the intermediate position, the abutment 104 firstly passes into lateral overlap with the abutment 102, as may be inferred from a comparison of FIGS. 36(b) and 36(c). When the flanging die 21 is then advanced, the abutment 104 yields in the transverse direction Q counter to the force of the spring 106 and therefore does not impede said advancing movement and/or deployment of the flanging dies 21 into the position assumed in FIG. 36(d).

After pre-flanging, the pressure bellows 60 is relieved, which in the fourth example embodiment can be achieved using gravity, by opening a pressure fluid outlet of the pressure bellows 60 and pressing the pressure fluid out of the pressure bellows 60 using the load resting on the pressure bellows 60. The length of this return stroke corresponds to the length of the pre-flanging stroke. The return stroke is defined by the additional drive 69 and optionally by one or more internal abutments of the pressure bellows 60. Directly before the pressure bellows 60 is relieved, the flanging die drives 22 (FIGS. 31 and 32) are preferably tensed in order to move the flanging dies 21 back, which is in particular advantageous when the flanging die drives 22 are pneumatic drives, as is preferred. If the pressure bellows 60 is only relieved once the respective flanging die drive 22 has been tensed, the flanging dies 21 can be moved away from the flanging bed 11 in the transverse direction Q more quickly. The flanging die drive 22 is biased via the oblique abutting areas of the abutments 101 and 103 which do not permit any transverse movement before the return stroke movement of the flanging bed 11 has been initiated. Conversely, the deployment of the flanging dies 21 is controlled by the oblique abutting areas, such that the flanging dies 21 cannot be moved joltingly and with corresponding impact loads. The flanging dies 21 are therefore moved back away from the flanging bed 11 in the transverse direction Q in a controlled manner, until the flanging bed 11 and the flanging dies 21 assume the position relative to each other shown in FIG. 36(f).

In an intermediate step prior to final-flanging, shown in FIG. 36(g), the flanging bed 11 is moved from the intermediate position back into its base position, in the example by means of the additional drive 69.

With the flanging bed 11 still situated in its base position, the flanging dies 21 are advanced again for final-flanging, such that the flanging area 21b is then positioned opposite the flange C, which has already been partially folded over, in the pressing direction F. FIG. 36(h) shows the flanging bed 11 and the flanging dies 21 in this relative position. From this state, the final-flanging stroke is performed directly in the next step, by again charging the pressure bellows 60 with the pressure fluid. The axial expansion of the pressure bellows 60 which is associated with charging it with pressure presses the flanging bed 11 in the pressing direction F into the position assumed in FIG. 36(i). This flanging stroke is preferably generated by the pressure bellows 60 only. During the stroke movement, the abutments 102 and 104 pass into abutting contact against each other in the pressing direction F and thus define the final-flanging stroke. The flange C is then completely folded over.

After final-flanging, the pressure bellows 60 is relieved of pressure, preferably vented, which can again be achieved very easily by opening its pressure fluid outlet using gravity due to the structures resting on it, in particular the bearing structure 10 and the flanging bed 11. After the flanging bed 11 has been lowered, the flanging dies 21 are moved away from the flanging bed 11 in the transverse direction Q, back into their base position. The flanging press again assumes its base position, as can be seen from FIG. 36(k). The final-flanged component B can be taken out and the next component B inserted by means of the suppressor 3.

Figure 37:
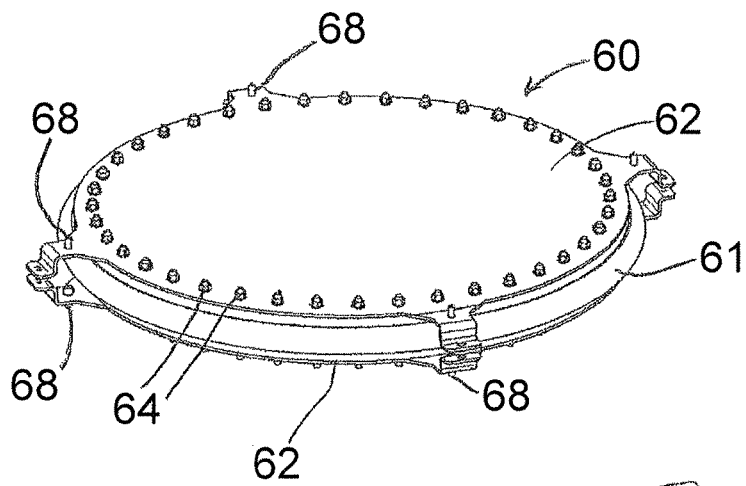
FIG. 37 the pressure bellows.
Figure 38:
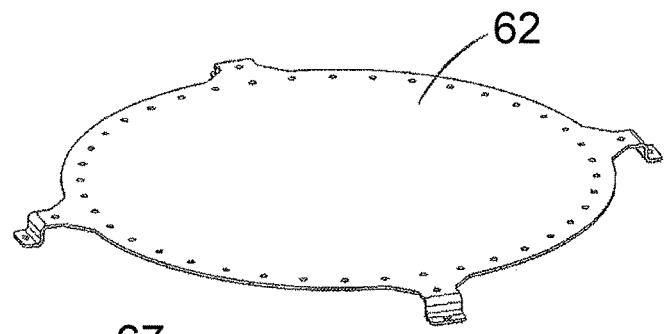
FIG. 38 the pressure bellows with the mounting structure removed.
Figure 38:
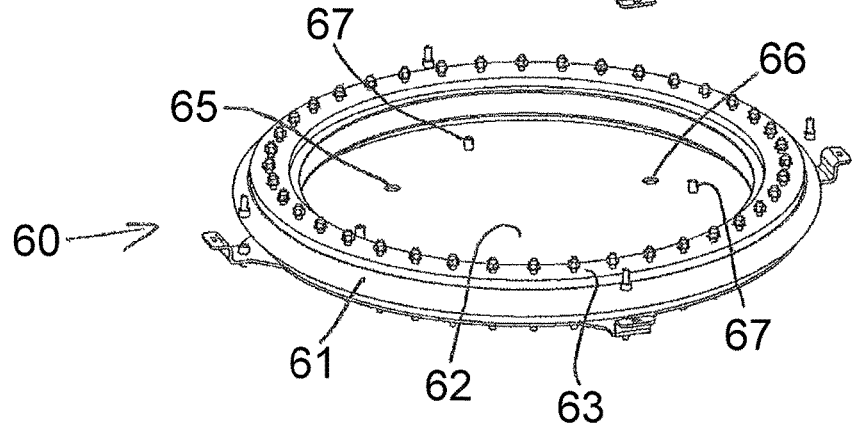
Figure 39:
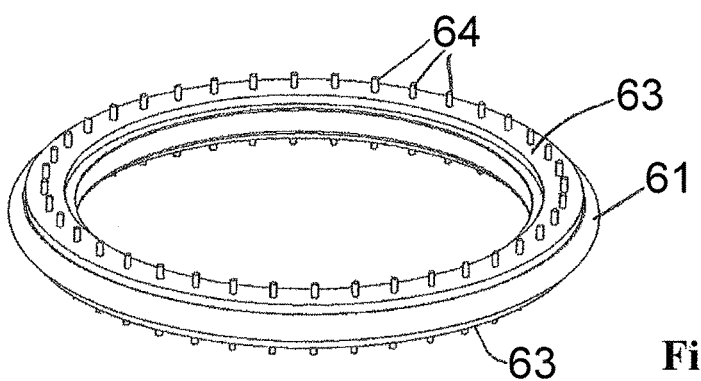
FIG. 39 a flexible part of the pressure bellows.

FIGS. 37 to 39 show the pressure bellows 60 itself, separated off from the flanging press. The pressure bellows 60 is shaped as a disc or plate and exhibits a circular circumference. A circular cross-section is expedient not least in view of its ease of manufacture. The mounting structures 62 are connected to the flexible bellows wall 61, circumferentially around the pressing axis F, by means of closely spaced connecting elements 64 which are for example embodied as threaded bolts. The pressure bellows 60 can for example be fastened to the framework plate 100 by one mounting structure 62 and fastened to the bearing structure 10 by the axially opposite mounting structure 62.

FIG. 38 offers a view into the interior of the pressure bellows 60 by removing one of the mounting structures 62. In one of the mounting structures 62, preferably the one which is joined to the framework 13, an inlet 65 and an outlet 66 for the pressure fluid are provided which are each formed as a passage in the mounting structure 62, as is preferred but merely by way of example. Spacers 67 also protrude from one of the mounting structures 62 towards the other mounting structure 62 and define the axial compression of the pressure bellows 60 when the outlet 66 is open.

FIG. 39 shows only the bellows wall 61 of the pressure bellows 60, which encircles the pressing axis F annularly, and connecting rings 63. The connecting rings 63 are arranged on the axial end faces of the bellows wall 61 and joined to the bellows wall 61 fixedly and in a fluidic seal, for example by vulcanising the bellows wall 61 or by moulding a polymeric, preferably elastomeric bellows wall material into or around connecting structures of the connecting rings 63. The connecting rings 63 are torsion-resistant ring structures which practically cannot be deformed, in particular when assembled, and enable a fixed and fluidically sealed connection between the bellows wall 61 and the mounting structures 62 or alternatively between the bellows wall 61 and the structures which are to be axially moved relative to each other—in the fourth example embodiment, the framework plate 100 and the bearing structure 10. For this purpose, a sufficient number of the connecting elements 64, for example threaded bolts, which are correspondingly closely spaced from each other in the circumferential direction project axially from the connecting rings 63 and, when assembled, protrude into corresponding bores of the respective structure.

The pressure bellows 60 is positioned relative to the framework 13 by means of positioning elements 68 of one mounting structure 62 and is positioned relative to the bearing structure 10 by positioning elements 68 of the other mounting structure 62. It is sufficient for positioning if the positioning elements 68 co-operate, in a positive fit only, with positioning counter elements of the framework 13 and positioning counter elements of the bearing structure 10; a force-fit connection can additionally be provided but is not necessary. A solely positive-fit positioning engagement makes it easier to exchange the pressure bellows 60 in the event of a fault or for preventive maintenance work. Conversely, the pressure bellows can also be connected, axially fixed, to the framework 13 and to the bearing structure 10, in order to compulsorily widen during a stroke of the bearing structure 10 generated by the additional drive 69.

Aside from the inlet 65 and the outlet 66, the pressure bellows 60 is self-contained, i.e. it already forms the pressure space for generating the pressing force by itself. In modifications, one or both of the mounting structures 62 can be omitted, and the pressure space is correspondingly only then closed by fastening the bellows wall 61 to a structure which closes off the relevant end-facing side, such as for example the framework plate 100 or the bearing structure 10. This presumes a correspondingly closed area on the respective structure. The framework plate 100 can then for example easily comprise a closed area in the region of the pressure bellows 60, with only an inlet and an outlet for the pressure fluid, corresponding to the inlet 65 and the outlet 66 in the mounting structure 62. Spacers corresponding to the spacers 67 can also be provided. In such modifications, the bellows wall 61 can be joined, fixedly and in a fluidic seal, to the respective structure, for example the bearing structure 10 or the framework plate 100, by means of one of the connecting rings 63, as illustrated in FIG. 39, in order to form the modified pressure bellows 60. In such modifications, one or both connecting rings 63 (each) form(s) a mounting structure of the modified pressure bellows 60 which is correspondingly only then completed by fastening it in a fluidic seal to a structure which seals the pressure bellows on the respective end-facing side.

Figure 40:
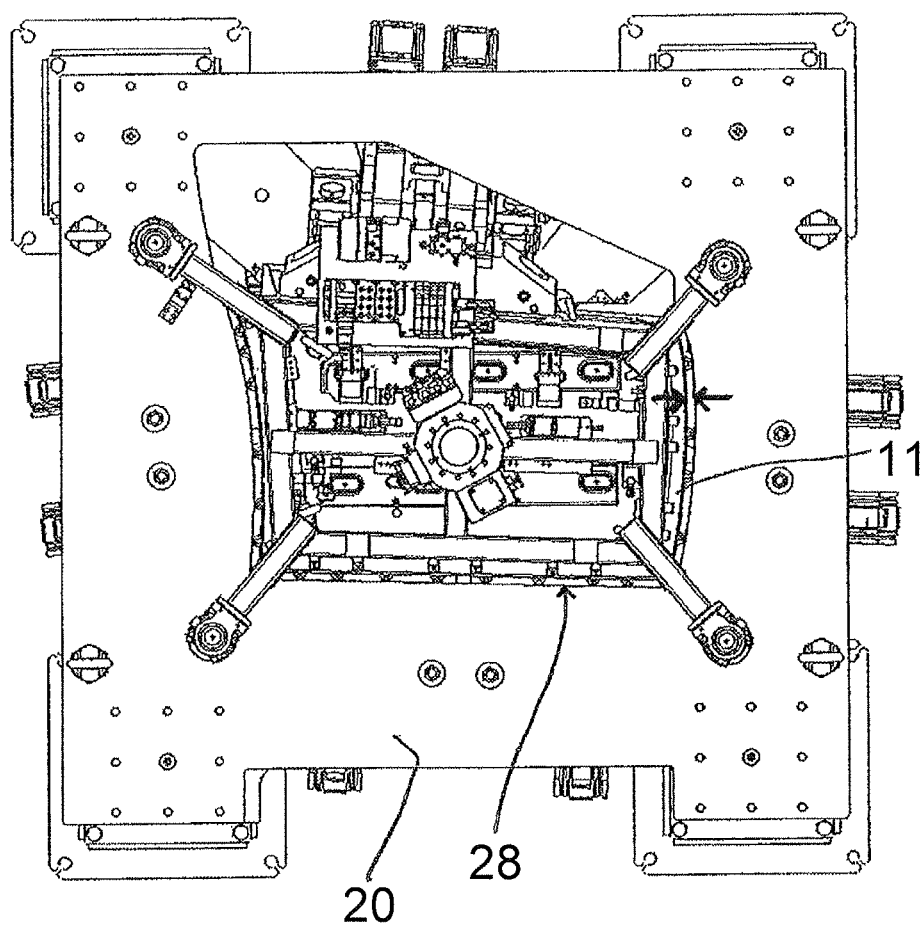
FIG. 40 the flanging press of the fourth example embodiment, in a plan view.

FIG. 40 shows the flanging press of the fourth example embodiment in an axial plan view onto the flanging die unit 2. The plan view shows very clearly how close-to-contour the inner circumference 28 of the bearing structure 20 follows the contour of the flange C and/or the bearing support of the hemming bed 11 over the entire profile of the component flange to be folded over. The local distance which the inner circumference 28 exhibits in an axial projection from the outer edge of the component B and/or the bearing support of the flanging bed 11 is indicated as "d". The lever arm via which the pressing force which acts in the region of the respective flanging area 21a or 21b is introduced into the bearing structure 20 is small in accordance with the distance d. In the flow of force from the pressure bellows 60 to the bearing structure 20, the pressing force is predominantly transmitted axially only, and therefore only as a force, and only negligibly via bending moments. The local distance d between the flange C and the inner circumference 28, on which the respective flanging die 21 is still axially supported when the flange C is folded over, either via a flanging die support 29 as in the fourth example embodiment or directly as in the other example embodiments, advantageously measures less than 8 cm, more preferably less than 5 cm, across the length of the flange C.

Unless differences over the first example embodiment are described above with respect to the fourth example embodiment, the statements made with respect to the first example embodiment with regard to the features of the components of the flanging press, including the suppressor, and how they co-operate apply. Components of the flanging press of the first example embodiment and components of the flanging press of the second example embodiment can in principle also be exchanged, wherein it is not necessary to go into the associated adaptions in detail. A flanging die 21 comprising flanging areas 21a and 21b which are arranged next to each other transverse to the pressing direction can thus for example also be used in the fourth example embodiment instead of the flanging dies 21 which are arranged one on top of the other. In such a modification, it is for example possible to omit the additional drive 69. Conversely, flanging dies 21 which are arranged one on top of the other in accordance with the fourth example embodiment can replace the flanging dies of the first example embodiment. In another modification of the fourth example embodiment, the pressure bellows 60 can generate all the movements in the pressing direction F on its own, i.e. the additional drive 69 can be omitted. Conversely, it is advantageous if the pressure bellows 60 only has to be configured for a short axial stroke.

Once its fixed connection to the framework 13 has been released, the flanging die unit 2 can be lifted off the framework 13, turned and, once turned, put down again on the framework 13—in the example embodiment, on columns of the framework 13—by means of a lifting device, for example a ceiling crane. This facilitates any finishing or subsequent reworking of the flanging dies 21 which may be necessary, such as for example grinding in or regrinding. In one further development, the flanging press can comprise a lifting mechanism by means of which the flanging die unit 2 can be moved away from the flanging bed 11 in the pressing direction F, in order—once it has been moved away—to obtain sufficient free space for such finishing or subsequent reworking of the flanging dies 21 of for other work on the flanging die unit 2 or another component of the flanging press. In embodiments comprising outer supporting columns as in the fourth example embodiment, these supporting columns can then be embodied to be axially telescopic and can be extended and retracted by means of a corresponding drive. The drive can be an electric, pneumatic or hydraulic drive. If the pressing direction F is vertical as in the fourth example embodiment, the flanging dies 21 are for example processed "from below" when the flanging die unit 2 is extended. If the pressing direction is horizontal as in the other example embodiments, it is possible to work from the side.

Figure 41:
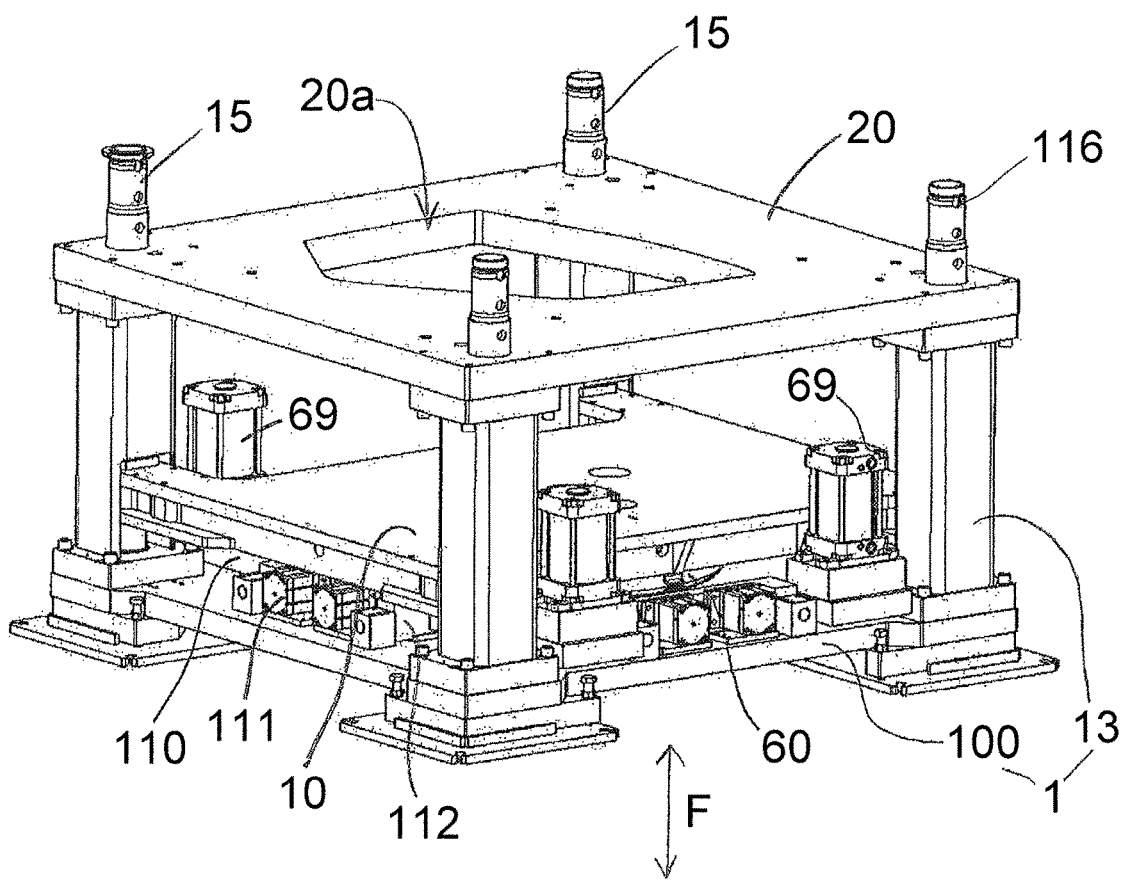
FIG. 41 a flanging press of a fifth example embodiment.

FIG. 41 shows constituent parts of a flanging press of a fifth example embodiment, in a perspective view. The flanging press of the fifth example embodiment is a further development of the flanging press of the fourth example embodiment. Functionally identical constituent parts are indicated by the same reference numerals as in the fourth example embodiment. Unless otherwise stated, the flanging press of the fifth example embodiment corresponds to that of the fourth example embodiment, such that the description of the fourth example embodiment is incorporated by reference with respect to all aspects of the fifth example embodiment which are not described.

With respect to the flanging press of the fourth example embodiment, the flanging press of the fifth example embodiment additionally comprises a stroke bearing structure 110 which can be moved relative to the base structure 1 and relative to the flanging die unit 2, of which only the bearing structure 20 is shown. The stroke bearing structure 110 is supported on the base structure 1, for example on the framework bearing structure 100, in relation to its axial mobility. In the example, it is arranged between the framework bearing structure 100, which is formed as a framework plate as in the fourth example embodiment, and the bearing structure 10. The pressure bellows 60 is arranged axially, wherein the axial direction corresponds to the pressing direction F, between the bearing structure 10 and the stroke bearing structure 110. An expansion of the pressure bellows 60 correspondingly causes the axial distance between the stroke bearing structure 110 and the bearing structure 10 to be increased. In the example embodiment, the pressure bellows 60 is fastened directly to the stroke bearing structure 110 axially on one side and fastened directly to the bearing structure 10 on the axially opposite side, as is preferred but merely by way of example.

The stroke bearing structure 110 is shaped as a plate, as is preferred but merely by way of example. The stroke bearing structure 110 performs all or at least some of the intermediate stroke described with respect to the fourth example embodiment. Reference is made in relation to the intermediate stroke to the above description, in particular the flanging sequence described on the basis of FIG. 36. In the fourth example embodiment, the axial height and therefore the volume of the interior space of the pressure bellows 60 is altered during all the stroke movements which the flanging bed 11 and the flanging dies 21 perform axially relative to each other. In the fourth and also fifth example embodiment, these include the intermediate stroke and the actual flanging strokes, i.e. the pre-flanging stroke and the final-flanging stroke. The pressure bellows 60 therefore expands in the fourth example embodiment at least once in proportion to the sum of the lengths of the intermediate stroke and the actual flanging stroke. The pressure fluid amount situated in the interior space of the pressure bellows 60 at its working pressure corresponds in size. Since the pressure bellows 60 in the fifth example embodiment is no longer expanded due to the movement of the stroke bearing structure 110 when performing the intermediate stroke, the throughput of the pressure fluid amount is reduced.

The stroke bearing structure 110 is moved axially by means of the additional drive 69—raised, in the example embodiment, due to the horizontal arrangement. The return stroke can be generated or assisted by gravity. The preferably multiple drive units of the additional drive 69 can be electric, hydraulic or in particular pneumatic drive units, as in the fourth example embodiment.

In order to assist the additional drive 69, the flanging press of the fifth example embodiment also comprises a supporting device comprising multiple supporting drives 111 and supporting bodies 112 coupled to them. The supporting drives 111 move the supporting bodies 112 to below the stroke bearing structure 110 when the latter has performed the intermediate stroke, in order to mechanically support the stroke bearing structure 110 when it is extended. This relieves the additional drive 69 of the weight and the pressing force to be applied by the pressure bellows 60. Otherwise, the additional drive 69 would have to be dimensioned so as to be sufficiently strong or, in a preferred pneumatic embodiment, would have to be mechanically blocked and/or latched internally.

Figure 42:
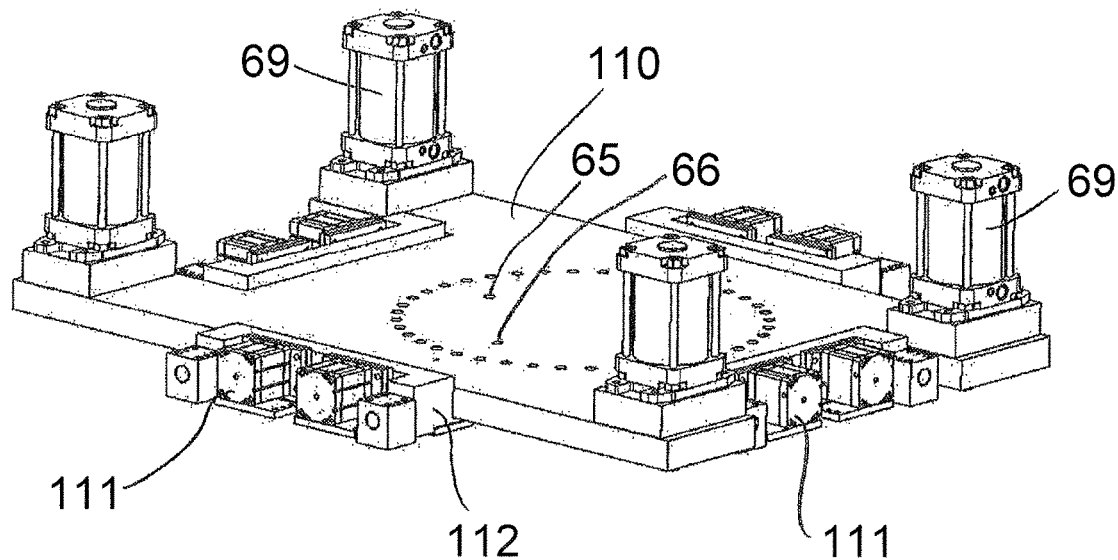
FIG. 42 a stroke bearing structure of the flanging press of the fifth example embodiment.

FIG. 42 shows the stroke bearing structure 110 and the supporting drives 111 and supporting bodies 112 separated off from the flanging press and in their base positions relative to each other as assumed in FIG. 41. The fastening elements—blind bores or transit bores in the example, as applicable with inner threads—for fastening the pressure bellows 60 can also be seen. The pressure bellows 60 can in particular be formed as described with respect to the other example embodiments, as for example illustrated in FIGS. 37 to 39. The stroke bearing structure 110 correspondingly comprises an inlet 65 and an outlet 66 for the pressure fluid.

Figures 43, 44:
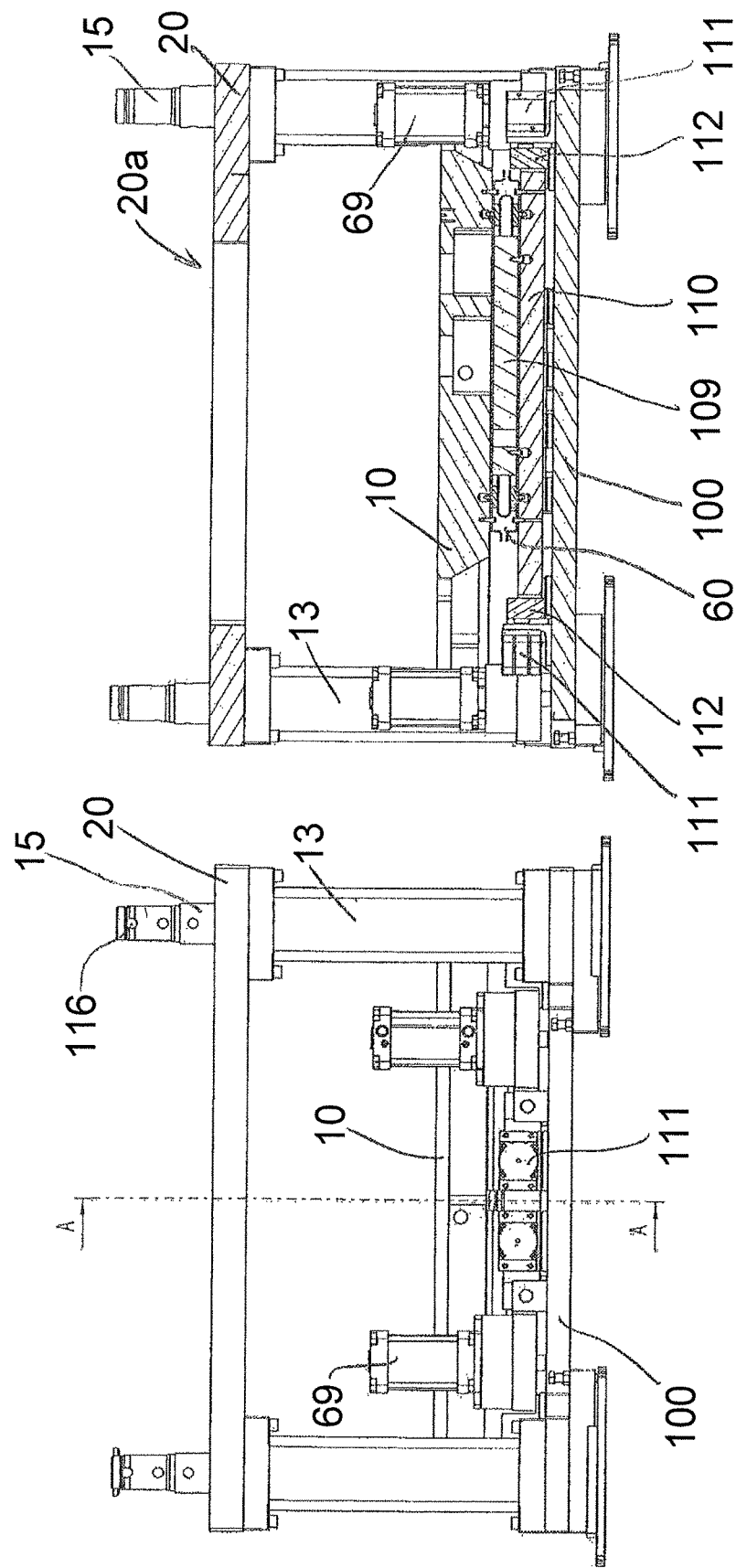
FIG. 43 constituent parts of the flanging press of the fifth example embodiment, situated in their base position, in a side view.
FIG. 44 the constituent parts of the flanging press of the fifth example embodiment, in the section A-A from FIG. 43.

The constituent parts of the flanging press of the fifth example embodiment shown in FIG. 41 are shown in FIG. 43 in a side view and in FIG. 44 in the section A-A from FIG. 43. The flanging press, such as is shown, is situated in its base state. The bearing structure 10 and the stroke bearing structure 110 each assume a base position; the pressure bellows 60 is relieved of pressure. For performing the intermediate stroke described above on the basis of the sequence shown in FIG. 36, the additional drive 69 moves the stroke bearing structure 110 and together with it the pressure bellows 60 and the bearing structure 10 together with the flanging bed 11 of for example the fourth example embodiment (FIGS. 26 to 40) towards the flanging die unit 2, of which only the bearing structure 20 is shown.

Figure 45:
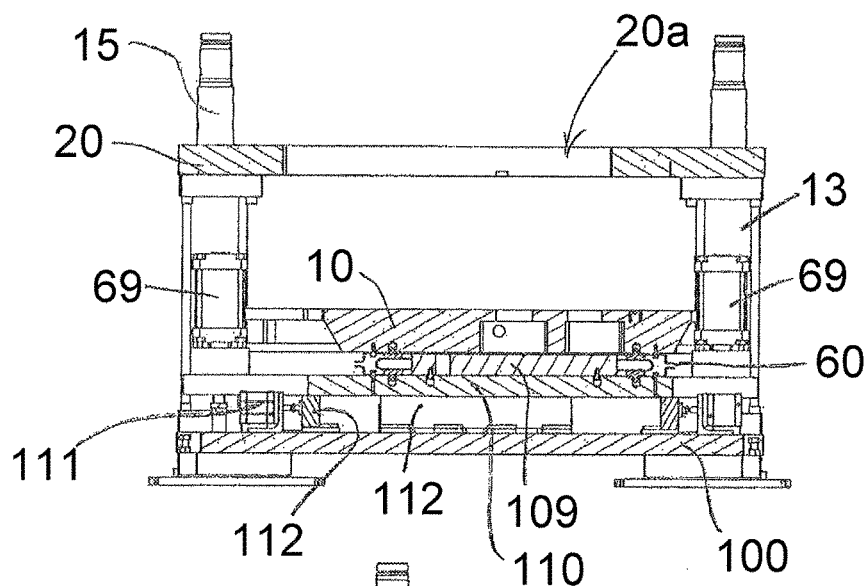
FIG. 45 the constituent parts of the flanging press of the fifth example embodiment, after an intermediate stroke has been performed.

FIG. 45 shows the stroke bearing structure 110, the pressure bellows 60 and the bearing structure 10 after the common intermediate stroke has been performed. The supporting bodies 112 have already been moved to below the stroke bearing structure 110 by the supporting drives 111 and support the stroke bearing structure 110 on the framework bearing structure 100 in order to relieve the additional drive 69.

Figure 46:
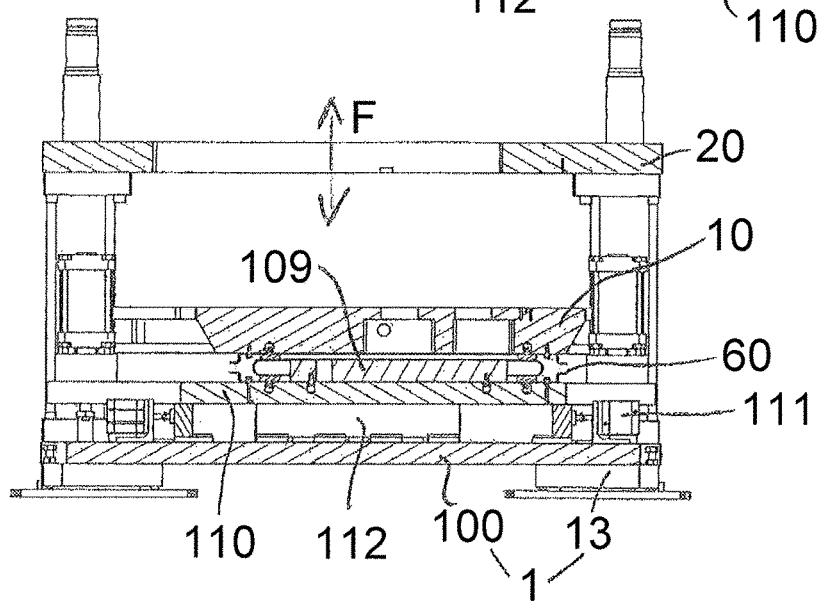
FIG. 46 the constituent parts of the flanging press of the fifth example embodiment, after a flanging stroke has been performed.

FIG. 46 shows the flanging press after a flanging stroke has been performed—in the example embodiment, the pre-flanging stroke. For performing the flanging stroke, the pressure bellows 60 is charged with the pressure fluid, such that the pressure bellows 60 expands axially. During its expansion, the pressure bellows 60 is supported on the stroke bearing structure 110 on one side and is supported on the base structure 1 via the stroke bearing structure 110 and the supporting bodies 112. The expansion of the pressure bellows 60 therefore generates a stroke movement of the bearing structure 10 and together with it the flanging bed 11 (not shown) relative to the flanging die unit 2, of which only the bearing structure 20 is shown by way of representation, as already mentioned. Once the flanging stroke—in this case, the pre-flanging stroke—has been performed, the supporting bodies 112 are moved out of the region of the stroke bearing structure 110, such that the latter can be moved back into its base position by gravity or under the influence of the additional drive 69 which expediently damps the return stroke. The pressure bellows 60 is relieved of pressure, and the flanging dies are moved back.

Figure 47:
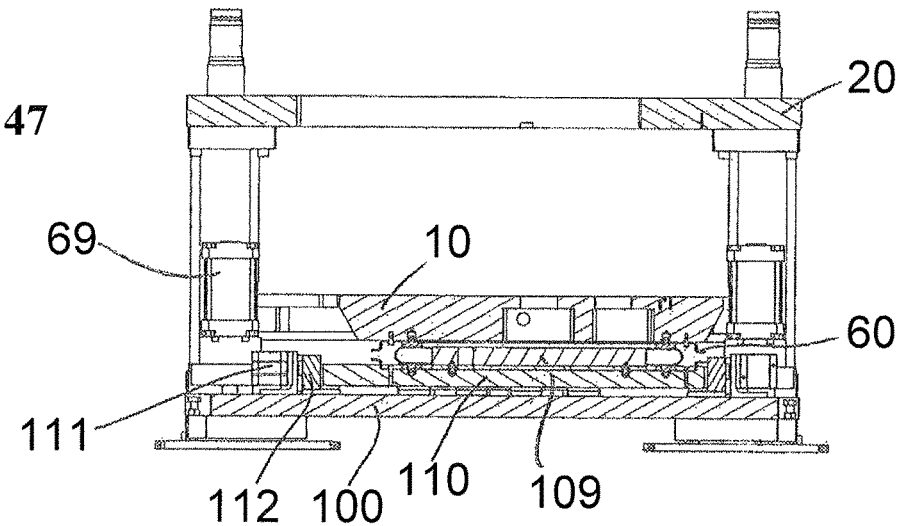
FIG. 47 the constituent parts of the flanging press of the fifth example embodiment, after a return stroke has been performed, with the pressure bellows still expanded.

In FIG. 47, the pressure bellows 60 has already been charged with the pressure fluid again. The relevant flanging stroke—in the example, the final-flanging stroke—has therefore already been performed. This corresponds to the state shown in FIG. 36(*i*). The flanging press of the fifth example embodiment can perform the same flanging sequence as the flanging press of the fourth example embodiment, such that reference is made to the statements made with respect to FIG. 36. Unlike the fourth example embodiment, however, the pressure bellows 60 need not be axially expanded as far as in the fourth example embodiment, since the intermediate stroke is performed collectively by the stroke bearing structure 110 and the pressure bellows 60, and the pressure bellows 60 is correspondingly moved axially as a whole, wherein it is preferably not widened.

In the fourth example embodiment, the stroke bearing structure 110 generates the intermediate stroke. Dividing the stroke movement of the flanging bed 11 into a common stroke movement of the stroke bearing structure 110 and the pressure bellows 60 and a widening movement of the pressure bellows 60 is also advantageous in embodiments in which an intermediate stroke is not necessary. The actual flanging stroke could in principle also be divided in the same way, in order to reduce the throughout and/or consumption of pressure fluid. In series productions, with a correspondingly large number of stroke movements to be performed, the savings are considerable.

The pressure fluid amount can be further reduced, or alternatively can also be reduced, with the aid of one or more filler bodies which can be arranged in the interior space of the pressure bellows 60. This is illustrated on the basis of the fifth example embodiment in FIGS. 44 to 47. A relatively large filler body 109 is arranged in the interior space of the pressure bellows 60 and fills more than 50% of the volume of the interior space of the pressure bellows 60, in relation to the state of maximum expansion of the pressure bellows 60 during press operations. The consumption of pressure fluid can be reduced in accordance with the proportional volume of the filler body 109 or as applicable the multiple filler bodies. The filler body 109 can also fulfil the function of a spacer for when the pressure bellows 60 is relieved of pressure. This is illustrated in FIGS. 44 and 45.

Unlike the fourth example embodiment, the guiding elements 15 in the fifth example embodiment are arranged within the columns of the framework 13 which are embodied as hollow structures. This can save on design space transverse to the pressing direction F and therefore on installation area. The columns of the framework 13 can also axially guide the bearing structure 10 or the stroke bearing structure 110. The axial support is preferably provided on the framework bearing structure 100, but can alternatively or additionally also be provided on the columns of the framework 13.

The tensing elements are also modified and no longer need a rotational movement for the engagement with tensing counter elements of the suppressor. The tensing elements indicated as 116 are instead formed as recesses or passages which extend transverse to the pressing direction F circumferentially and which tensing counter elements of the suppressor can enter. The suppressor is modified from the suppressor of the previously described examples only in this regard.

The flanging press of the fifth example embodiment otherwise corresponds to that of the fourth example embodiment, in particular with regard to the constituent parts of the flanging press which are not shown.

REFERENCE SIGNS

1 base structure
2 flanging die unit
3 suppressor
4 flanging die unit
5 suppressor
6 framework
7 supporting structure
8 base structure
9 pivoting drive
10 bearing structure
10*a* extension
11 flanging bed
12 flanging bed
13 framework
13*a* guiding counter element
14 pressing drive
15 guiding element
16 tensing element
17 tensing drive
18 reinforcement
19 rotational guiding element
20 bearing structure
20*a* passage
21 flanging die
21*a* flanging area
21*b* flanging area
22 flanging die drive
23 support
24 drive flange
25 guiding counter element
26 guide
27 abutting area
28 inner circumference
29 flanging die support
30 bearing structure
31 holding-down edge
32 protruding region
33 retracted region
34 fastening device
35 guiding counter element
35 tensing counter element
36 angled region
38 —
39 —
40 bearing structure
41 flanging die
42 flanging die drive
44 drive flange
45 guiding counter element
50 bearing structure
51 holding-down edge
55 guiding counter element
60 bellows
61 bellows wall
62 mounting structure
63 connecting ring, mounting structure
64 connecting element
65 inlet
66 outlet
67 spacer 68 positioning element
69 additional drive
70 additional flanging device
71 flanging slider
72 slider drive
100 framework bearing structure, framework plate
101 abutment
102 abutment
103 counter abutment
104 counter abutment
105 guide
106 spring
107 —
108 —
109 filler body
110 stroke bearing structure
111 supporting drive
112 supporting body
114 —
115 —
116 tensing element
B component
C flange
$C_1$ side edge flange
$C_2$ bottom edge flange
$C_3$ side edge flange
F pressing direction, pressing axis
Q transverse direction
S pivoting axis

The invention claimed is:

1. A flanging press for folding over a flange of a component, wherein the flanging press is arranged in a stationary manner and comprises at least:
 (a) a base structure featuring a flanging bed onto which the component can be pressed in a pressing direction in order to fold over the flange;
 (b) a flanging die unit featuring a flanging die for folding over the flange;
 (c) and a pressing drive for generating a pressing force which acts on the component for the purpose of folding over;
 (d) wherein the flanging die and the flanging bed can be moved relative to each other in the pressing direction by means of the pressing drive in order to exert the pressing force;
 wherein
 (e) the pressing drive comprises a bellows which can be charged with pressure fluid and acts on the flanging die unit or flanging bed in the pressing direction when charged with pressure, thus generating at least some of the pressing force,
 (f) and the pressure bellows comprises a bellows area which extends transverse to the pressing direction and which can be charged with the pressure fluid;
 wherein
 (g) a suppressor for holding down the component during flanging, and the base structure or the flanging die unit comprises a first tensing element, and the suppressor comprises a second tensing element, which can be brought into tensing engagement with each other in order to tense the suppressor in the pressing direction relative to the flanging bed, for holding down the component in the tensing engagement.

2. The flanging press according to claim 1, wherein the bellows area is large enough that the pressing force necessary for flanging can be applied through the pressure bellows when the pressure bellows is connected to a pressurised air source which delivers pressurised air at a pressure of 20 bars or less.

3. The flanging press according to claim 1, wherein: the pressure bellows comprises a flexible bellows wall, a first bellows mounting structure and a second bellows mounting structure, one of which can form the bellows area which can be charged with the pressure fluid; the flexible bellows wall encircles a pressing axis; the first bellows mounting structure is arranged on one of the end-facing sides of the flexible bellows wall, and the second bellows mounting structure is arranged on the other end-facing side of the flexible bellows wall; and the bellows mounting structures are each fixedly connected in a fluid impervious seal to the flexible bellows wall.

4. The flanging press according to claim 3, wherein at least one of the bellows mounting structures follows the profile of an end-facing side edge of the bellows wall,
 circumferentially around the pressing axis, in an end-facing view onto the respective bellows mounting structure either along an outer circumference only or in the form of a thin strip, wherein at least one of the bellows mounting structures closes off the pressure bellows in a fluid impervious seal on one end-facing side.

5. The flanging press according to claim 1, wherein one or more filler bodies are arranged in an interior space of the pressure bellows which can be charged with the pressure fluid, and the filler body or bodies reduce the volume of the interior space, as compared to an otherwise identical interior space with no filler bodies, by at least 20% in relation to the maximally expanded pressure bellows when the flanging press is in operation, in order to reduce the amount of pressure fluid required.

6. The flanging press according to claim 1, wherein the flanging bed or the flanging die unit is arranged over the pressure bellows and can be raised by means of the pressure bellows in order to fold over the flange, wherein the pressure bellows can be relieved of pressure by gravity or by means of an additional drive in order to lower the flanging bed or the flanging die unit again.

7. The flanging press according to claim 1, wherein the flanging die unit comprises a passage through which the component can be inserted into the flanging bed from a rear side of the flanging die unit which faces away from the flanging bed, and the flanging die is arranged on an inner circumference of the flanging die unit which surrounds the passage partially or completely over 360°, wherein multiple flanging dies are arranged next to each other along the inner circumference, wherein the flanging die unit comprises a framework bearing structure which surrounds the passage at least partially, in the manner of a frame.

8. The flanging press according to claim 7, wherein the inner circumference follows the contour of the flange close-to-contour, and in an axial projection onto the flanging bed exhibits a distance from the contour of the flange of at most 8 cm over the entire length of the flange respectively.

9. The flanging press according to claim 1, wherein the flanging die unit comprises a bearing structure exhibiting an inner circumference which extends partially or completely over 360° around the circumference of the pressing axis, and multiple flanging dies for folding over the flange, and the flanging dies are each supported on the bearing structure in the pressing direction and arranged next to each other along the inner circumference and can be moved relative to the bearing structure transverse to the pressing direction and transverse to the inner circumference.

10. The flanging press according to claim 9, wherein the flanging dies each exert a pressing force via a lever arm on the flange when the flange is being folded over and are supported in the pressing direction on the inner circumference of the bearing structure, and in that the distance between the pressing force of the respective flanging die and the inner circumference and therefore the respectively effective lever arm per flanging die has a length, as measured in the transverse direction, of at most 8 cm.

11. The flanging press according to claim 1, wherein the flanging press comprises a flanging slider which can be moved transverse to the pressing direction in an overlap with the flanging bed, in order to be able to fold over a flange into a slot of the component.

12. The flanging press according to claim 1, wherein a guiding element which extends in the pressing direction is provided on the base structure, and a guiding counter element which extends in the pressing direction is provided on the flanging die unit, and the base structure and the flanging die unit are guided relative to each other in the pressing direction, by a guiding engagement between the guiding element and guiding counter element.

13. The flanging press according to claim 1,
wherein a guiding element which extends in the pressing direction is provided on the base structure, and a guiding counter element which extends in the pressing direction is provided on the flanging die unit, and the base structure and the flanging die unit are guided relative to each other in the pressing direction by a guiding engagement between the guiding element and guiding counter element,
and wherein one of the tensing elements is supported in the pressing direction on the guiding element or is formed directly by the guiding element.

14. The flanging press according to claim 1, wherein, said suppressor comprising a fastening device for fastening to an actuator which can be spatially moved, and a holding device for holding the component, such that the component can be moved to the flanging press and placed into the flanging bed by the suppressor.

15. The flanging press according to claim 14, wherein the base structure or the flanging die unit comprises a guiding element and the suppressor comprises a guiding counter element in order to guide the suppressor relative to the flanging bed by a guiding engagement between the guiding element and the guiding counter element of the suppressor while it is inserting the component.

16. The flanging press according to claim 1, wherein:
the suppressor comprises a holding-down edge for contacting the component, and a region which borders the holding-down edge; and
the region of the suppressor which borders the holding-down edge, and the at least one flanging die, are shaped such that the at least one flanging die can overlap the holding-down edge of the suppressor transverse to the pressing direction and transverse to the flange during flanging.

17. A flanging press for folding over a flange of a component, wherein the flanging press is arranged in a stationary manner and comprises at least:
(a) a base structure featuring a flanging bed onto which the component can be pressed in a pressing direction in order to fold over the flange;
(b) a flanging die unit featuring a flanging die for folding over the flange;
(c) and a pressing drive for generating a pressing force which acts on the component for the purpose of folding over;
(d) wherein the flanging die and the flanging bed can be moved relative to each other in the pressing direction by means of the pressing drive in order to exert the pressing force;
(e) the pressing drive comprises a bellows which can be charged with pressure fluid and acts on the flanging die unit or flanging bed in the pressing direction when charged with pressure, thus generating at least some of the pressing force, and
(f) the pressure bellows comprises a bellows area which extends transverse to the pressing direction and which can be charged with the pressure fluid,
wherein the flanging press comprises a component sucker, by which the component can be held in position in the flanging bed by a suction force, and the component sucker comprises a suction chamber which is laterally defined by a side wall structure, on the end-facing side of which the flanging bed is arranged or formed, and on an end-facing side by the component.

18. A method for folding over a flange of a component by a flanging press arranged in a stationary manner and comprising:
a base structure featuring a flanging bed onto which the component can be pressed in a pressing direction in order to fold over the flange;
a flanging die unit featuring a flanging die for folding over the flange;
and a pressing drive for generating a pressing force which acts on the component for the purpose of folding over,
wherein the pressing drive comprises a bellows which can be charged with pressure fluid and acts on the flanging die unit or flanging bed in the pressing direction when charged with pressure, thus generating at least some of the pressing force, and the pressure bellows comprises a bellows area which extends transverse to the pressing direction and which can be charged with the pressure fluid,
wherein the flanging die and the flanging bed can be moved relative to each other in the pressing direction by the pressing drive in order to exert the pressing force;
wherein the flanging die unit comprises a passage through which the component can be inserted into the flanging bed from a rear side of the flanging die unit which faces away from the flanging bed, and the flanging die is arranged on an inner circumference of the flanging die unit which surrounds the passage partially or completely over 360°;
wherein multiple flanging dies are arranged next to each other along the inner circumference;
wherein the flanging die unit comprises a framework bearing structure which surrounds the passage at least partially, in the manner of a frame; and
a suppressor for holding down the component during flanging, the suppressor comprising a fastening device for fastening to the actuator, and a holding device for holding the component, such that the component can be moved to the flanging press and placed into the flanging bed by the suppressor,
the method comprising the steps of:
(a) moving the component through the passage towards the flanging bed by an actuator which can be spatially moved, (b) placing the component into the flanging bed by the actuator or a tensing device,
(c) the suppressor i) holding the component while the component is moved through the passage and inserted into the flanging bed and ii) holding the component down in the flanging bed during flanging;
and folding the flange over by a pressing strake which the flanging die unit performs together with the flanging die relative to the flanging bed or by a pressing strake which the flanging bed performs relative to the flanging die unit and the flanging die.

* * * * *